US012319076B2

(12) United States Patent
Nakashima et al.

(10) Patent No.: US 12,319,076 B2
(45) Date of Patent: Jun. 3, 2025

(54) MEDIUM USED WITH PRINTER AND INCLUDING LABEL AND MARK PROVIDED ON RELEASE MATERIAL

(71) Applicant: BROTHER KOGYO KABUSHIKI KAISHA, Nagoya (JP)

(72) Inventors: Chie Nakashima, Nagoya (JP); Takaaki Banno, Nagoya (JP); Kohei Terada, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 515 days.

(21) Appl. No.: 17/214,458

(22) Filed: Mar. 26, 2021

(65) Prior Publication Data

US 2021/0213758 A1 Jul. 15, 2021

Related U.S. Application Data

(63) Continuation-in-part of application No. PCT/JP2019/033466, filed on Aug. 27, 2019.

(30) Foreign Application Priority Data

Sep. 28, 2018 (JP) ................................ 2018-184810

(51) Int. Cl.

*B41J 3/407* (2006.01)
*B41J 11/46* (2006.01)

(Continued)

(52) U.S. Cl.

CPC ............ *B41J 3/4075* (2013.01); *B41J 11/46* (2013.01); *B41M 3/00* (2013.01); *G09F 3/02* (2013.01);

(Continued)

(58) Field of Classification Search

CPC .......... B41J 3/4075; B41J 11/46; B41M 3/00; G09F 3/02; G09F 2003/0229;

(Continued)

(56) References Cited

U.S. PATENT DOCUMENTS

| | | | | |
|---|---|---|---|---|
| 4,317,852 A * | 3/1982 | Ogden | ...................... | G09F 3/02 206/820 |
| 5,484,168 A * | 1/1996 | Chigot | .................. | G09F 3/0288 283/67 |

(Continued)

FOREIGN PATENT DOCUMENTS

| | | |
|---|---|---|
| CN | 1541382 A | 10/2004 |
| CN | 101987533 A | 3/2011 |

(Continued)

OTHER PUBLICATIONS

The Invitation Pursuant to Rule 62a (1) EPC for the related European Patent Application No. 19867007.7 dated dated Mar. 9, 2022.

(Continued)

*Primary Examiner* — Patricia L. Nordmeyer
(74) *Attorney, Agent, or Firm* — KENEALY VAIDYA LLP

(57) ABSTRACT

In a medium conveyed in a first direction, a first slit has a square shape including first, second, third, and fourth sides. A second slit is positioned downstream from the first slit in the first direction and has a square shape including fifth, sixth, seventh, and eighth sides. The first, second, fifth, and sixth sides are parallel to the first direction. The third, fourth, seventh, and eighth sides are parallel to a second direction orthogonal to the first direction. The third and seventh sides are positioned upstream from the fourth and eighth sides in the first direction, respectively. A first print label spans across the first and second sides. A second print label spans across the fifth and sixth sides. A mark has an upstream edge (Continued)

in the first direction positioned downstream from the fourth side and a downstream edge in the first direction positioned upstream from the seventh side.

10 Claims, 40 Drawing Sheets

(51) Int. Cl.
*B41M 3/00* (2006.01)
*G09F 3/02* (2006.01)
*H01B 7/36* (2006.01)

(52) U.S. Cl.
CPC ...... *G09F 2003/0229* (2013.01); *H01B 7/365* (2013.01)

(58) Field of Classification Search
CPC ........... G09F 3/0295; G09F 2003/0267; H01B 7/365; Y10T 428/14
See application file for complete search history.

(56) References Cited

U.S. PATENT DOCUMENTS

| | | | | |
|---|---|---|---|---|
| 5,658,648 | A | 8/1997 | Doerr et al. | |
| 5,708,462 | A * | 1/1998 | Helmbold | B41J 11/46 346/136 |
| 5,958,536 | A * | 9/1999 | Gelsinger | G09F 3/0288 40/310 |
| 6,177,163 | B1 * | 1/2001 | Blok | G09F 3/10 156/277 |
| 7,588,811 | B2 * | 9/2009 | Blank | G09F 3/10 428/40.1 |
| 8,507,065 | B2 * | 8/2013 | Milson | B65C 9/1884 428/40.1 |
| 2004/0026024 | A1 | 2/2004 | Nakasaka et al. | |
| 2004/0226467 | A1 | 11/2004 | Underwood et al. | |
| 2009/0167013 | A1 | 7/2009 | Horikoshi | |
| 2009/0277570 | A1 | 11/2009 | Caveney et al. | |
| 2010/0127491 | A1 | 5/2010 | Scholl et al. | |
| 2011/0239507 | A1 | 10/2011 | Wanibuchi | |
| 2014/0152753 | A1 | 6/2014 | Moriyama et al. | |
| 2018/0015748 | A1 | 1/2018 | Kato et al. | |
| 2018/0015749 | A1 | 1/2018 | Inoue et al. | |

FOREIGN PATENT DOCUMENTS

| | | | |
|---|---|---|---|
| CN | 102099845 | A | 6/2011 |
| CN | 102233757 | A | 11/2011 |
| CN | 107709023 | A | 2/2018 |
| CN | 107851404 | A | 3/2018 |
| EP | 2283477 | A1 | 2/2011 |
| EP | 2581897 | A1 | 4/2013 |
| EP | 2979877 | A1 | 2/2016 |
| EP | 3933813 | A1 | 1/2022 |
| JP | S60-152582 | A | 8/1985 |
| JP | S62-052028 | A | 3/1987 |
| JP | 2004-045812 | A | 2/2004 |
| JP | 2004-184514 | A | 7/2004 |
| JP | 2005-001134 | A | 1/2005 |
| JP | 2007-148282 | A | 6/2007 |
| JP | 2008-003156 | A | 1/2008 |
| JP | 2008-139542 | A | 6/2008 |
| JP | 2008-197214 | A | 8/2008 |
| JP | 2009-217179 | A | 9/2009 |
| JP | 2011-033822 | A | 2/2011 |
| JP | 2011-105450 | A | 6/2011 |
| JP | 2011-136514 | A | 7/2011 |
| WO | 2020/066421 | A1 | 4/2020 |
| WO | 2020/066422 | A1 | 4/2020 |

OTHER PUBLICATIONS

International Search Report and Written Opinion of the International Search Report for PCT/JP2019/033466 dated Nov. 19, 2019.
International Preliminary Report on Patentability and English language Written Opinion of the International Search Report for PCT/JP2019/033466 dated Mar. 23, 2021.
Chinese Office Action for the related Chinese Patent Application No. 201980064010.2 dated Jul. 5, 2022.
The extended European Search Report for the related European Patent Application No. 19867007.7 dated May 23, 2022.
Japanese Office Action for the related Japanese Patent Application No. 2018-184810 dated Apr. 25, 2022.
United States Office Action issued in U.S. Appl. No. 17/213,565 on Dec. 17, 2024.
United States Office Action issued in U.S. Appl. No. 17/213,565 on May 21, 2024.
United States Office Action issued in U.S. Appl. No. 17/213,565 on Sep. 5, 2024.
International Search Report and Written Opinion of the International Search Report for PCT/JP2019/033465 dated Dec. 3, 2019.
International Preliminary Report On Patentability and English language Written Opinion of the International Search Report for PCT/JP2019/033465 dated Mar. 23, 2021.
Invitation pursuant to Rule 62a(1) EPC for the related European Patent Application No. 19 864 811.5 dated May 2, 2022.
Japanese Office Action for the related Japanese Patent Application No. 2018-184809 dated May 27, 2022.
Chinese Office Action for the related Chinese Patent Application No. 201980064009.X dated Jul. 5, 2022.
Extended European Search Report for the related European Patent Application No. 19864811.5 dated Aug. 30, 2022.
Chinese Office Action for the related Chinese Patent Application No. 201980064009.X dated Feb. 14, 2023.
Japanese Office Action (Decision to Refusal) for the related Japanese Patent Application No. 2018-184809 dated Dec. 23, 2022.
Decision of Refusal for the related Japanese Patent Application No. 2018-184809 dated Jun. 16, 2023.
Decision of Dismissal of Amendment for the related Japanese Patent Application No. 2018-184809 dated Jun. 16, 2023.
Specification and Drawings filed in U.S. Appl. No. 17/213,565.
Communication pursuant to Article 94(3) EPC for the related European Patent Application No. 19864811.5 dated Sep. 26, 2024.

* cited by examiner

MEDIUM USED WITH PRINTER AND INCLUDING LABEL AND MARK PROVIDED ON RELEASE MATERIAL

CROSS REFERENCE TO RELATED APPLICATION

This application is a by-pass continuation-in-part application of International Application No. PCT/JP2019/033466 filed Aug. 27, 2019 claiming priority from Japanese Patent Application No. 2018-184810 filed Sep. 28, 2018. The entire contents of the international application and the priority application are incorporated herein by reference.

TECHNICAL FIELD

The present disclosure relates to a medium that is mounted in and printed with a printer.

BACKGROUND

In a technology known in the art, a medium that comprises labels fixed to a release material (release paper) is mounted in a printer. The labels are printed with the printer and peeled off of the printed medium to be used. According to this conventional medium technology, the labels are fixed to the front surface of the release material via adhesive. While the medium is mounted in the printer, the labels are printed as the medium is conveyed. Marks are provided on the back surface of the release material. During printing, a sensor provided in the printer optically detects these marks, enabling the printer to control the position of the medium as the medium is conveyed.

SUMMARY

Depending on the application needs for the medium described above, the user may wish to affix the label around an object so that the label can turn about the object. For such cases, a slit may be formed in an area on the back surface of the release material opposite the label provided on the front surface side of the release material. When the label is peeled from the release material, the release material in the area inside the slit separates from the rest of the release material and remains adjoined to the label. When attaching a label having this configuration, the adhesive in the area of the label positioned around the object is covered by the separated release material, preventing the adhesive from bonding to the object and allowing the label to rotate.

However, a new problem arises in this case, as described next. When conveyed through the printer, the medium as a whole is curved along the conveying path. As described above, the medium is provided with slits and marks on the back surface of the release material, and labels having a degree of thickness affixed to the opposite side surface, i.e., the front surface, of the release material. Owing to this construction, the release material near the slits in particular may be in a curved state while the medium is conveyed. Such cases may lead to detection errors when optically detecting the marks on the medium, reducing accuracy in positioning control.

It is an object of the present disclosure to provide a medium that can suppress detection errors of marks on release material layer or the like to suppress a decline in positioning precision, even when the medium is conveyed through the printer in a curved state.

In order to attain the above and other objects, the present disclosure provides a medium to be mounted in a printer, to be conveyed in a conveying direction and to be printed with the printer. The medium includes: a release material; a first slit; a first print label; a second slit; a second print label; and a mark. The release material has a strip-like shape including a long side parallel to the first direction and a short side parallel to a second direction orthogonal to the first direction. The first slit is provided in the release material and has a square shape including a first side, a second side, a third side, and a fourth side. The first side and the second side are parallel to the first direction and juxtaposed in the second direction. The third side and the fourth side are parallel to the second direction and juxtaposed in the first direction. The third side is positioned upstream from the fourth side in the first direction. The first print label is fixed to the release material so as to span across both the first side and the second side. The second slit is provided in the release material and positioned downstream from the first slit in the first direction. The second slit has a square shape including a fifth side, a sixth side, a seventh side, and an eighth side. The fifth side and the sixth side are parallel to the first direction and juxtaposed in the second direction. The seventh side and the eighth side are parallel to the second direction and juxtaposed in the first direction. The seventh side is positioned upstream from the eighth side in the first direction. The second print label is fixed to the release material so as to span across both the fifth side and the sixth side. THe mark is provided on the release material. The mark has an upstream edge in the first direction positioned downstream from the fourth side and a downstream edge in the first direction positioned upstream from the seventh side.

According to another aspect, the present disclosure also provides a medium to be mounted in a printer, to be conveyed in a first direction and to be printed with the printer. The medium includes: a release material; a first slit; a first print label; a second slit; a second print label; and a mark. The release material has a strip-like shape including a long side parallel to the first direction and a short side parallel to a second direction orthogonal to the first direction. The first slit is provided in the release material and has a square shape including a first side, a second side, a third side, and a fourth side. The first side and the second side are parallel to the first direction and juxtaposed in the second direction. The third side and the fourth side are parallel to the second direction and juxtaposed in the first direction. The third side is positioned upstream from the fourth side in the first direction. The first print label is fixed to the release material so as to span across both the first side and the second side. The second slit is provided in the release material and positioned downstream from the first slit in the first direction. The second slit has a square shape including a fifth side, a sixth side, a seventh side, and an eighth side. The fifth side and the sixth side are parallel to the first direction and juxtaposed in the second direction. The seventh side and the eighth side are parallel to the second direction and juxtaposed in the first direction. The seventh side is positioned upstream from the eighth side in the first direction. The second print label is fixed to the release material so as to span across both the fifth side and the sixth side. The mark is provided on the release material. The mark has an upstream edge in the first direction positioned upstream from the fourth side and a downstream edge in the first direction positioned downstream from the seventh side.

According to still another aspect, the present disclosure also provides a medium to be mounted in a printer, to be conveyed in a first direction and to be printed with the printer. The medium includes: a release material; a first slit; a first print label; a second slit; a second print label; and a mark. The release material has a strip-like shape including a long side parallel to the first direction and a short side parallel to a second direction orthogonal to the first direction. The first slit is provided in the release material and has a square shape including a first side, a second side, a third side, and a fourth side. The first side and the second side are parallel to the first direction and juxtaposed in the second direction. The third side and the fourth side are parallel to the second direction and juxtaposed in the first direction. The third side is positioned upstream from the fourth side in the first direction. The first print label is fixed to the release material so as to span across both the third side and the fourth side. The second slit is provided in the release material and positioned upstream from the first slit in the first direction. The second slit has a square shape including a fifth side, a sixth side, a seventh side, and an eighth side. The fifth side and the sixth side are parallel to the first direction and juxtaposed in the second direction. The seventh side and the eighth side are parallel to the second direction and juxtaposed in the first direction. The seventh side is positioned upstream from the eighth side in the first direction. The second print label is fixed to the release material so as to span across both the seventh side and the eighth side. The mark is provided on the release material. The mark has an upstream edge in the first direction positioned downstream from the fourth side and a downstream edge in the first direction positioned upstream from a downstream edge of the first print label in the first direction.

According to still another aspect, the present disclosure also provides a medium to be mounted in a printer, to be conveyed in a first direction and to be printed with the printer. The medium includes: a release material; a slit; a print label; and a mark. The release material has a strip-like shape including a long side parallel to the first direction and a short side parallel to a second direction orthogonal to the first direction. The slit is provided in the release material and has a square shape including a first side, a second side, an upstream side, and a downstream side. The first side and the second side are parallel to the first direction and juxtaposed in the second direction. The upstream side and the downstream side are parallel to the second direction and juxtaposed in the first direction, the upstream side being positioned upstream from the downstream side in the first direction. The print label is fixed to the release material so as to span across both the first side and the second side. The mark is provided on the release material. The mark is in the slit. The print label has a printing area. The release material has an opacity of no greater than 97%. The mark is arranged to overlap an entire area of the printing area in the print label in a plan view.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Below, embodiments of the present disclosure will be described while referring to the accompanying drawings.

A first embodiment of the present disclosure and its variations will be described with reference to FIG. 1 through FIG. 16B.

<Label-Creating Device>

First, the functional configuration of a label-creating device according to the present embodiment will be described with reference to FIG. 1.

Figure 1:
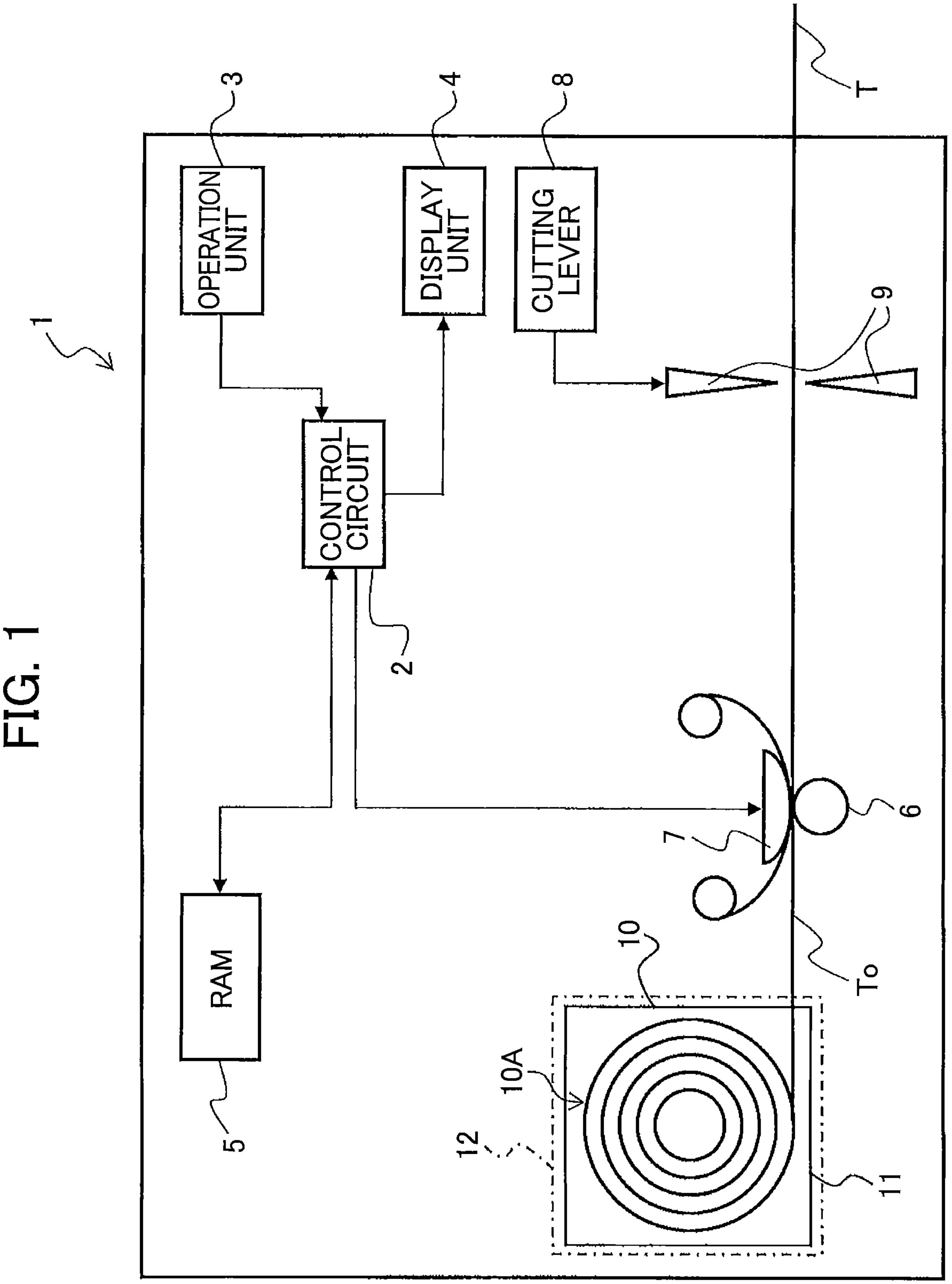
FIG. 1 is an explanatory diagram showing a schematic configuration of a label-creating device according to a first embodiment of the present disclosure.

In FIG. 1, a label-creating device 1 (corresponding to the printer) has a control circuit 2, an operation unit 3 on which the user (operator) can perform desired operations, a display unit 4 for displaying prescribed information, a RAM 5 for storing various information, a conveying roller 6, a print head 7, a cutting lever 8, and a cutter 9.

A cartridge holder 12 is also provided in the label-creating device 1. A tape cartridge 10 (corresponding to a cassette) is detachably mounted in the cartridge holder 12. The tape cartridge 10 has a casing 11, and a tape roll 10A (depicted in the drawing as concentric circles for simplification but actually wound into a roll) accommodated in the casing 11. A printing tape To is wound in a roll shape to form the tape roll 10A. Here, the tape cartridge 10 may be a die-cut label type or a continuous length type. In the die-cut label type, a printing tape To having half-cuts HC (described later with reference to FIGS. 2A through 2C) formed therein is wound about the tape roll 10A. In the continuous length type, a printing tape To having no half-cuts HC is wound about the tape roll 10A. Either type of tape cartridge 10 can be used in the label-creating device 1. Unless otherwise stated, the following example describes a case of using the die-cut label type tape cartridge 10. The half-cuts HC are configured of perforations, for example. In this specification, a "perforation" denotes a plurality of holes provided intermittently in a fine line along the surface direction of a target layer, with each hole penetrating the target layer in the thickness direction (the same applies hereafter).

The control circuit 2 is provided with a CPU and a ROM not shown in the drawings. The control circuit 2 executes various programs pre-stored in the ROM while utilizing the temporary storage function of the RAM 5 in order to perform overall control of the label-creating device 1.

The conveying roller 6 is disposed in opposition to the print head 7. The printing tape To paid out from the tape roll 10A is interposed between the conveying roller 6 and print head 7. By rotating, the conveying roller 6 conveys the printing tape To while pulling the printing tape To from the tape roll 10A.

The print head 7 prints desired print objects (see the printed images R described later) on main label parts Lo (described later in greater detail) of the printing tape To conveyed by the conveying roller 6. The print objects are user-specified characters, icons, and the like.

When actuated through a user operation on the cutting lever 8, the cutter 9 cuts off a printed section of a printing tape T (described later in greater detail) having a plurality of print labels L formed along the conveying direction. Note that the printing tapes To and T correspond to the medium in the claims.

<Printing Tape>

Figure 2A:
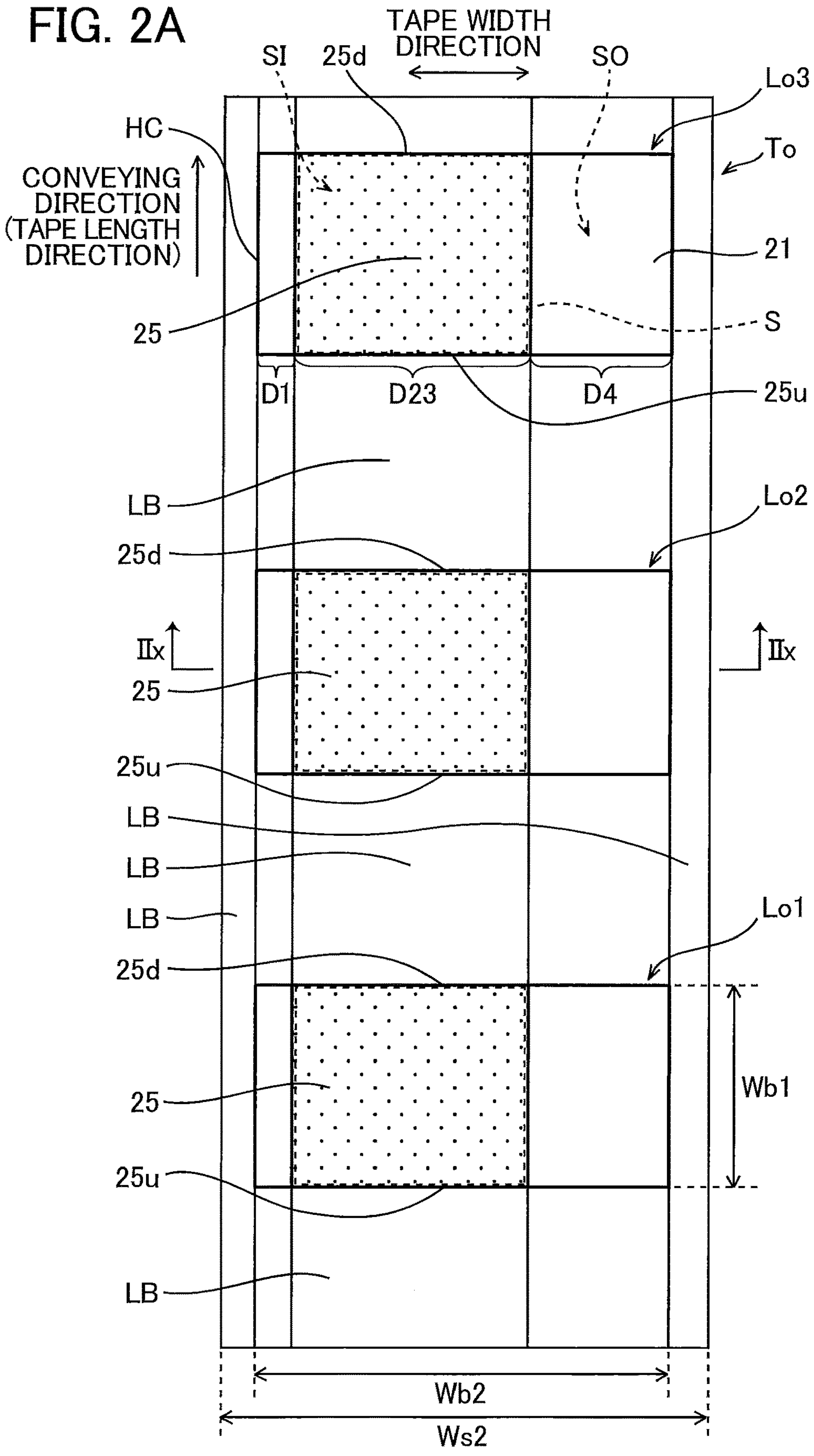
FIG. 2A is a plan view showing a printing tape in an unprinted state.
Figure 2B:
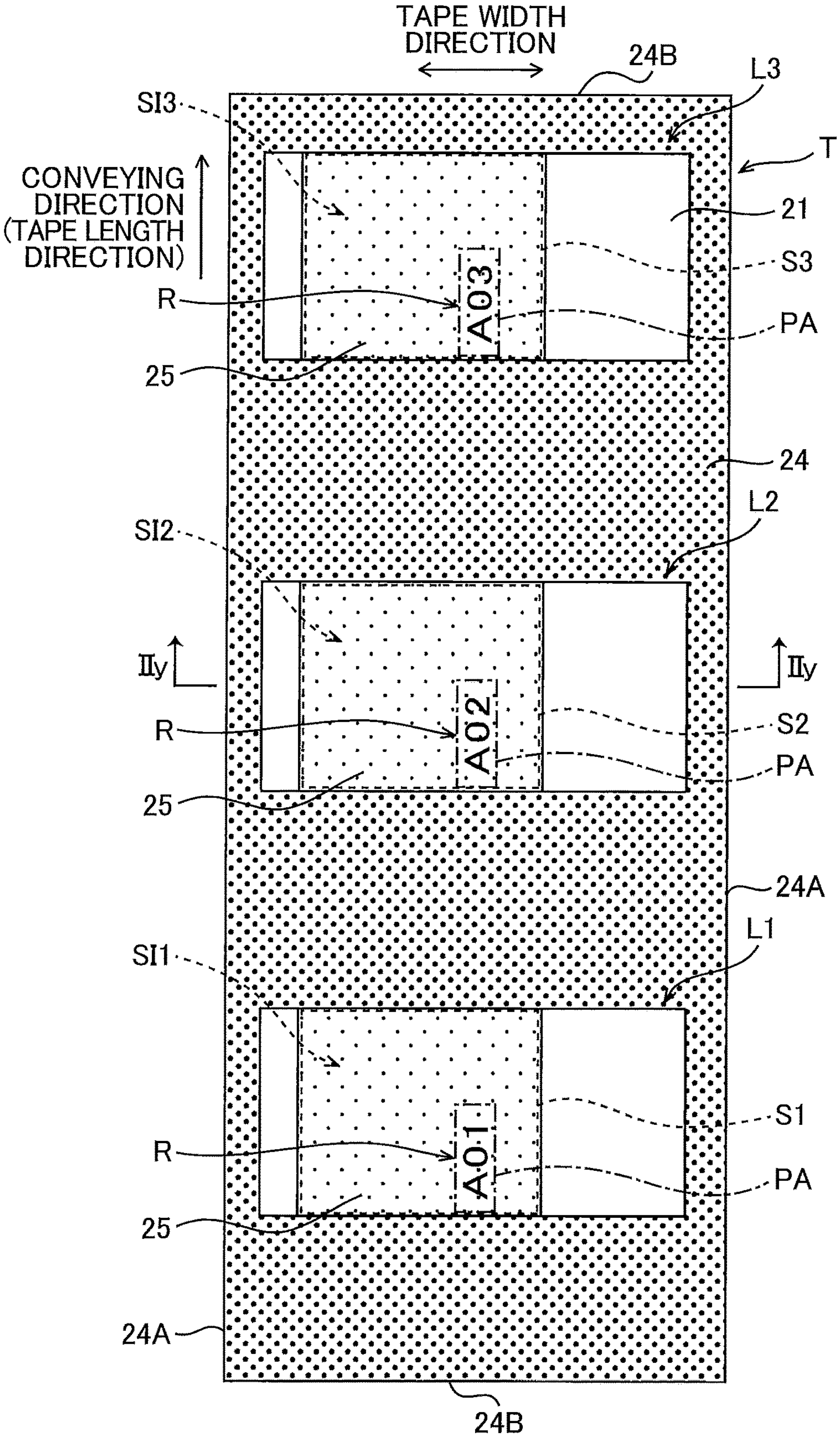
FIG. 2B is a plan view showing a printed printing tape after an excess label portion has been peeled off.
Figure 2C:
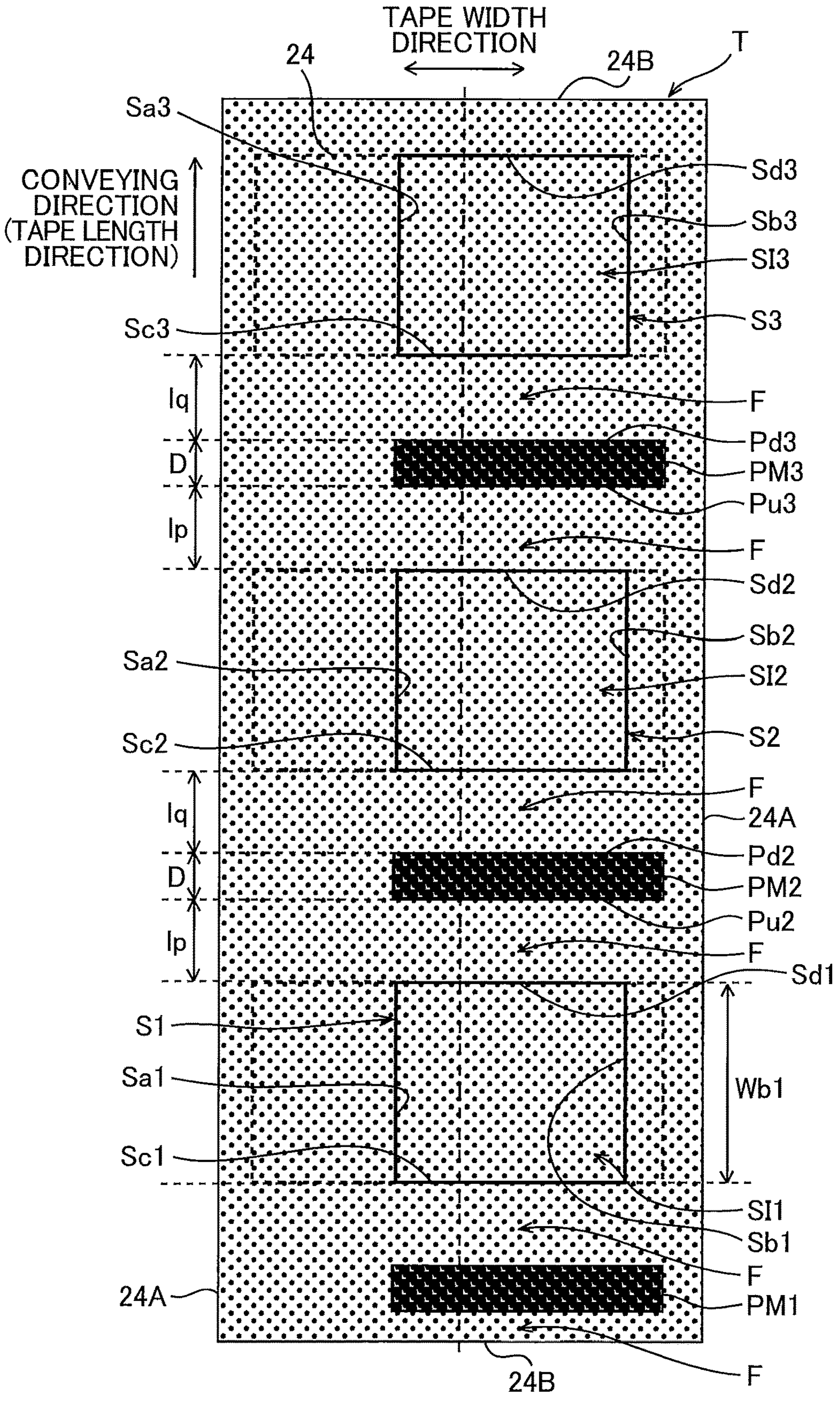
FIG. 2C is a rear view showing the printed printing tape.
Figure 2D:
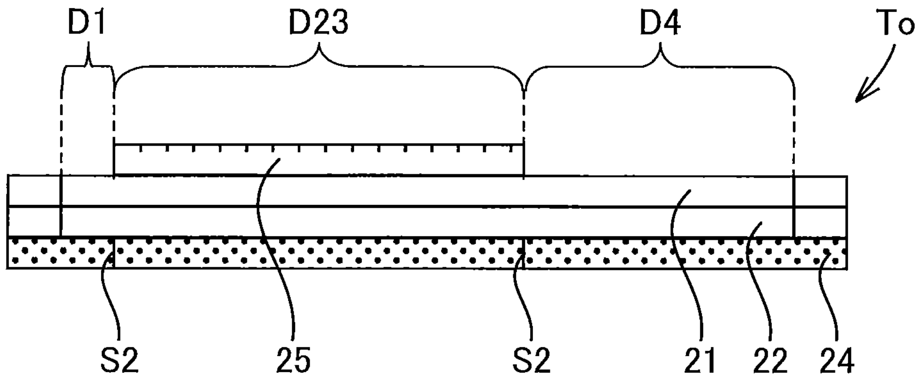
FIG. 2D is a cross-sectional view taken along a section IIx-IIx of the structure shown in FIG. 2A.
Figure 2E:
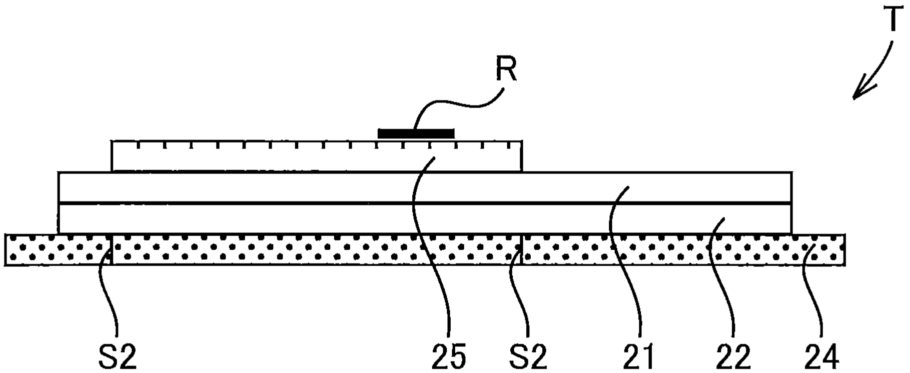
FIG. 2E is a cross-sectional view taken along a section IIy-IIy of the structure shown in FIG. 2B.

FIGS. 2A through 2E show the detailed structure of the printing tape To. FIG. 2A is a plan view showing the printing tape To in an unprinted state. The up-down direction in the drawing corresponds to the conveying direction (the tape length direction), the left-right direction in the drawing corresponds to the tape width direction, and the near-far direction in the drawing corresponds to the tape thickness direction. FIG. 2B shows a plan view of the printing tape T on which the printed image R has been printed and after an excess label portion has been peeled off FIG. 2C is a rear view of the printed printing tape T. FIG. 2D is a cross-sectional view taken along the section IIx-IIx of the structure shown in FIG. 2A. FIG. 2E is a cross-sectional view taken along the section IIy-IIy of the structure shown in FIG. 2B.

As shown in FIGS. 2A through 2E(e), each of the printing tapes To and T includes an opaque release material layer 24 (corresponding to a release material), a transparent adhesive layer 22 (corresponding to an adhesive layer), and a transparent base layer 21 having compositions that include paper or colored film or fabric or metal. The release material layer 24, adhesive layer 22, and base layer 21 are layered in sequence in the thickness direction (the depth direction in the perspective of FIG. 2A, the vertical direction in FIG. 2D, and hence the direction in which each layer is laminated, as will be described later) from a first side of the thickness direction (the bottom in FIG. 2D, the far side in FIGS. 2A and 2B, and the near side in FIG. 2C) toward a second side of the thickness direction (the top in FIG. 2D, the near side in FIGS. 2A and 2B and the far side in FIG. 2C). As shown in FIGS. 2B and 2C, the release material layer 24 has a strip-like shape that includes parallel long sides 24A along the tape length direction (first direction, corresponding to the conveying direction), and parallel short sides 24B along the tape width direction (second direction). Note that the adhesive layer 22 may be provided in part, rather than over the entire surface, on the back side (the bottom side in FIG. 2D) of the base layer 21, i.e., between the base layer 21 and release material layer 24.

In the printing tapes To and T having the layered structure described above, a plurality of main label parts Lo1, Lo2, and Lo3 (or a plurality of print labels L1, L2, and L3 having a printed image R formed on each of the main label parts Lo1, Lo2, and Lo3) are arranged successively in the tape length direction (the up-down direction in the drawings) while separated by an excess label portion LB (see FIG. 2A). In other words, the main label parts Lo1, Lo2, and Lo3 (hereinafter simply referred to as "main label parts Lo" when not distinguishing among them) or the print labels L1, L2, and L3 (hereinafter simply referred to as "print labels L" when not distinguishing among them) are arranged discretely along the tape length direction. Each of the main label parts Lo (or print labels L) is formed in a square shape with opposing sides La and Lb, and opposing sides Lc and Ld. These main label parts Lo (or print labels L) are all arranged with their longitudinal directions oriented in the tape width direction (left-right direction in the drawings). The base layer 21 is divided by the half-cuts HC (perforations) into the main label parts Lo and the remaining excess label portion LB and is fixed via the adhesive layer 22 to the surface on the second side of the release material layer 24 in the thickness direction.

At this time, a print background layer 25 is also partially provided on the front-side (the top in FIG. 2D) surface of the base layer 21 at a position within the main label part Lo (see FIGS. 2A, 2B, 2D, and 2E). The print background layer 25 has a suitable non-transparent color and includes a printing area PA (see FIG. 2B) in which the print head 7 forms the printed image R.

Owing to the layered structure described above, each main label part Lo has a length Wb2 in the tape width direction and a width Wb1 in the tape length direction and includes three areas: an adhesive area D1 constituting the left end portion in the drawings; a non-adhesive area D23 provided adjacent to the adhesive area D1 and corresponding to the print background layer 25; and an adhesive area D4 provided adjacent to the non-adhesive area D23. Here, a length Ws2 of the printing tapes To and T in the tape width direction is greater than the length Wb2 of the main label parts Lo in the tape width direction.

In the printing tapes To and T, rectangular (square) slits S1, S2, and S3 (hereinafter simply referred to as "slits S" for convenience when not distinguishing among them) are formed in the first side surface of the release material layer 24 relative to the thickness direction at positions corresponding to the main label parts Lo1, Lo2, and Lo3 (i.e., the print labels L1, L2, and L3). Each of the slits S is arranged such that the adhesive area D1 and adhesive area D4 are positioned in a slit outer area SO outside the slit S in a plan view, while the non-adhesive area D23 is positioned in a slit inner area SI inside the slit S (a rectangular region having the same width dimension as the print background layer 25 described above, and specifically slit inner areas SI1, SI2, and SI3 described later) in a plan view.

The print background layer 25 is arranged with at least a portion overlapping at least a portion of the slit inner area SI enclosed by the slit S. In this example, each of the print background layers 25 has a square shape formed by a side 25*a* and a side 25*b* that are aligned in the tape length direction and juxtaposed in the tape width direction, and a side 25*u* and a side 25*d* that are aligned in the tape width direction and juxtaposed in the tape length direction such that the side 25*u* is positioned on the upstream side of the side 25*d* in the conveying direction. In addition, in this example, the print background layers 25 have the same dimensions in the tape width direction and tape length direction as the slits S and the entirety of the print background layers 25 overlap the slit inner areas SI1, SI2, and SI3 (hereinafter simply called "areas SI" or "slit inner areas SI" for convenience when not distinguishing among them, as described above) within the corresponding slits S. In other words, the slits S overlap the print background layers 25 in a plan view.

Further, marks PM (and specifically marks PM1, PM2, and PM3 described later) are provided on the release material layer 24 in intermediate parts between neighboring slits S. The marks PM are used for positioning control when the conveying roller 6 conveys the printing tape To. The marks PM are formed in a color, such as black, that has a light-absorbing property. To detect these marks PM, the label-creating device 1 is provided with a well-known reflective optical sensor (not illustrated) having a light-emitting unit and a light-receiving unit. During the positioning control, the optical sensor emits light from the light-emitting unit while the light-receiving unit receives light reflected off the release material layer 24. At this time, the marks PM on the release material layer 24 are detected based on the difference in the amount of light received between portions of the release material layer 24 on which the marks PM are provided and all other portions, and the printing tape To is positioned based on these detections (described later in greater detail with reference to FIGS. 8A through 10E).

According to the structure of the release material layer 24 described above, the rectangular slits S are juxtaposed on the printing tapes To and T along the up-down direction, and a print background layer 25 is positioned in each slit inner area SI surrounded by a slit S. A printed image R is formed in the lower-left region of the print background layer 25 in each of the print labels L1, L2, and L3. The printed images R are print objects respectively configured of the text "A01," "A02," and "A03" in this example. The term "slit" in this specification denotes a cut penetrating the target layer in the thickness direction (the same applies hereafter). A configuration in which the target layer is partially cut in the thickness direction (the cut enters a fixed amount in the thickness direction) may be used in place of these slits (the same applies hereafter).

<Description of the Slits and Marks>

As shown in FIG. 2C, the slit S1 is configured of a square-shaped opening formed by a side Sa1 and a side Sb1 that are aligned in the tape length direction and juxtaposed in the tape width direction, and a side Sc1 and a side Sd1 that are aligned in the tape width direction and juxtaposed in the tape length direction such that the side Sc1 is positioned on the upstream side of the side Sd1 in the conveying direction. The print label L1 described above is fixed to the first side of the release material layer 24 relative to the thickness direction so as to span across both the side Sa1 and side Sb1. At this time, the print background layer 25 of the corresponding main label part Lo1 (print label L1) is configured of a square including four sides 25*a*, 25*b*, 25*u*, and 25*d* and having the same size and shape as the slit inner area SI1 enclosed by the slit S1. With the release material layer 24 arranged to overlap the print background layer 25 in a plan view as described above, the side Sc1 and side Sd1 of the slit S1 are respectively aligned with the side 25*u* and the side 25*d* of the print background layer 25 in a plan view (see FIGS. 2A and 2C). The side 25*u* of the print background layer 25 is also referred to as "upstream edge 25*u*" of the print background layer 25, and the side 25*d* of the print background layer 25 is also referred to as "downstream edge 25*d*" of the print background layer 25.

The slit S2 is provided on one side of the slit S1 (the upper side in FIGS. 2B and 2C) in the tape length direction. As with the slit S1, the slit S2 is configured of a square-shaped opening formed by a side Sa2 and a side Sb2 that are aligned in the tape length direction and juxtaposed in the tape width direction, and a side Sc2 and a side Sd2 that are aligned in the tape width direction and juxtaposed in the tape length direction so that the side Sc2 is positioned on the upstream side of the side Sd2 in the conveying direction. The print label L2 described above is fixed to the first side surface of the release material layer 24 in the thickness direction so as to span across both the side Sa2 and side Sb2. At this time, the print background layer 25 of the corresponding main label part Lo2 (print label L2) is configured of a square including four sides and having the same size and shape as the slit inner area SI2 enclosed by the slit S2. Similar to that described above, the side Sc2 and side Sd2 of the slit S2 are arranged to overlap the corresponding upstream edge 25*u* and downstream edge 25*d* of the print background layer 25 in a plan view (see FIGS. 2A and 2C).

The slit S3 is provided on one side of the slit S2 (the upper side in FIGS. 2B and 2C) in the tape length direction. As with the slits S1 and S2, the slit S3 is configured of a square-shaped opening formed by a side Sa3 and a side Sb3 that are aligned in the tape length direction and juxtaposed in the tape width direction, and a side Sc3 and a side Sd3 that are aligned in the tape width direction and juxtaposed in the tape length direction such that the side Sc3 is positioned on the upstream side of the side Sd3 in the conveying direction. The print label L3 described above is fixed to the first side surface of the release material layer 24 in the thickness direction so as to span across both the side Sa3 and side Sb3. At this time, the print background layer 25 of the corresponding main label part Lo3 (print label L3) is configured of a square including four sides and having the same size and shape as the slit inner area SI3 enclosed by the slit S3. Similar to that described above, the side Sc3 and side Sd3 of the slit S3 are arranged to overlap the corresponding upstream edge 25*u* and downstream edge 25*d* of the print background layer 25 in a plan view (see FIGS. 2A and 2C).

On the first side surface of the release material layer 24 in the thickness direction, the mark PM1 is provided on one side of the slit S1 in the tape length direction (the lower side in the drawing), the mark PM2 is provided between the slit S1 and slit S2, and the mark PM3 is provided between the slit S2 and slit S3, as shown in FIG. 2C.

The mark PM2 has an upstream edge Pu2 in the conveying direction (the tape length direction) positioned downstream from the side Sd1 of the slit S1, and a downstream edge Pd2 in the conveying direction positioned upstream from the side Sc2 of the slit S2. A distance 1*p* between the upstream edge Pu2 of the mark PM2 in the conveying direction and the side Sd1 of the slit S1, and a distance 1*q* between the downstream edge Pd2 of the mark PM2 in the conveying direction and the side Sc2 of the slit S2 are both greater than half a distance D between the upstream edge Pu2 and the downstream edge Pd2 of the mark PM2 in the conveying direction.

In relation to this mark PM2, the slit S1 corresponds to the first slit in the claims, and the sides Sa1, Sb1, Sc1, and Sd1 of the slit S1 correspond to the first side, second side, third side, and fourth side, respectively. Similarly, the slit S2 corresponds to the second slit in the claims, and the sides Sa2, Sb2, Sc2, and Sd2 of the slit S2 correspond to the fifth side, sixth side, seventh side, and eighth side, respectively. The print label L1 corresponds to the first print label, and the print label L2 corresponds to the second print label.

The mark PM3 has an upstream edge Pu3 in the conveying direction (tape length direction) disposed downstream from the side Sd2 of the slit S2, and a downstream edge Pd3 in the conveying direction disposed upstream from the side Sc3 of the slit S3. The distance 1*p* between the upstream edge Pu3 of the mark PM3 in the conveying direction and the side Sd2 of the slit S2 and the distance 1*q* between the downstream edge Pd3 of the mark PM3 in the conveying direction and the side Sc3 of the slit S3 are both greater than half the distance D between the upstream edge Pu3 and downstream edge Pd3 of the mark PM3 in the conveying direction.

In relation to this mark PM3, the slit S2 corresponds to the first slit in the claims, and the sides Sa2, Sb2, Sc2, and Sd2 of the slit S2 correspond to the first side, second side, third side, and fourth side, respectively. Similarly, the slit S3 corresponds to the second slit in the claims, and the sides Sa3, Sb3, Sc3, and Sd3 of the slit S3 correspond to the fifth side, sixth side, seventh side, and eighth side, respectively. The print label L2 corresponds to the first print label, and the print label L3 corresponds to the second print label.

<Separating Print Labels by Peeling>

Figure 3A:
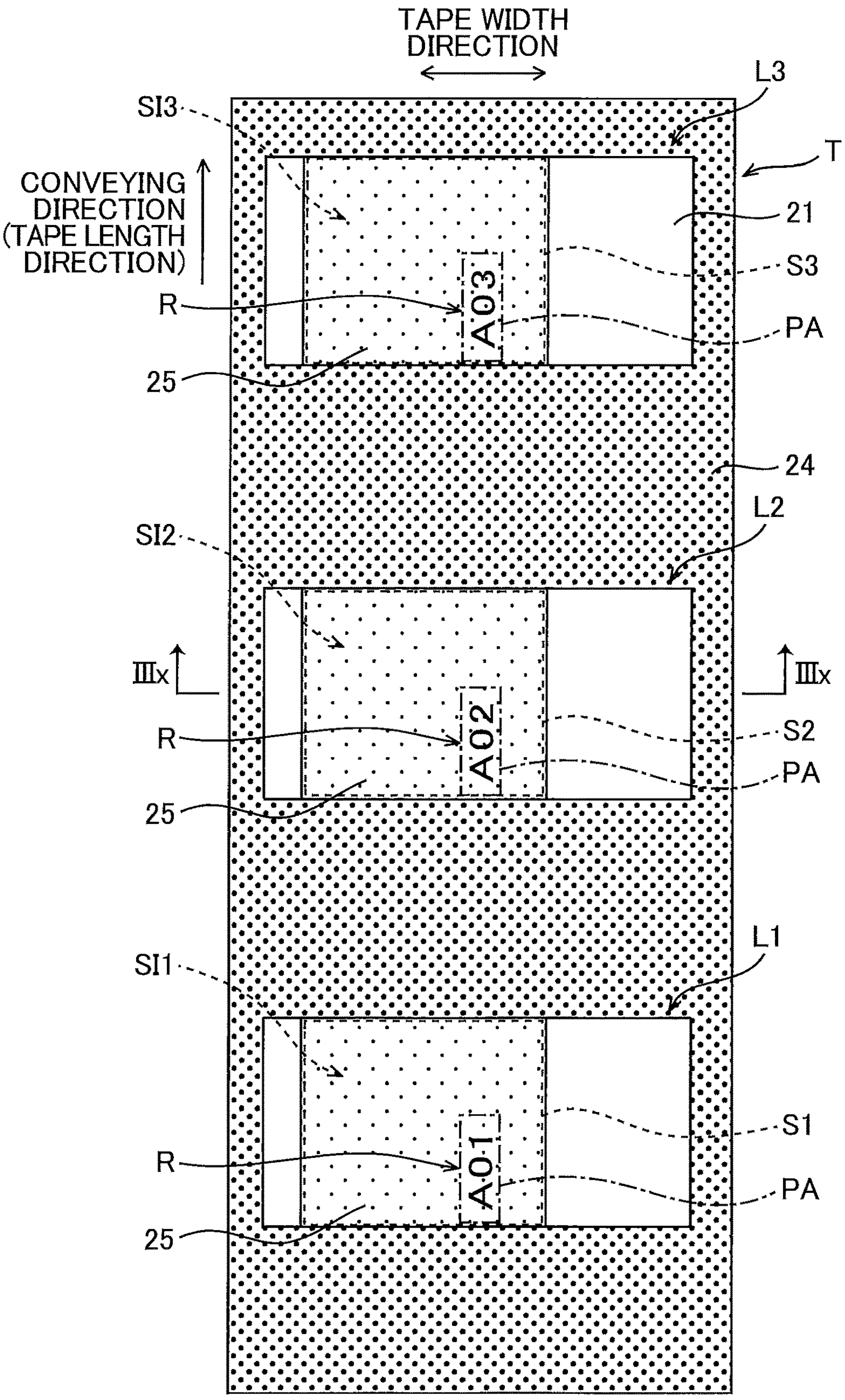
FIG. 3A is a plan view showing the printed printing tape.
Figure 3B:
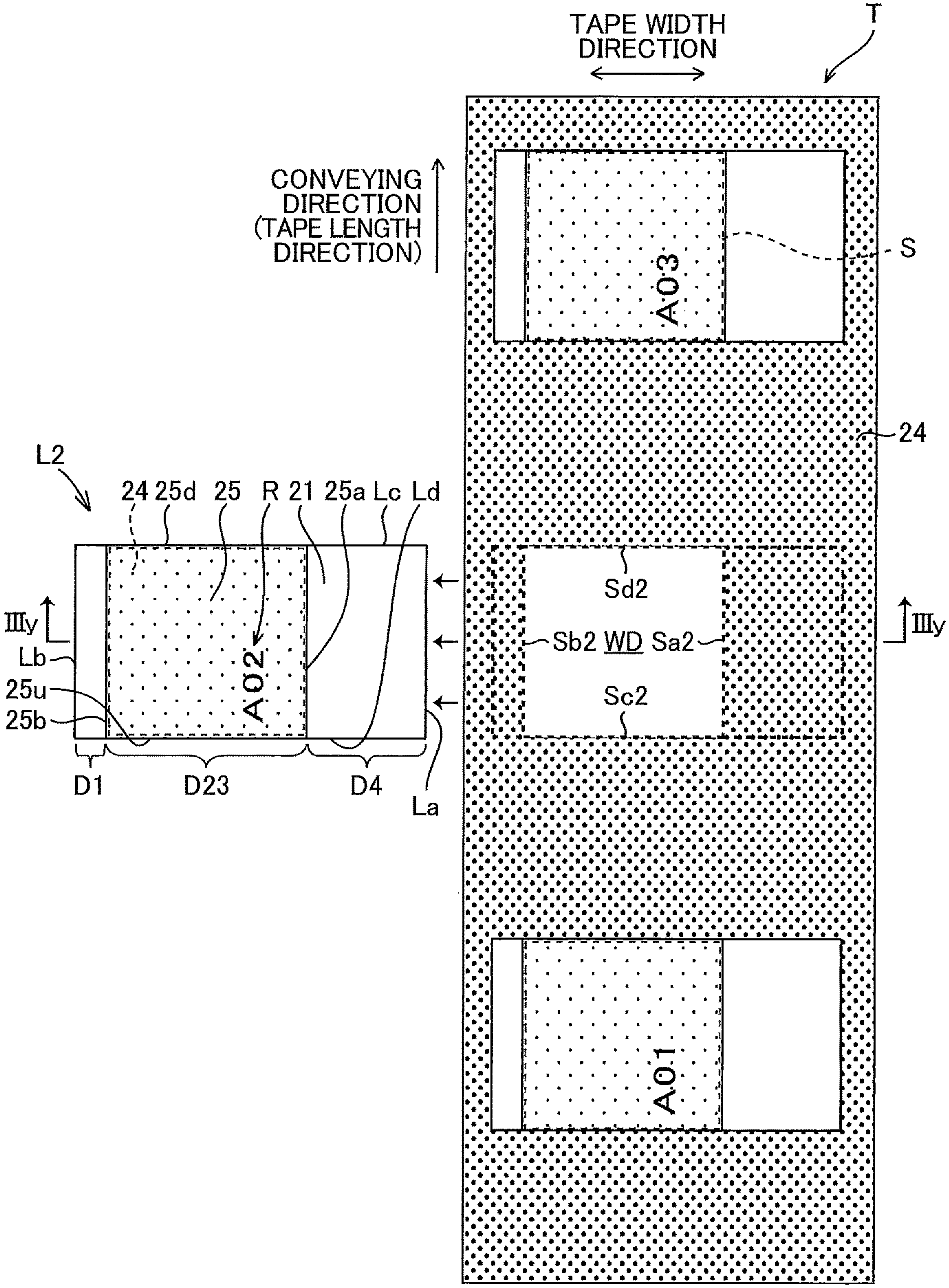
FIG. 3B is a plan view showing a state of the printed printing tape after single print label has been peeled off.
Figure 3C:
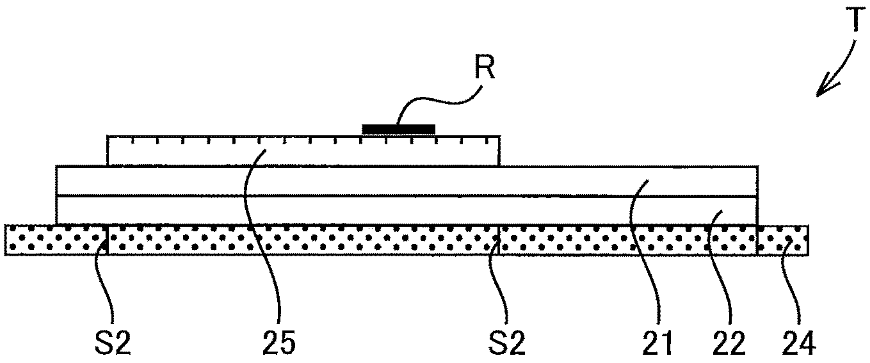
FIG. 3C is a cross-sectional view taken along a section IIIx-IIIx of the structure shown in FIG. 3A.
Figure 3D:
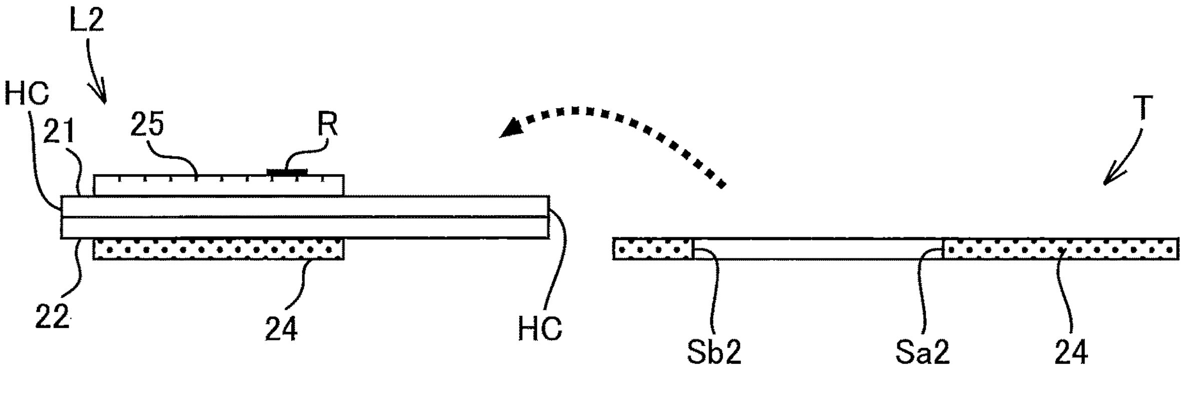
FIG. 3D is a cross-sectional view taken along a section IIIy-IIIy of the structure shown in FIG. 3B.

With the printing tapes To and T described above, first the excess label portion LB is separated from the main label parts Lo and the release material layer 24 (see FIGS. 2B and 3A) by peeling the excess label portion LB from the top surface of the release material layer 24, as shown in FIG. 2A. Note that a printing tape To may be provided with an initial configuration that omits the excess label portion LB from FIG. 2A (i.e., a configuration that omits printed images R from FIG. 2B). Next, owing to the square-shaped slits S provided in the release material layer 24 in advance, each print label L included on the printing tape T and having a printed image R formed on the print background layer 25 as described above can be peeled off while leaving the square-shaped portion of the release material layer 24 located inside the slit S (the portion included in the slit inner area SI) on the adhesive layer 22 side (i.e., with the square-shaped portion covering the adhesive layer 22), as shown in FIG. 3B. In the following description, this peeled off portion will simply be called the "print label L" for convenience. After the print label L has been peeled off, a space (a window WD) will remain in the strip-like release material layer 24 inside the rectangular slit S, as illustrated in FIG. 3B.

Note that the print background layer 25 may be smaller than the slit inner area SI enclosed by the slit S. More specifically, the sides Sc1, Sc2, and Sc3 of the slits S1, S2, and S3 may be offset toward the side Ld of the main label part Lo rather than the side Lc of the main label part Lo, and sides Sd1, Sd2, and Sd3 of the slits S1, S2, and S3 may be offset toward the side Lc of the main label part Lo rather than the side Ld of the main label part Lo.

<Print Label>

Next, the structure of the print label L generated as described above will be described with reference to FIGS. 4A and 4B. FIG. 4A shows a plan view of one print label L2 separated as described above, and FIG. 4B shows a cross-sectional view along the section IVB-IVB in FIG. 4A.

Figure 4B:
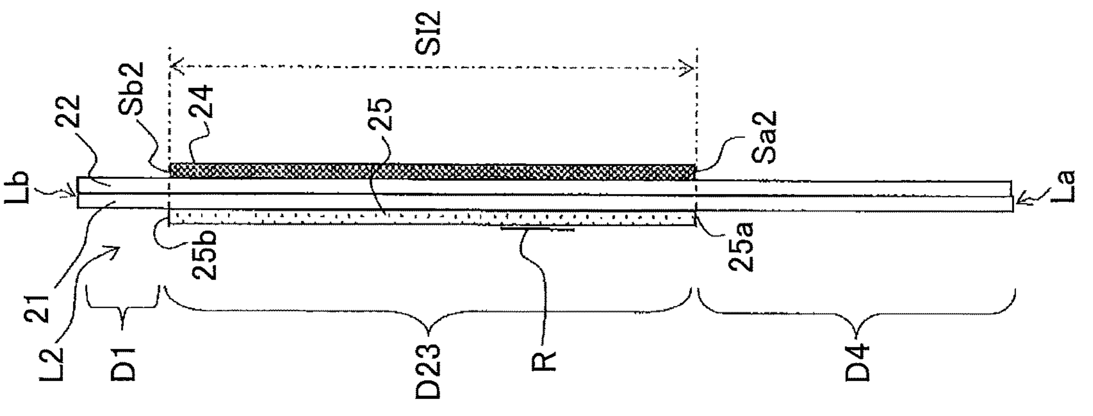
FIG. 4B is a cross-sectional view taken along a section IVB-IVB shown in FIG. 4A.
Figure 4A:
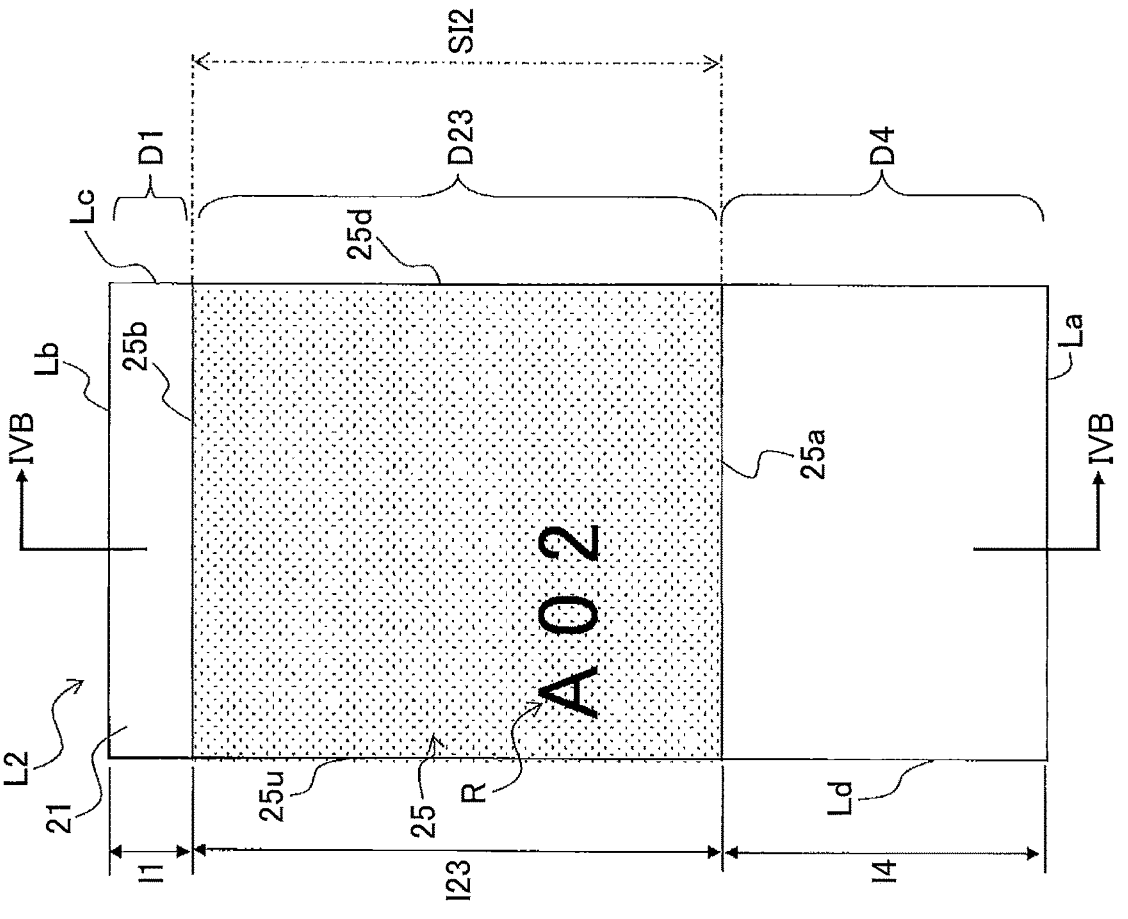
FIG. 4A is a plan view showing the print label.

As with the printing tape T described earlier, the print label L (the print label L2 shown in FIGS. 4A and 4B) has the transparent base layer 21, the transparent adhesive layer 22, and the release material layer 24 arranged in sequence along the thickness direction (the depth direction in FIG. 4A and the left-right direction in FIG. 4B) from the left side to the right side in FIG. 4B. The print background layer 25 having the printed image R is partially provided on the second side surface of the base layer 21 relative to the thickness direction. The print label L is provided with the adhesive area D1, non-adhesive area D23, and adhesive area D4 described above toward one side in the tape width direction.

In the adhesive area D1, the base layer 21 and adhesive layer 22 are layered in order from the second side toward the first side of the thickness direction (from the left side to the right side in FIG. 4B). Thus, the entire region of the adhesive area D1 is provided with an adhesive property owing to the adhesive layer 22. Note that the adhesive area D1 is provided with a length 11 in the tape width direction.

In the non-adhesive area D23, the print background layer 25 provided with the printed image R, the base layer 21, the adhesive layer 22, and the release material layer 24 are layered in order from the second side toward the first side of the thickness direction (from the left side to the right side in FIG. 4B). Thus, the entire area of the non-adhesive area D23 is non-adhesive, as the adhesive property of the adhesive layer 22 is inhibited by the release material layer 24. In this example, the print background layer 25 is formed by applying ink (an ink coating layer) of a suitable color (a light transmissive color in this example, including transparent colors) on the base layer 21, and the print head 7 forms the printed image R, which is the text "A01," as described above. The non-adhesive area D23 has a length 123 in the tape width direction.

In the adhesive area D4, the base layer 21 and adhesive layer 22 are layered in order from the second side toward the first side of the thickness direction (from the left side to the right side in FIG. 4B). Thus, the entire area of the adhesive area D4 is provided with an adhesive property through the adhesive layer 22. The adhesive area D4 has a length 14 in the tape width direction.

<Procedure for Attaching a Print Label to an Object>

Figure 5C:
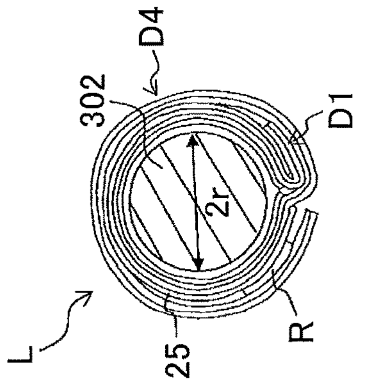
FIGS. 5A through 5C are explanatory diagrams showing a procedure for attaching the print label to an object.
Figure 5B:
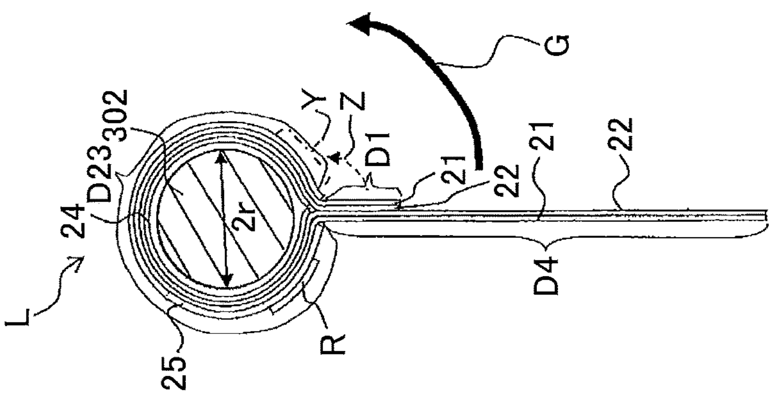
Figure 5A:
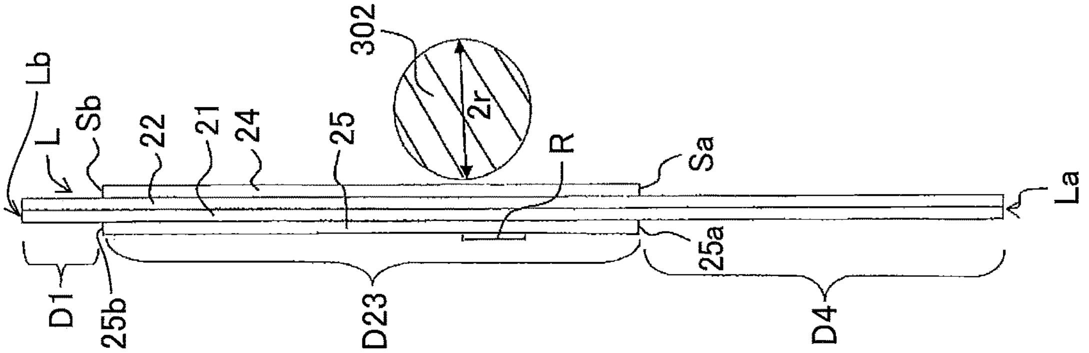

FIGS. 5A through 5C show a sample procedure for attaching the print label L to an object. In the example of FIGS. 5A through 5C, the print label L is attached by wrapping the print label L around a cable-like (i.e., columnar-shaped) object 302 (hereinafter simply called a "cable 302" for convenience) having a diameter 2*r*.

As shown in FIG. 5A, the print label L extends in the order: adhesive area D1→non-adhesive area D23 covered by the separated release material layer 24→adhesive area D4. (In other words, the adhesive layer 22 of the print label L is exposed in the adhesive areas D1 and D4, which are not covered by the release material layer 24.) First, the adhesive area D1 and non-adhesive area D23 of the print label L are bent into a concave shape (not illustrated) so that the release material layer 24 side (the right side in FIG. 5A) is on the inside.

Next, the cable 302 is placed on the inside of the concave-shaped print label L, and the print label L is wrapped once around the cable 302 to form a cylindrical body encircling the cable 302, as shown in FIG. 5B. Subsequently, the adhesive layer 22 on the adhesive area D1 positioned on the distal end and the adhesive layer 22 on the adhesive area D4 are bonded together while aligning the positions of the two adhesive layers 22 in the tape width direction (also known as butt-sealing). At this time, the length of the release material layer 24 in the tape width direction is at least greater than or equal to the circumference 22πr of the cable 302. As a result, the print label L can be attached to the cable 302 so as to be rotatable about the same by wrapping the non-adhesive area D23 of the print label L around the cable 302 so that the print label L is in a non-adhering state, while fixing the shape of the print label L itself by bonding the two adhesive layers 22 together. Hence, by leaving a portion of the release material layer 24 on the main label part Lo when the release material layer 24 is peeled off, the adhesive layer 22 of the print label L can be prevented from becoming fixed to the cable 302.

Thereafter, the remaining portion of the adhesive area D4 that was not used in the structure encircling the cable 302 is wrapped in the direction of the arrow G indicated in FIG. 5B so that the bonded portion of the adhesive area D1 and adhesive area D4 are on the inside (for example, the adhesive area D1 contacts a back-fold region Y, as indicated by an arrow Z). At this time, the adhesive area D4 is wrapped around the outer circumferential portion of the non-adhesive area D23 while covering the non-adhesive area D23 that constitutes the cylindrical body (see FIG. 5C). Thus, by using the adhesive property of the adhesive layer 22 to affix the adhesive area D4 to the outer circumferential portion of the non-adhesive area D23, the operation for attaching the print label L to the cable 302 is complete.

<Sample Application for the Print Label>

Figure 6:
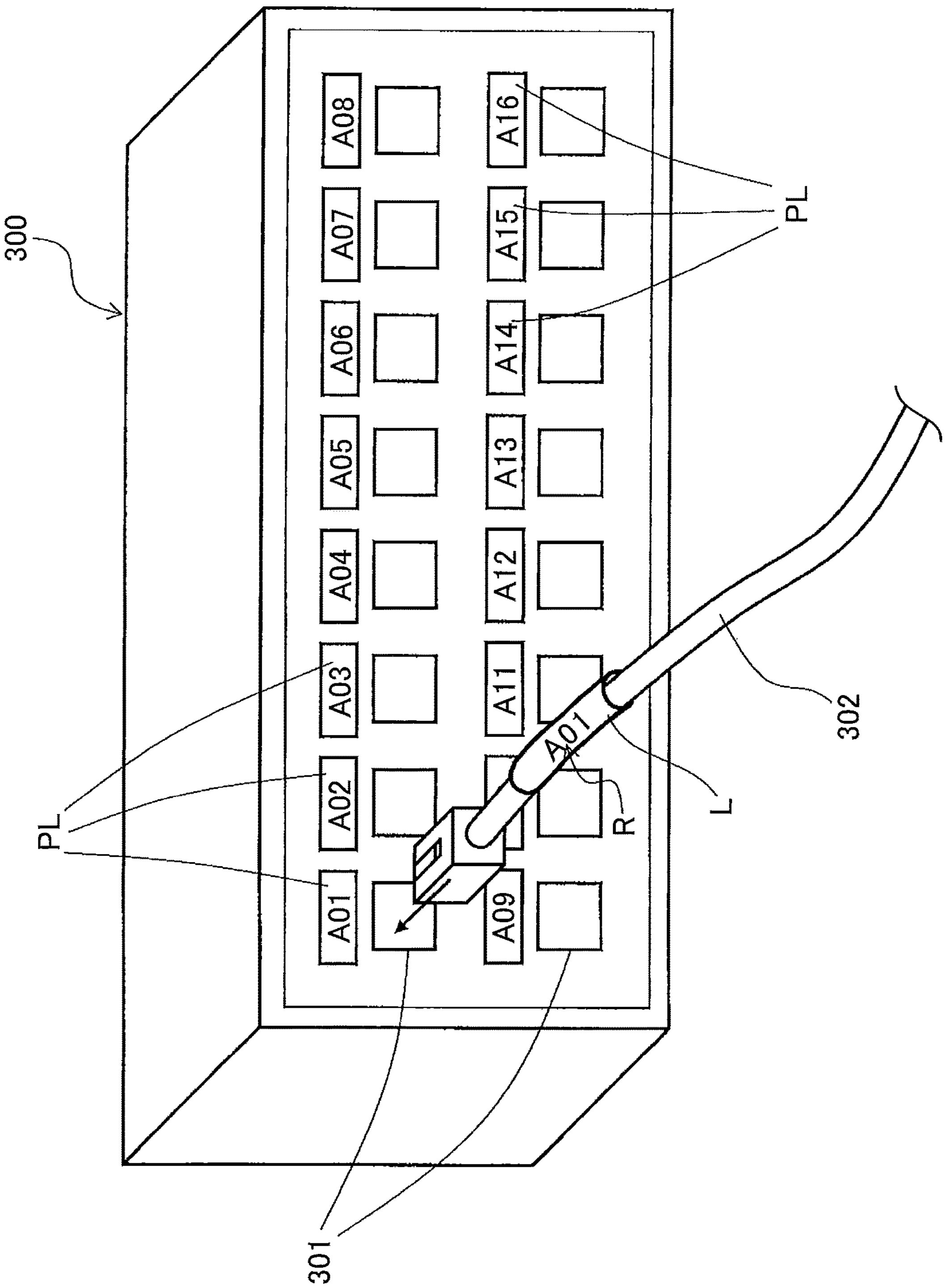
FIG. 6 is a perspective view showing a sample application of the print label.

FIG. 6 shows a sample application of the print label L described above. In this example, a cable for use with a switching hub that relays information over a network, such as a wired LAN, is applied as the cable 302. The switching hub 300 in FIG. 6 has eight slots 301 in each of a top row and a bottom row (a total of sixteen slots).

In the example of the drawing, plates PL indicating the ID names "A01" through "A08" are provided in sequence from the left to correspond to the eight slots 301 in the top row, and plates PL indicating the ID names "A09" through "A16" are provided in sequence from the left to correspond to the eight slots 301 in the bottom row.

The cable 302 must be appropriately connected to the corresponding slot 301. To facilitate connections, the print label L described above is mounted on the end of each cable 302 that is to be inserted into one of the slots 301, and the printed image R formed on each print label L has the same content as the ID name for the slot 301 to which the cable 302 is to be connected. In other words, a print label L printed with the same text as the ID name on the plate PL of the slot 301 to which the cable 302 is to be connected is affixed to the cable 302. This clarifies the correlations between slots 301 and cables 302 that are to be connected to the slots 301, thereby preventing incorrect wiring.

Figure 7A:
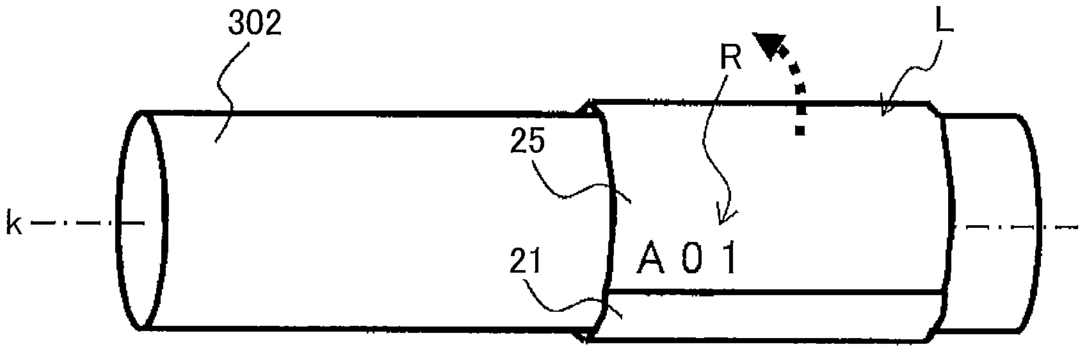
FIGS. 7A and 7B are schematic diagrams showing an attached state of the print label on a cable.
Figure 7B:
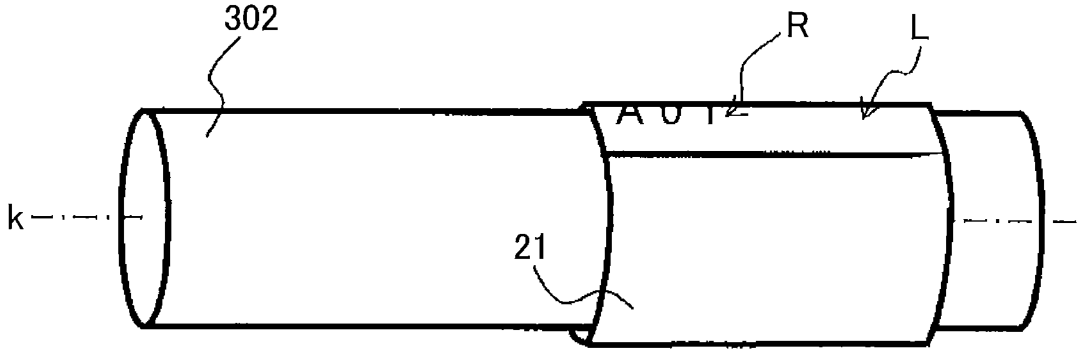

FIGS. 7A and 7B schematically show the attached state of the print label L on the cable 302. An axial center k of the cable 302 is also indicated in the drawing. According to the structure described above, the print label L is affixed to the cable 302 constituting the object so as to be rotatable about the cable 302. In the sample state shown in FIG. 7A, the print background layer 25 is arranged such that the printed image R of "A01" provided on the print background layer 25 is facing the viewer of the drawing. Although the transparent adhesive area D4 is actually present so as to cover the outer circumferential side of the non-adhesive area D23, as depicted in FIG. 5C, the adhesive area D4 has been omitted from FIG. 7A and FIG. 7B described later to prevent complicating the diagram and to facilitate understanding. The print label L can be shifted to the orientation shown in FIG. 7B by rotating the print label L in the direction of the dashed arrow (i.e., a circumferential direction) from the state shown in FIG. 7A. Similarly, if the printed image R is not easily readable when the print label L is fixed to the cable 302 in the position shown in FIG. 7B, the print label L is rotatable as described above owing to the release material layer 24. Accordingly, by rotating the print label L in the direction opposite that described above to the position shown in FIG. 7A, the printed image R can be made visible.

Principal Parts of the Embodiment

As described above in the present embodiment, the mark PM disposed on the release material layer 24 between neighboring slits S and S is provided in a position separated by gaps from the slits S and S (separated by respective distances 1*p* and 1*q* in the example described above). This improvement in detection precision, which is a principal part of the present embodiment, will be described in FIGS. 8A through 8C, FIGS. 9A through 9C, and FIGS. 10A through 10D using a comparative example.

Comparative Example

As a comparative example, the mark PM may be provided to fill the entire region between two neighboring slits S1 and S2, for example. In this case, as illustrated in FIG. 8A, the mark PM2 is provided to be adjacent to both the side Sd1 of the slit S1 and the side Sc2 of the slit S2, and the mark PM3 is provided to be adjacent to both the side Sd2 of the slit S2 and the side Sc3 of the slit S3.

Figure 8A:
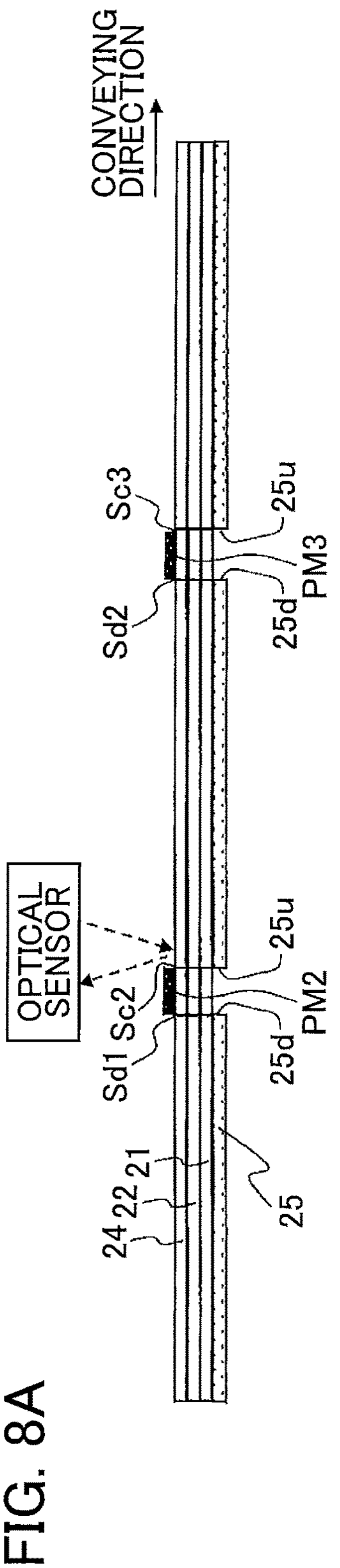
FIGS. 8A through 8C are explanatory diagrams showing behavior in position detections with an optical sensor according to a comparative example in which each mark is provided to fill the entire region between two neighboring slits.

As shown in FIG. 8A, during positioning control when light is emitted from the light-emitting unit of the optical sensor, the emitted light is reflected off the surface of the release material layer 24 and received by the light-receiving unit of the optical sensor. Accordingly, the sensor signal outputted from the optical sensor is in the ON state (a high signal, for example).

Figure 8B:
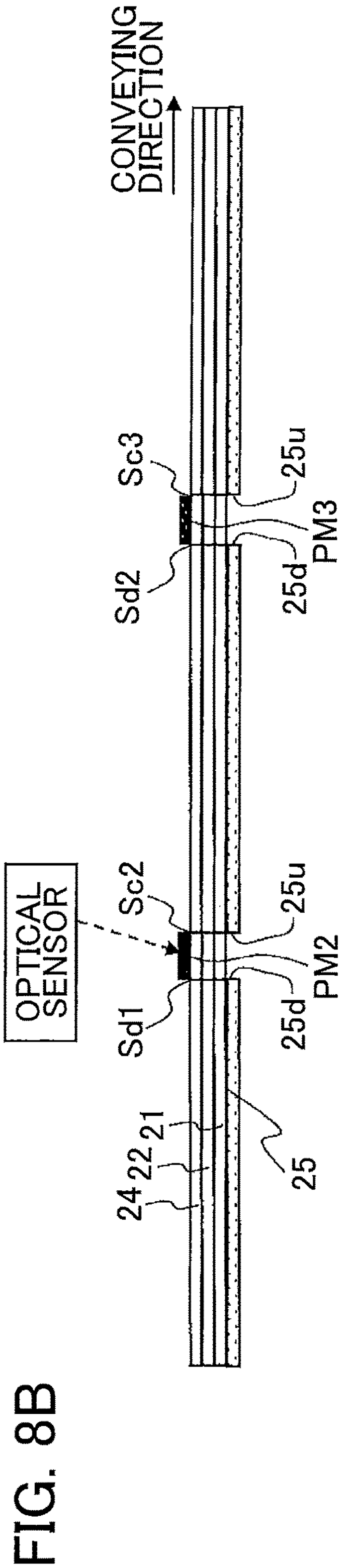

As conveyance advances from the state shown in FIG. 8A to the state shown in FIG. 8B, for example, light emitted from the light-emitting unit of the optical sensor is absorbed by the mark PM provided on the release material layer 24 (the mark PM2 in this example) and is not reflected. As a result, the sensor signal changes from the ON state described above to an OFF state (a low signal, for example).

Figure 8C:
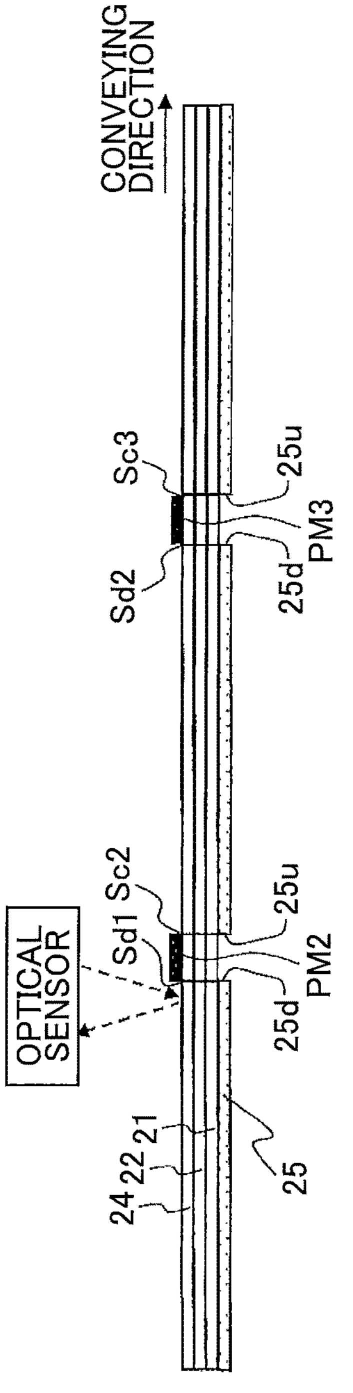

Thereafter, as conveyance further advances from the state shown in FIG. 8B to the state shown in FIG. 8C, for example, light emitted from the light-emitting unit is reflected by the release material layer 24 and received by the light-receiving unit, as in FIG. 8A, and the sensor signal changes again to the ON state (a high signal, for example).

In this way, a mark PM is detected based on the ON state→OFF state→ON state transition of the sensor signal during conveyance (i.e., based on the difference in quantity of light received in portions of the release material layer 24 where a mark PM is provided and other portions), and the printing tape To is positioned based on this detection. That is, the optical sensor accurately captures light reflected off the mark PM, enabling accurate positioning control of the printing tape To, provided that the entire printing tape To is flat (unlike in FIGS. 9A through 9C and FIGS. 10A through 10D described later).

Figure 9A:
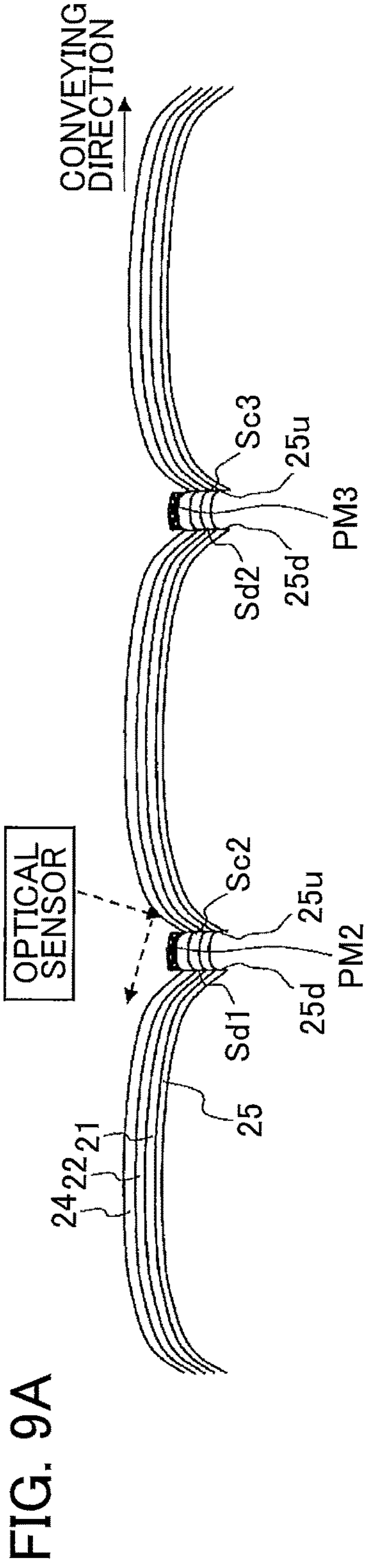
FIGS. 9A through 9C are explanatory diagrams showing behavior in position detections with the optical sensor when the printing tape is conveyed in a curved state according to a procedure of the comparative example.
Figure 9B:
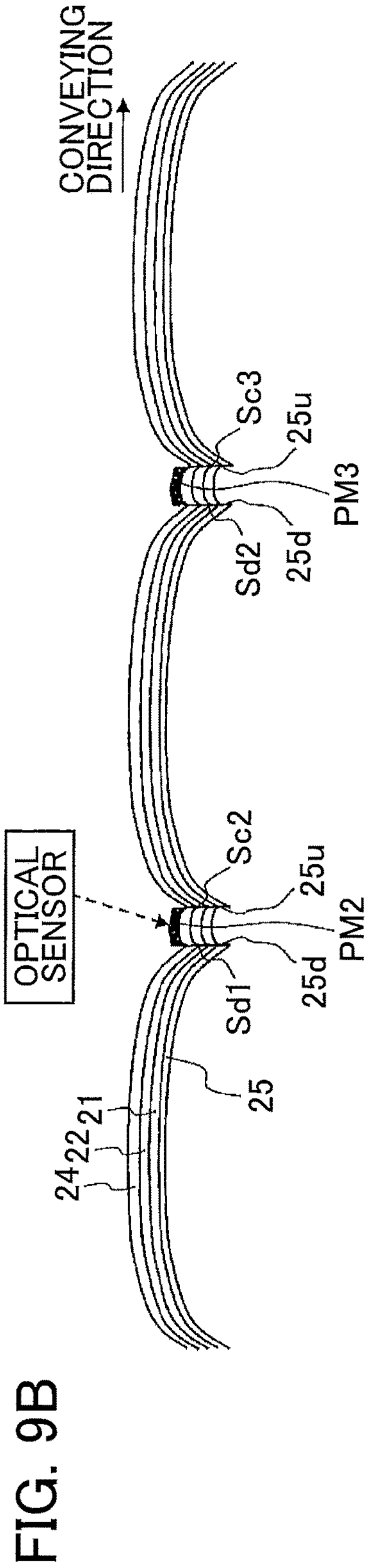
Figure 9C:
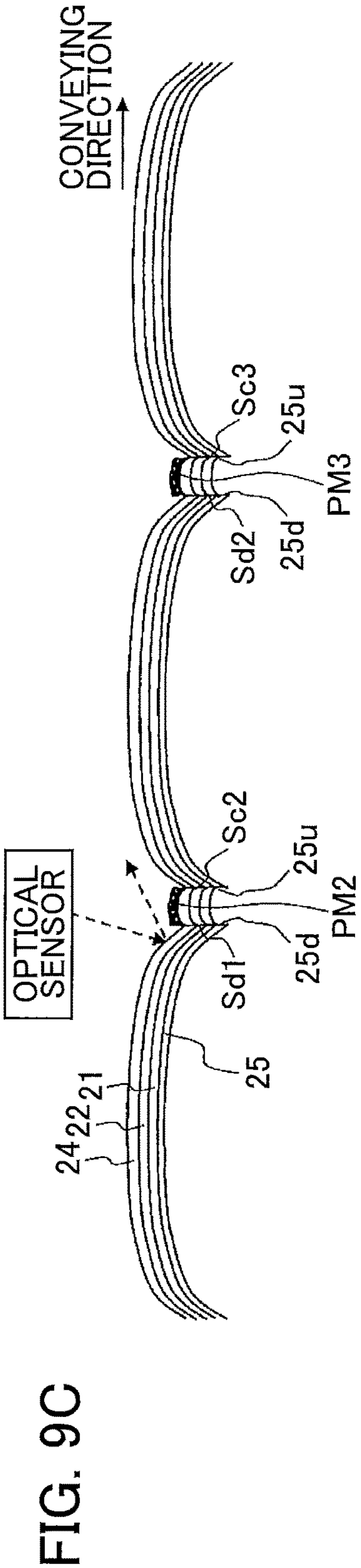

As described above, the printing tape To is constructed of slits S and marks PM provided on the first side surface of the release material layer 24 relative to the thickness direction, and print labels L having a degree of thickness provided on the second side surface relative to the thickness direction, i.e., the surface on the opposite side. Thus, during actual conveyance, as illustrated in FIGS. 9A through 9C, areas on the first side surface of the release material layer 24 relative to the thickness direction that are inside slits S (that is, from the side Sc1 to the side Sd1 of the slit S1 in the conveying direction, from the side Sc2 to the side Sd2 of the slit S2 in the conveying direction, and from the side Sc3 to the side Sd3 of the slit S3 in the conveying direction) may protrude upward in convex shapes, while the second side surface thereof relative to the thickness direction, i.e., the back side on which the print background layer 25 is provided, forms concave shapes. Thus, the overall printing tape To may be conveyed in a curved state. (Note that, if the tape roll 10A is formed by winding the printing tape To so that its front and back surfaces are reversed, the inner areas of slits S will conversely form concave shapes, while the surfaces of print background layers 25 form convex shapes.) In this case, a mark PM becomes positioned across the entire flat portion remaining between convex shapes corresponding to two neighboring print background layers 25.

In the state shown in FIG. 9A, which corresponds to FIG. 8A described above, light emitted from the light-emitting unit of the optical sensor is reflected off the top surface of the release material layer 24, as in the first example. However, since the release material layer 24 is curved in a convex shape, as described above, and the curvature is particularly large near the mark PM, the reflected light is not directed toward the optical sensor and not received by the light-receiving unit (see the dashed arrow). Consequently, the sensor signal outputted from the optical sensor is in an OFF state (a low signal, for example).

As conveyance subsequently advances to the state shown in FIG. 9B, corresponding to FIG. 8B described above, light emitted from the light-emitting unit reaches the mark PM on the release material layer 24 (the mark PM2 in the example of the drawing) provided in a non-curved area (i.e., a flat area). However, since the light is absorbed by the mark PM, as described above, the sensor signal remains in the OFF state (a low signal, for example).

As conveyance further advances from the state in FIG. 9B to the state in FIG. 9C, for example, as in the case of FIG. 9A, light emitted from the light-emitting unit is reflected off the release material layer 24, but the reflected light is not received by the light-receiving unit since the release material layer 24 has a curved shape (see the dashed arrow). As a result, the sensor signal outputted from the optical sensor remains in the OFF state (a low signal, for example).

Owing to the effects of the curved shape described above, marks PM on the release material layer 24 can be difficult to discern because the optical characteristics (the ON/OFF state of the sensor signal corresponding to light reflectance in this example) in areas of the release material layer 24 near the marks PM (for example, near the sides Sd1 and Sc2 and near the sides Sd2 and Sc3) approach the optical characteristics of the mark PM in the flat areas. This situation may give rise to erroneous detections of marks PM or the like, which may reduce the precision of positioning control.

Features of the Embodiment

Therefore, by arranging the marks PM as described above in the present embodiment, a drop in positioning accuracy caused by erroneous detections and the like can be suppressed, even when the printing tape To is conveyed in a curved state, as described above.

That is, as described above in the present embodiment, the mark PM2 is arranged so that the position of the upstream edge Pu2 in the conveying direction is downstream from the side Sd1 of the slit S1, and the downstream edge Pd2 of the mark PM2 in the conveying direction is upstream from the side Sc2 of the slit S2. In other words, the mark PM2 is disposed in a position separated from the slits S1 and S2 (see FIG. 2C). As a result, the mark PM2 is provided on part of the flat portion between the slits S1 and S2, as illustrated in FIG. 10A, while the remaining area is simply a flat portion F (hereinafter called a "non-mark part F") in which the mark PM2 is not present (see FIGS. 10B through 10D).

Similarly, the position of the upstream edge Pu3 of the mark PM3 in the conveying direction is downstream from the side Sd2 of the slit S2, and the position of the downstream edge Pd3 of the mark PM3 in the conveying direction is upstream from the side Sc3 of the slit S3. In other words, the mark PM3 is disposed in a position separated from the slits S2 and S3 (see FIG. 2C). As a result, the mark PM3 is similarly provided on part of the flat portion between the slits S2 and S3, as illustrated in FIG. 10A, while the remaining portion constitutes the non-mark part F in which the mark PM3 is not present (see FIGS. 10B through 10D).

The following is a description of sample behavior in optical detections in the present embodiment according to the structure described above.

Figures 10A, 10B, 10C, 10D:
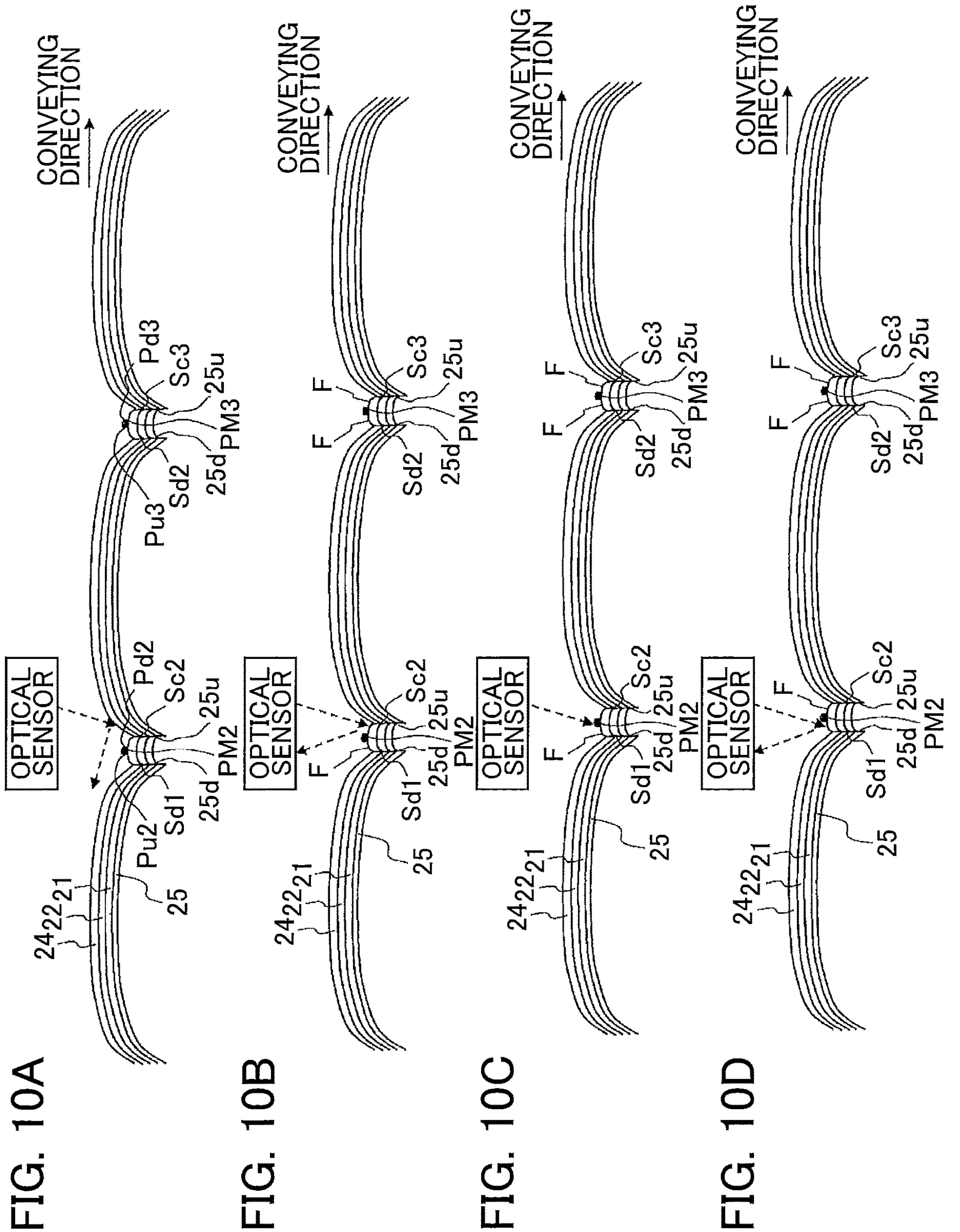
FIGS. 10A through 10D are explanatory diagrams showing behavior in position detections with the optical sensor when the printing tape is conveyed in a curved state according to a procedure of the present embodiment.

For example, in the state of FIG. 10A, as in the corresponding state of FIG. 9A, light emitted from the light-emitting unit of the optical sensor is reflected off the curved shape of the release material layer 24 and is not received by the light-receiving unit of the optical sensor (see the dashed arrow). As a result, the sensor signal outputted from the optical sensor is in the OFF state (a low signal, for example).

Subsequently, as conveyance advances to the state shown in FIG. 10B, light from the light-emitting unit reaches the non-mark part F, which does not have a curved shape. Since the mark PM is not provided in this portion, as described above, the emitted light is reflected off the surface of the non-mark part F and the reflected light is received by the light-receiving unit of the optical sensor. Accordingly, the sensor signal outputted from the optical sensor switches to the ON state (a high signal, for example).

Thereafter, as conveyance advances to the state shown in FIG. 10C, which is similar to the state in FIG. 9B described above, light from the light-emitting unit reaches the mark PM in the flat portion of the release material layer 24 (the mark PM2 in this example). The light is absorbed by the mark PM and the sensor signal changes to an OFF state (a low signal, for example).

Thereafter, as conveyance advances to the state shown in FIG. 10D, light from the light-emitting unit again reaches the non-mark part F, which does not have a curved shape. As a result, the emitted light is reflected off the surface of the non-mark part F and is received by the light-receiving unit. The sensor signal from the optical sensor changes again to an ON state (a high signal, for example).

Hence, a mark PM is detected based on the ON state→OFF state→ON state→OFF state→ . . . transition of the sensor signal during conveyance (in other words, based on the difference in the quantity of light received between the part of the flat portion of the release material layer 24 in which the mark PM is present and the remaining non-mark parts F), and the printing tape To is positioned based on these detections. As a result, even if the portions of the curve-shaped release material layer 24 near the mark PM2 (portions near the side Sd1 of the slit S1 and near the side Sc2 of the slit S2) approach the optical characteristics of the mark PM2 (the OFF state of the sensor signal) as described above, the mark PM2 can be easily discerned according to the optical characteristics (an ON state of the sensor signal that differs in magnitude from the mark PM2) of the non-mark parts F present between these two portions and the mark PM2 (see FIG. 2C).

Similarly, even if the portions of the curve-shaped release material layer 24 near the mark PM3 (portions near the side Sd2 of the slit S2 and near the side Sc3 of the slit S3) approach the optical characteristics of the mark PM3 (the OFF state of the sensor signal), the mark PM3 can easily be discerned based on the optical characteristics (an ON state of the sensor signal that differs in magnitude from the mark PM3) of the non-mark parts F, F present between these two portions and the mark PM3.

Effects of the Embodiment

In the embodiment described above, the mark PM2 on the release material layer 24 has an upstream edge Pu2 in the conveying direction positioned downstream from the side Sd1 of the corresponding slit S1, and a downstream edge Pd2 in the conveying direction positioned upstream from the side Sc2 of the slit S2. (In other words, the mark PM2 is disposed at a position separated from the slits S1 and S2.) Similarly, the mark PM3 has an upstream edge Pu3 in the conveying direction positioned downstream from the side Sd2 of the corresponding slit S2, and a downstream edge Pd3 in the conveying direction positioned upstream from the side Sc3 of the slit S3. (In other words, the mark PM3 is disposed at a position separated from the slits S2 and S3.) This configuration can suppress a drop in positioning precision caused by incorrect detections of the marks PM2 and PM3 or the like, even when conveying the printing tape To in the curved state described above, as illustrated in FIGS. 10A through 10D.

A particular feature in the present embodiment is that the distance 1*p* between the upstream edge Pu2 of the mark PM2 and the side Sd1 of the slit S1, and the distance 1*q* between the downstream edge Pd2 of the mark PM2 and the side Sc2 of the slit S2 are both greater than half the distance D between the upstream edge Pu2 and downstream edge Pd2 of the mark PM2 in the conveying direction. Similarly, the distance 1*p* between the upstream edge Pu3 of the mark PM3 and the side Sd2 of the slit S2, and the distance 1*q* between the downstream edge Pd3 of the mark PM3 and the side Sc3 of the slit S3 are both greater than half the distance D between the upstream edge Pu3 and downstream edge Pd3 of the mark PM3 in the conveying direction. With this configuration, the mark PM2 can be sufficiently separated from the slit S1 and the slit S2, the mark PM3 can be sufficiently separated from the slit S2 and the slit S3, and the non-mark parts F (also see FIG. 2C) can be easily identified, thereby suppressing a drop in positioning precision.

<Variations>

The present embodiment described above is not limited to the modes described above but may be modified in various ways without departing from the spirit and technical concepts of the disclosure. Such variations will be described below. In each of the following variations, parts equivalent to those in the present embodiment will be designated with the same reference numerals, and duplicate descriptions will be omitted or simplified as appropriate.

(1) Providing Wide Marks that Exceed the Regions Between Slits

As shown in FIGS. 11A through 11E, FIGS. 12A through 12D, and FIGS. 13A and 13B that correspond to FIGS. 2A through 2E, FIGS. 3A through 3D, and FIGS. 4A and 4B, marks PM are provided to exceed the dimensions of regions between neighboring slits S and S in the tape length direction. In other words, the mark PM2 is disposed so as to expand beyond an area AR12 between the neighboring slits S1 and S2, and the mark PM3 is disposed so as to expand beyond an area AR23 between the neighboring slits S2 and S3. The areas AR12 and AR23 between two neighboring slits S will be simply called the "areas AR" or "inter-slit areas AR" for convenience when not distinguishing among them. Here, the dimensions of the marks PM2 and PM3 in the tape width direction are equivalent to the dimensions of the corresponding slits S2 and S3 (i.e., the print background layers 25) in the tape width direction. Further, the mark PM1 is disposed so as to extend on the other side of the slit S1 from the mark PM2 while maintaining the same dimension, and a mark PM4 is disposed so as to extend on the other side of the slit S3 from the mark PM3 while maintaining the same dimension.

That is, the upstream edge Pu2 of the mark PM2 in the conveying direction is positioned upstream from the side Sd1 of the slit S1, and the downstream edge Pd2 of the mark PM2 in the conveying direction is positioned downstream from the side Sc2 of the slit S2. In other words, the mark PM2 is arranged so as to extend from the interior of the slit S1 (passing through the flat portion described above) into the interior of the slit S2. As described above, D denotes the distance between the upstream edge Pu2 and downstream edge Pd2 of the mark PM2 in the conveying direction.

With respect to the mark PM2 in this variation, the slit S1 corresponds to the first slit in the claims, and the sides Sa1, Sb1, Sc1, and Sd1 of the slit S1 correspond to the first side, second side, third side, and fourth side, respectively. Similarly, the slit S2 corresponds to the second slit in the claims, and the sides Sa2, Sb2, Sc2, and Sd2 of the slit S2 correspond to the fifth side, sixth side, seventh side, and eighth side, respectively. Further, the print label L1 corresponds to the first print label, and the print label L2 corresponds to the second print label.

Further, the upstream edge Pu3 of the mark PM3 in the conveying direction is positioned upstream from the side Sd2 of the slit S2, and the downstream edge Pd3 of the mark PM3 in the conveying direction is positioned downstream from the side Sc3 of the slit S3. In other words, the mark PM3 is disposed so as to extend from the interior of the slit S2 (through the flat portion described above) into the interior of the slit S3. As described above, D denotes the distance between the upstream edge Pu3 and downstream edge Pd3 of the mark PM3 in the conveying direction.

As described above, with respect to the mark PM3 in this variation, the slit S2 corresponds to the first slit in the claims, and the sides Sa2, Sb2, Sc2, and Sd2 of the slit S2 correspond to the first side, second side, third side, and fourth side, respectively. Similarly, the slit S3 corresponds to the second slit in the claims, and the sides Sa3, Sb3, Sc3, and Sd3 of the slit S3 correspond to the fifth side, sixth side, seventh side, and eighth side, respectively. Further, the print label L2 corresponds to the first print label, and the print label L3 corresponds to the second print label.

Further, an upstream edge Pu4 of the mark PM4 in the conveying direction is positioned upstream from the side Sd3 of the slit S3, and a downstream edge Pd1 of the mark PM1 in the conveying direction is positioned downstream from the side Sc1 of the slit S1.

In this variation, the printing area PA is arranged near the center portion of the print background layer 25, as illustrated in FIGS. 11A through 11E, FIGS. 12A through 12D, and FIGS. 13A and 13B. In light of this, each mark PM is arranged so as not to overlap the printing area PA in the print background layer 25 of corresponding print label L in a plan view. That is, the mark PM1 does not overlap the printing area PA on the print label L1; the mark PM2 does not overlap the printing area PA on the print label L1 nor the printing area PA on the print label L2; the mark PM3 does not overlap the printing area PA on the print label L2 nor the printing area PA on the print label L3; and the mark PM4 does not overlap the printing area PA on the print label L3.

Figure 11A:
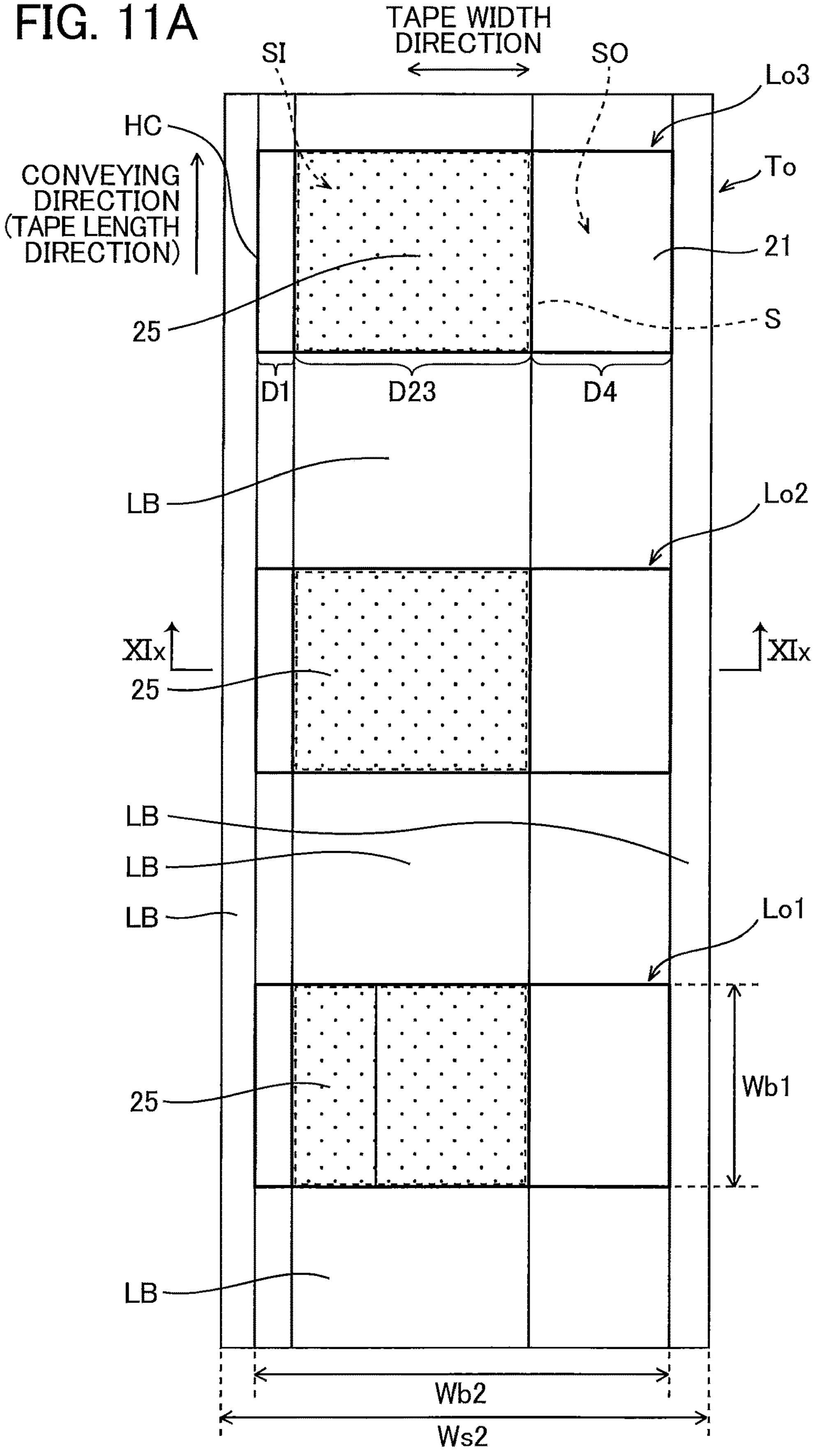
FIG. 11A is a plan view showing a printing tape in an imprinted state according to a variation providing wide marks that exceed regions between slits.
Figure 11B:
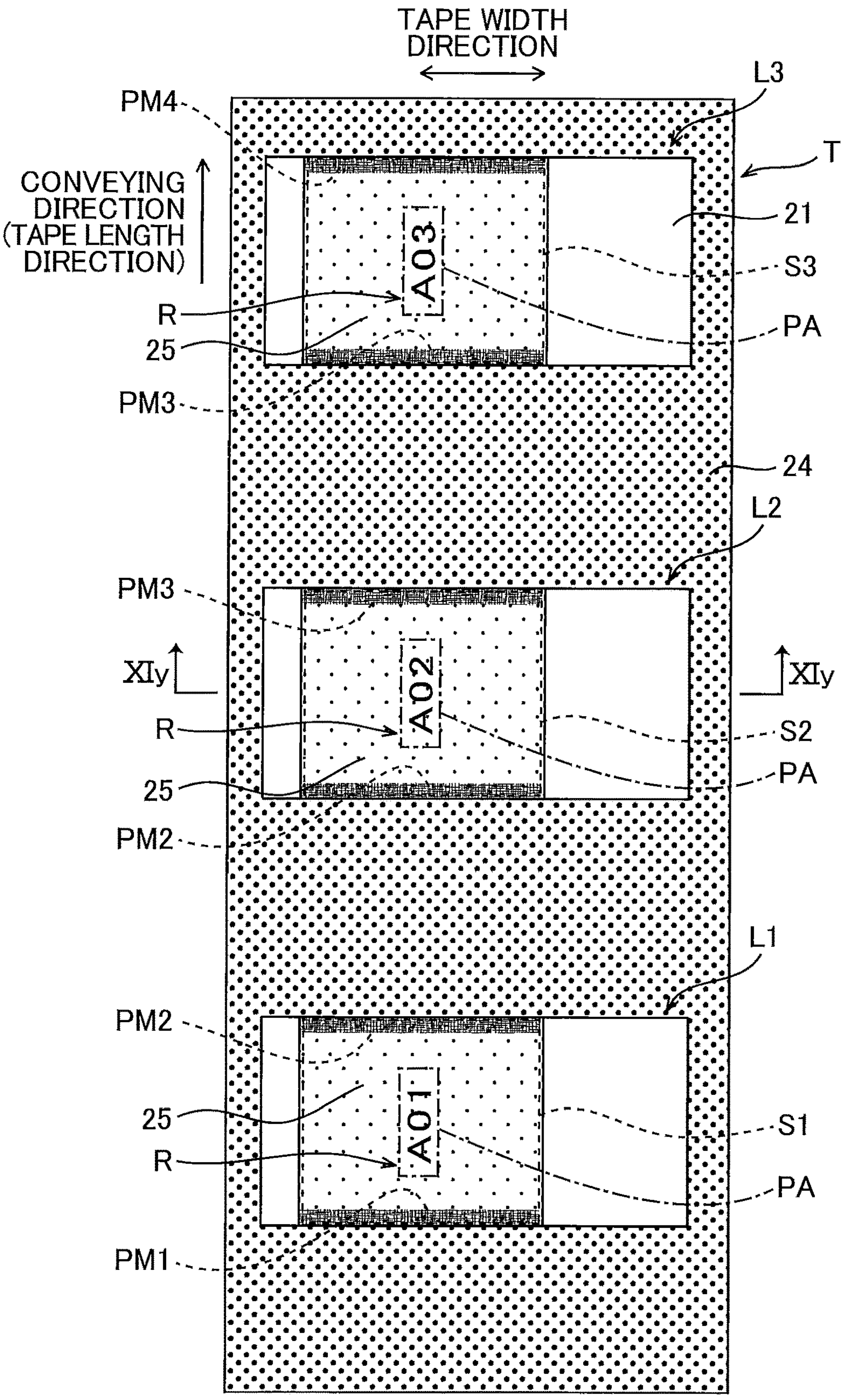
FIG. 11B is a plan view showing a printed printing tape after an excess label portion has been peeled off.
Figure 11C:
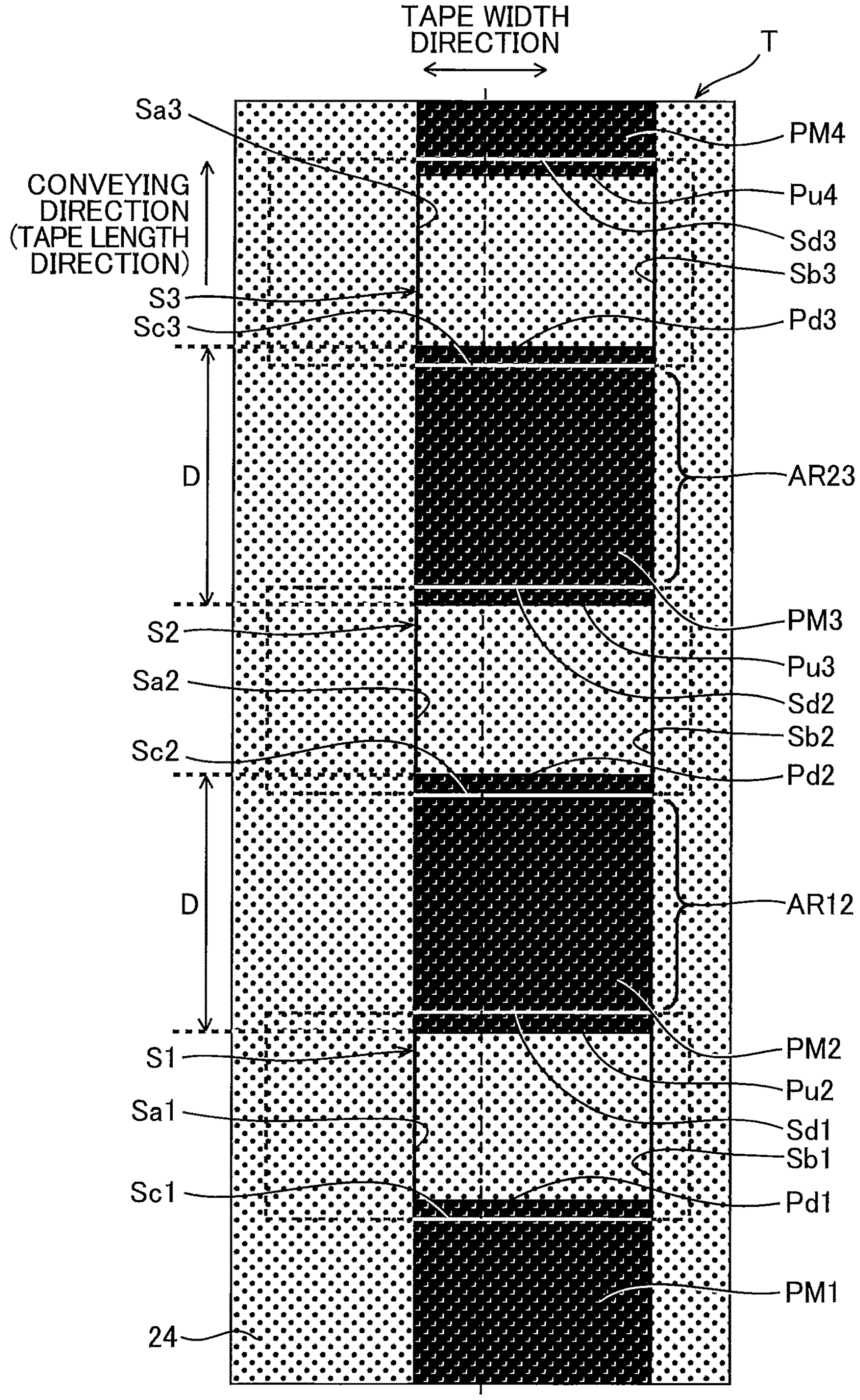
FIG. 11C is a rear view showing the printed printing tape.
Figure 11D:
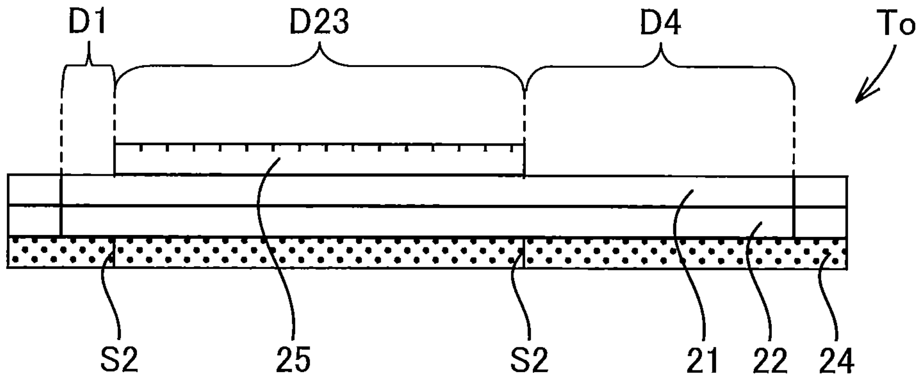
FIG. 11D is cross-sectional view taken along a section XIx-XIx of the structure shown in FIG. 11A.
Figure 11E:
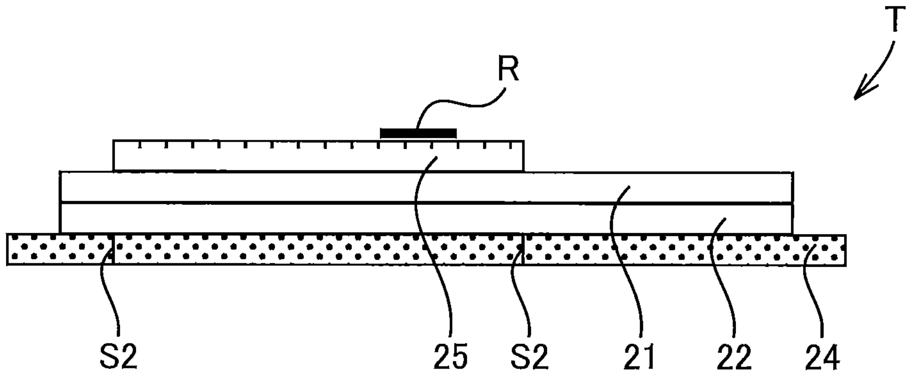
FIG. 11E is a cross-sectional view taken along a section XIy-XIy of the structure shown in FIG. 11B.
Figure 12A:
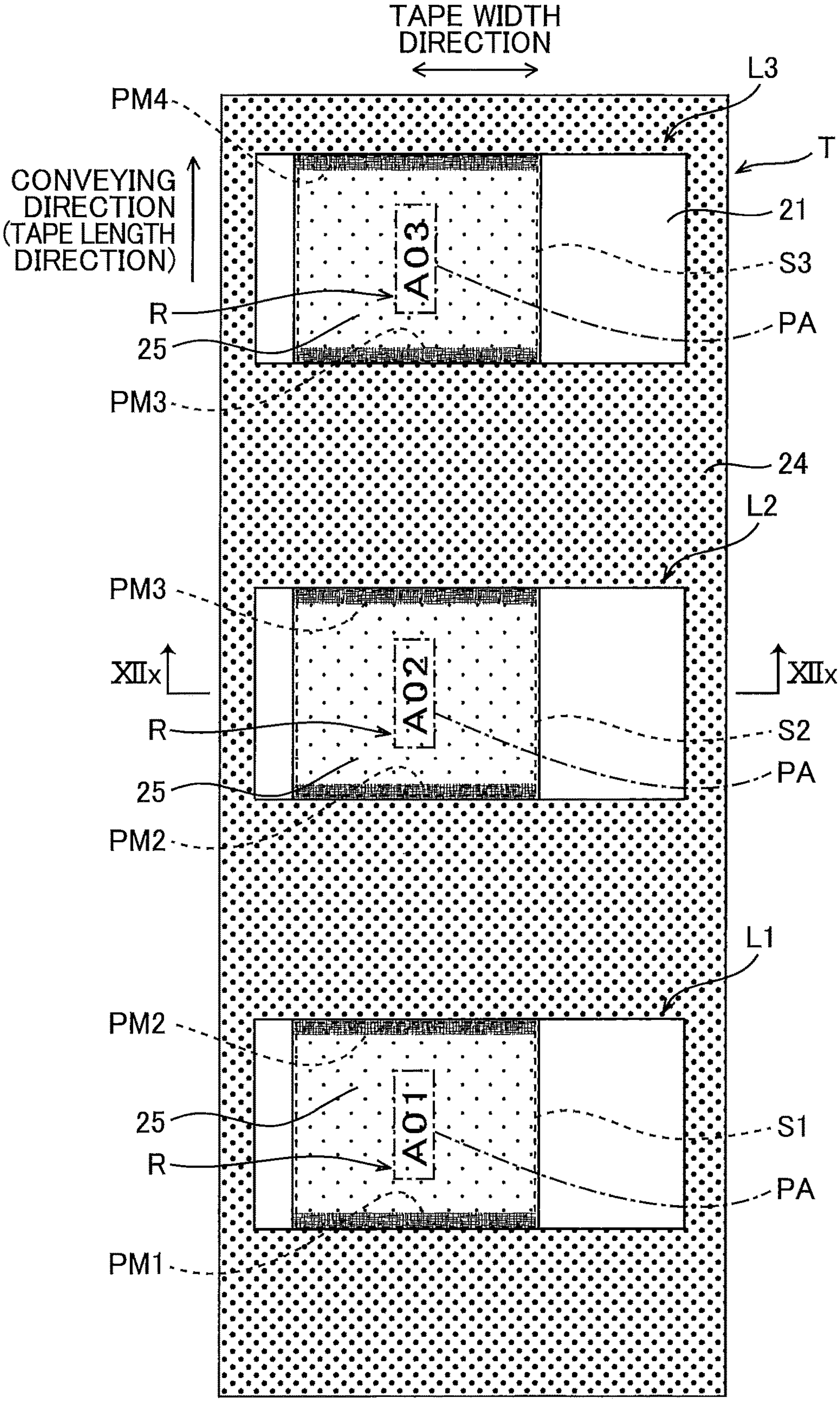
FIG. 12A is a plan view showing the printed printing tape.
Figure 12B:
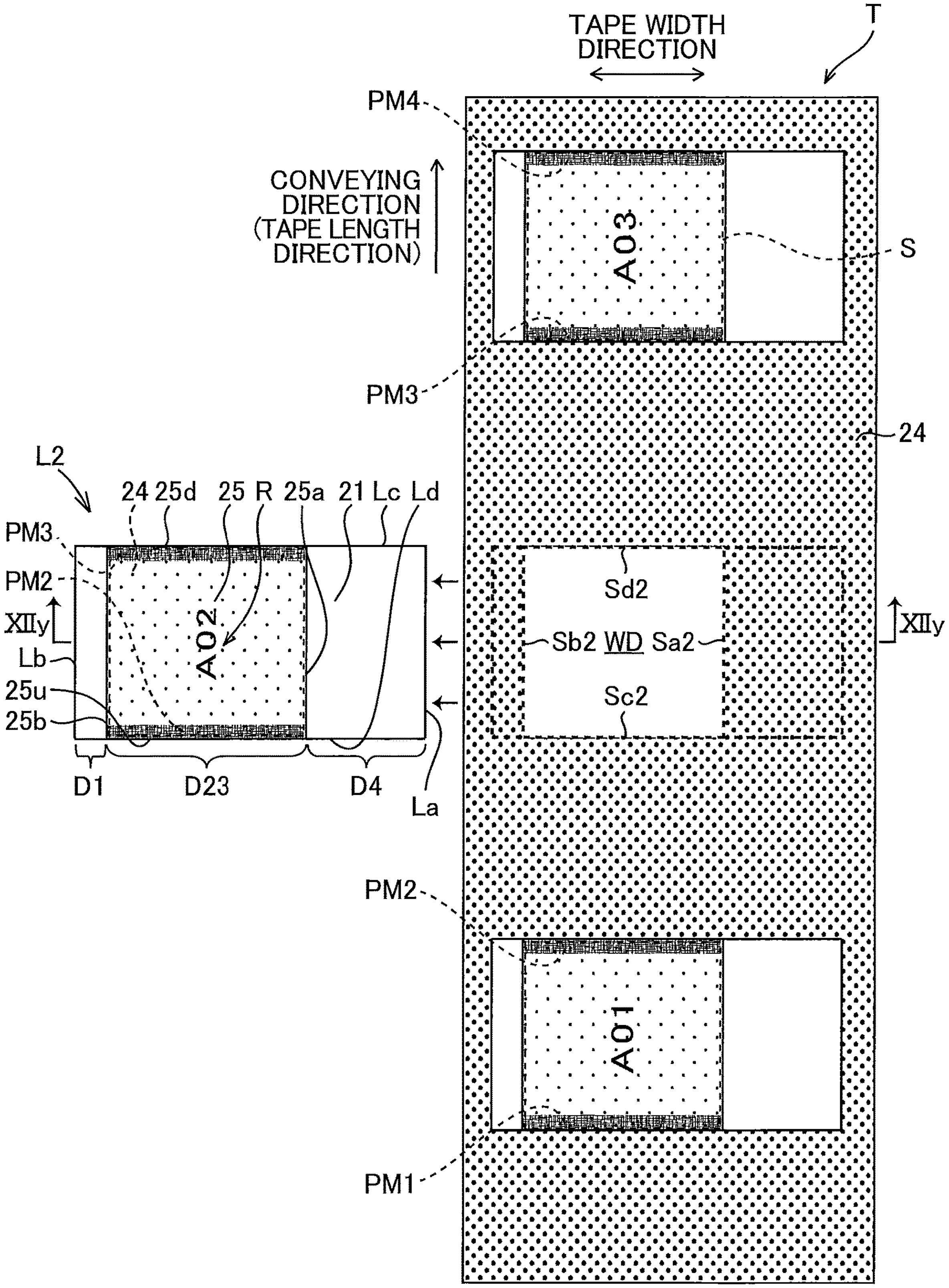
FIG. 12B is a plan view showing a state of the printed printing tape after single print label has been peeled off.
Figure 12C:
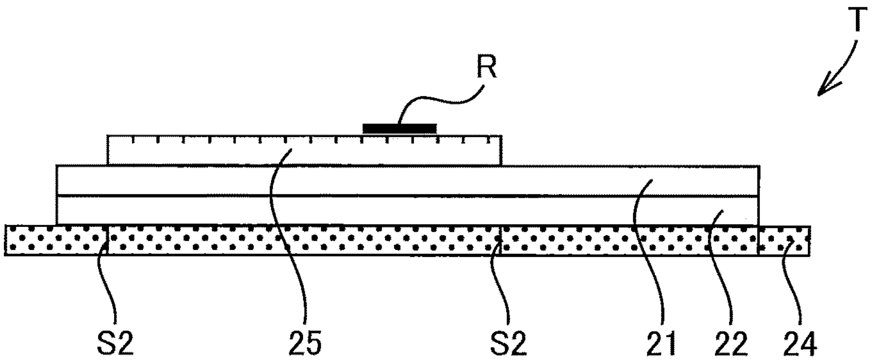
FIG. 12C is a cross-sectional view taken along a section XIIx-XIIx of the structure shown in FIG. 12A.
Figure 12D:
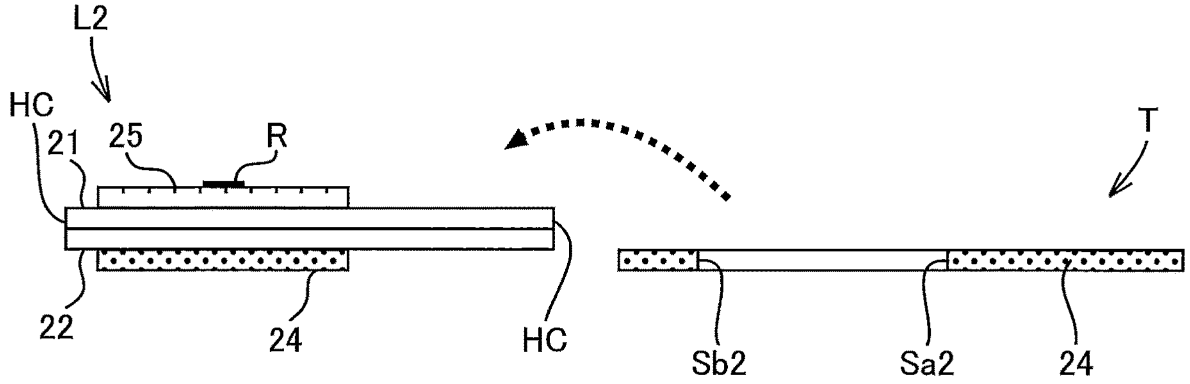
FIG. 12D is a cross-sectional view taken along a section XIIy-XIIy of the structure shown in FIG. 12B.
Figure 13B:
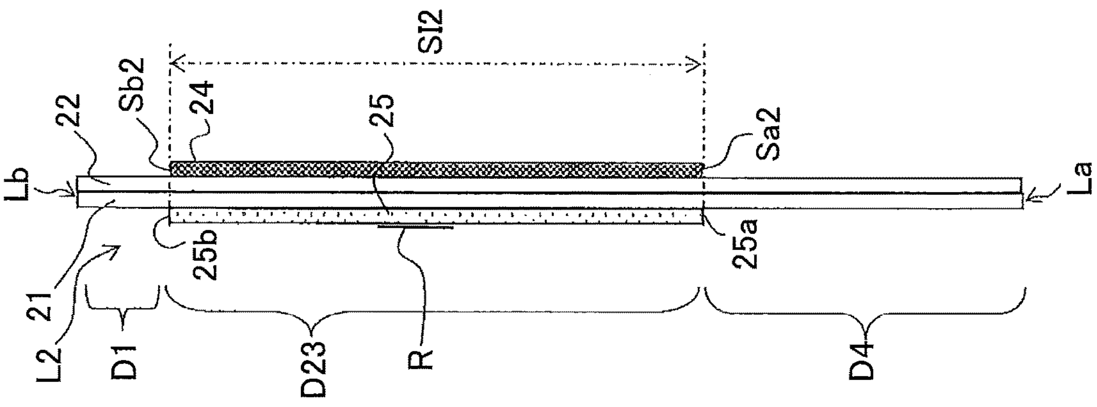
FIG. 13B is a cross-sectional view taken along a section XIIIB-XIIIB shown in FIG. 13A.
Figure 13A:
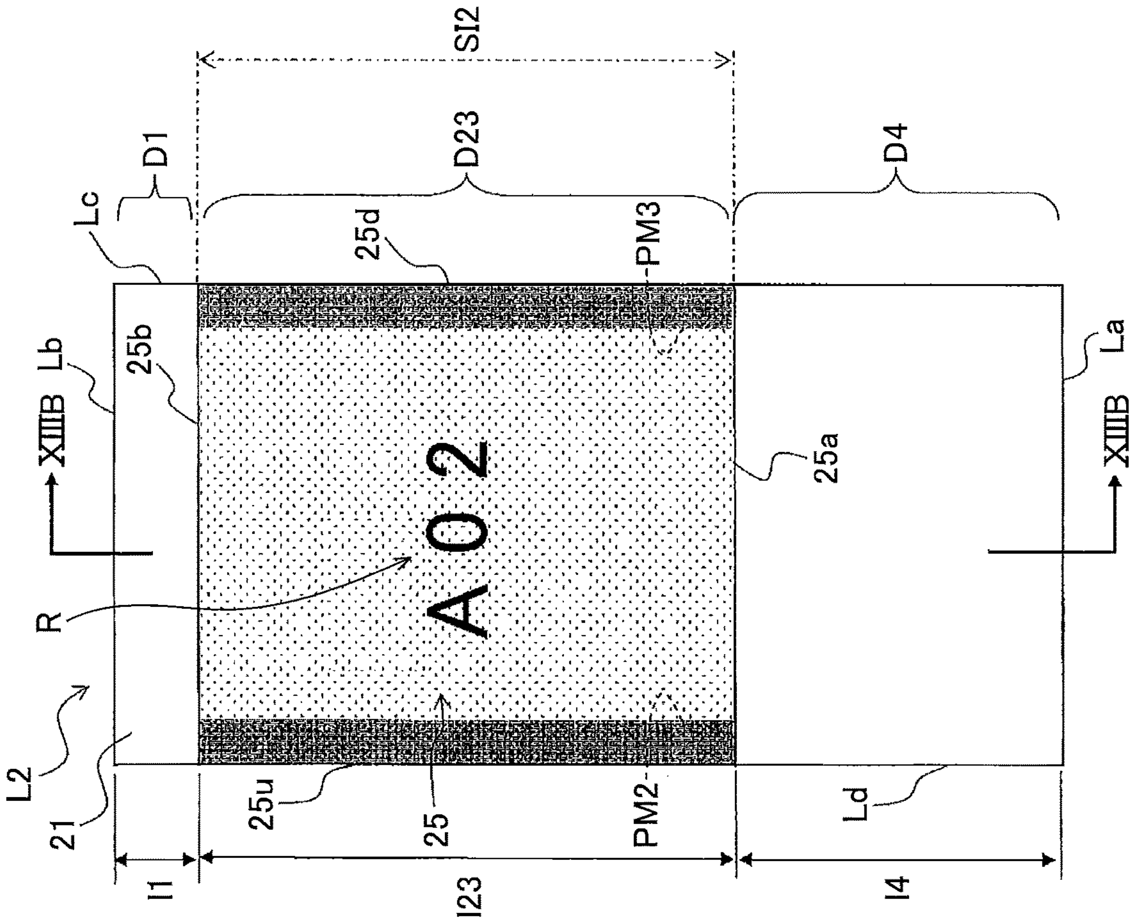
FIG. 13A is a plan view showing the print label.

Further, as a result of this arrangement of the marks PM, portions of the marks PM on the release material layer 24 remain on the upstream edge 25*u* and the downstream edge 25*d* of the print background layer 25 in each print label L after the release material layer 24 has been peeled off when creating the print label L, and the remaining portions show through the top surface side of the print label L, as illustrated in FIG. 11B, FIG. 12B, and FIG. 13A. To address this, the release material layer 24 has an opacity of no greater than 97% in this variation. Here, "opacity" is measured according to the method stipulated in JIS P 8149, "Paper and board—Determination of opacity (paper backing)—Diffuse reflectance method." This configuration can suppress the background color of the printing area PA from appearing uneven due to the color of the mark PM on the back surface of the release material layer 24, while viewing a print label L from the front side when the print label L is configured of material through which the release material layer 24 can be seen.

In the variation described above, a portion of the interior region of the slit S1 near the mark PM2 (near the side Sd1) and a portion of the interior region of the slit S2 near the mark PM2 (near the side Sc2) are incorporated as portions of the mark PM2. Similarly, a portion of the interior region of the slit S2 near the mark PM3 (near the side Sd2) and a portion of the interior region of the slit S3 near the mark PM3 (near the side Sc3) are incorporated as portions of the mark PM3. Accordingly, by distinguishing between positions of the upstream edges Pu2 and Pu3 in the conveying direction and the positions of the downstream edges Pd2 and Pd3 in the conveying direction for the corresponding marks PM2 and PM3 (and more specifically determining positions of the marks PM2 and PM3 by further calculating midpoint positions of these upstream edges Pu2 and Pu3 and downstream edges Pd2 and Pd3), positioning control can be performed with good precision, without adverse effects caused by similarities in optical characteristics between marks PM and portions near the marks PM, as described above.

(2) Aligning the Longitudinal Direction of the Label with the Tape Length Direction <Printing Tape>

This variation will be described with reference to FIGS. 14A through 14F, which include FIGS. 14A, 14B, 14D, 14E, and 14F that correspond to FIGS. 2A, 2B, 2C, 2D, and 2E in the present embodiment; and FIGS. 15A through 15F, which include FIGS. 15A and 15D that correspond to FIGS. 3A and 3B in the present embodiment.

Figure 14A:
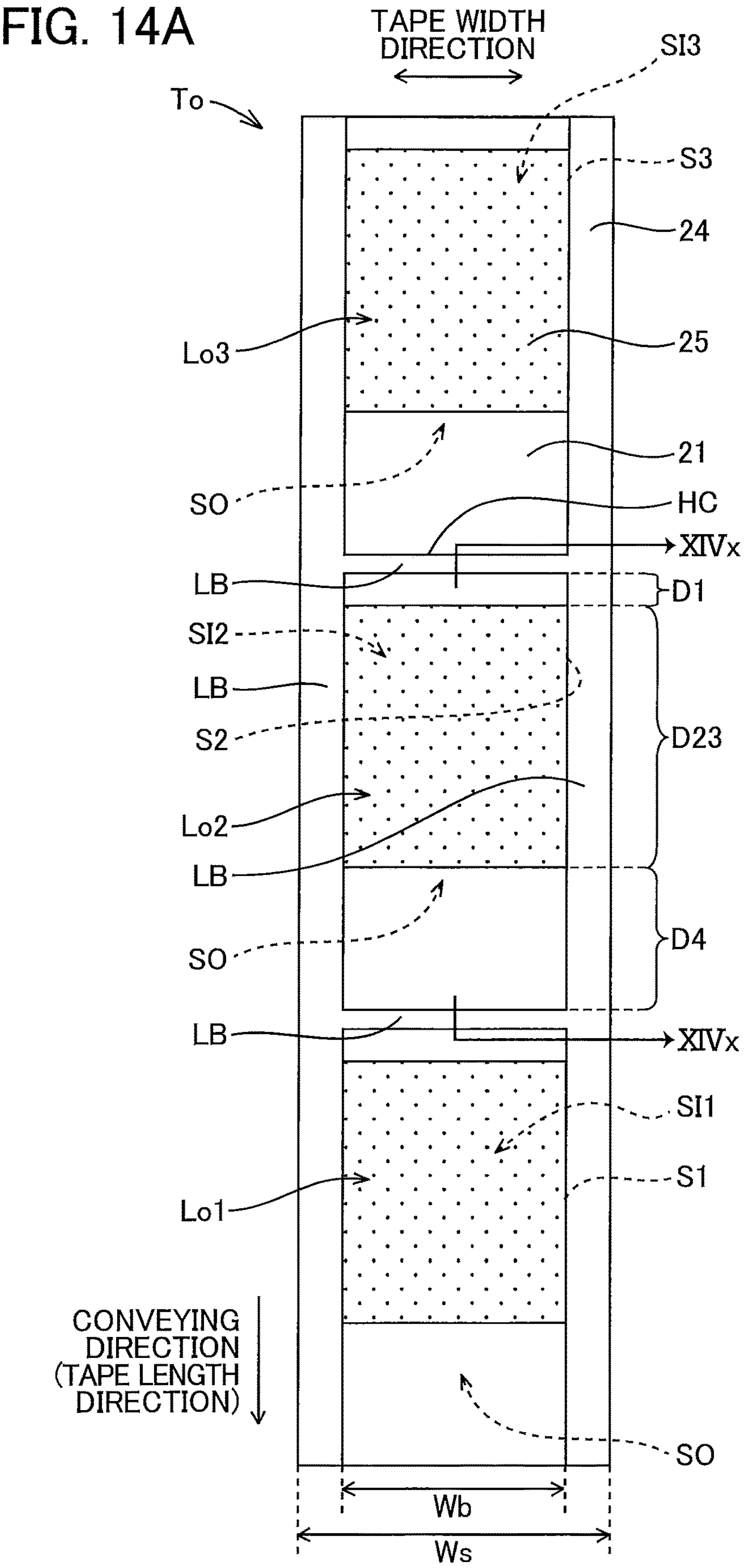
FIG. 14A is a plan view showing a printing tape in an unprinted state according to a variation aligning a longitudinal direction of a label with a tape length direction.

As shown in FIGS. 14A through 14F of this variation, as in the present embodiment described above, the main label parts Lo1, Lo2, and Lo3 (or the print labels L1, L2, and L3 having printed images R formed on the corresponding main label parts Lo1, Lo2, and Lo3) are arranged in series on the printing tapes To and T while separated from each other by the excess label portion LB (see FIG. 14A). Further, the base layer 21 is separated between the main label parts Lo and the excess label portion LB by the half-cuts HC and is fixed to the second side surface of the release material layer 24 in the thickness direction via the adhesive layer 22.

In this variation, the main label parts Lo or print labels L are arranged such that their longitudinal directions are aligned with the tape length direction of the printing tapes To and T. That is, a plurality of the slits S (the three slits S1, S2, and S3 in this example) are provided in the release material layer 24 along the tape length direction, and a plurality of main label parts Lo or print labels L (the three main label parts Lo1, Lo2, and Lo3 or the three print labels L1, L2, and L3 in this example) are fixed to the release material layer 24 along the tape length direction. The release material layer 24 is elongated in the tape length direction, which is parallel to the sides Sa1 and Sb1, the sides Sa2 and Sb2, and the sides Sa3 and Sb3 (described later) of the corresponding slits S1, S2, and S3. A plurality of sets (three in this example) that each comprise one slit S and one corresponding main label part Lo (print label L) is juxtaposed along this length direction.

Each main label part Lo has a length Wb in the tape width direction and three areas: the adhesive area D1, non-adhesive area D23, and adhesive area D4. The printing tapes To and T have a length Ws in the tape width direction that is greater than the length Wb of the main label part Lo in the tape width direction. As in the present embodiment described above, rectangular-shaped (square-shaped) slits S are provided in the release material layer 24, and the print background layers 25 are arranged so that at least a portion of each print background layer 25 overlaps at least a portion of the slit inner area SI enclosed by the corresponding slit S. In this example, the slits S overlap the print background layers 25 in a plan view. Further, as in the present embodiment, printed images R configured of the text "A01," "A02," and "A03" are formed on the print background layers 25 of the corresponding print labels L.

Also, as in the present embodiment, marks PM are provided on the release material layer 24 for positioning control when the printing tape To is conveyed. Each mark PM is provided in an intermediate part between two neighboring slits S, S (but in a plan view are positioned inside the main label part Lo or print label L, as illustrated in FIGS. 14C and 14D).

<Description of the Slits and Marks>

Figure 14B:
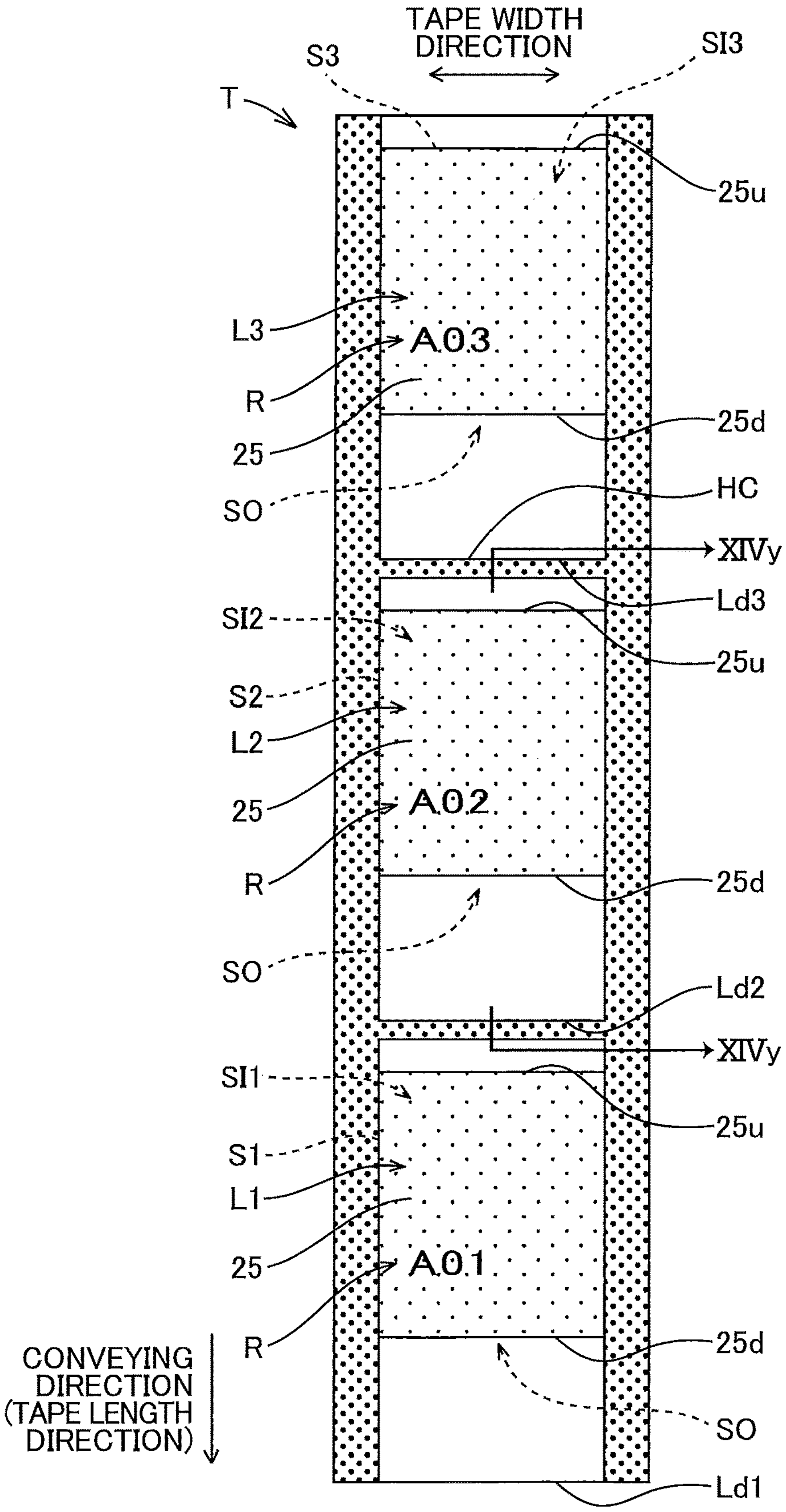
FIG. 14B is a plan view showing a printed printing tape after an excess label portion has been peeled off.
Figure 14C:
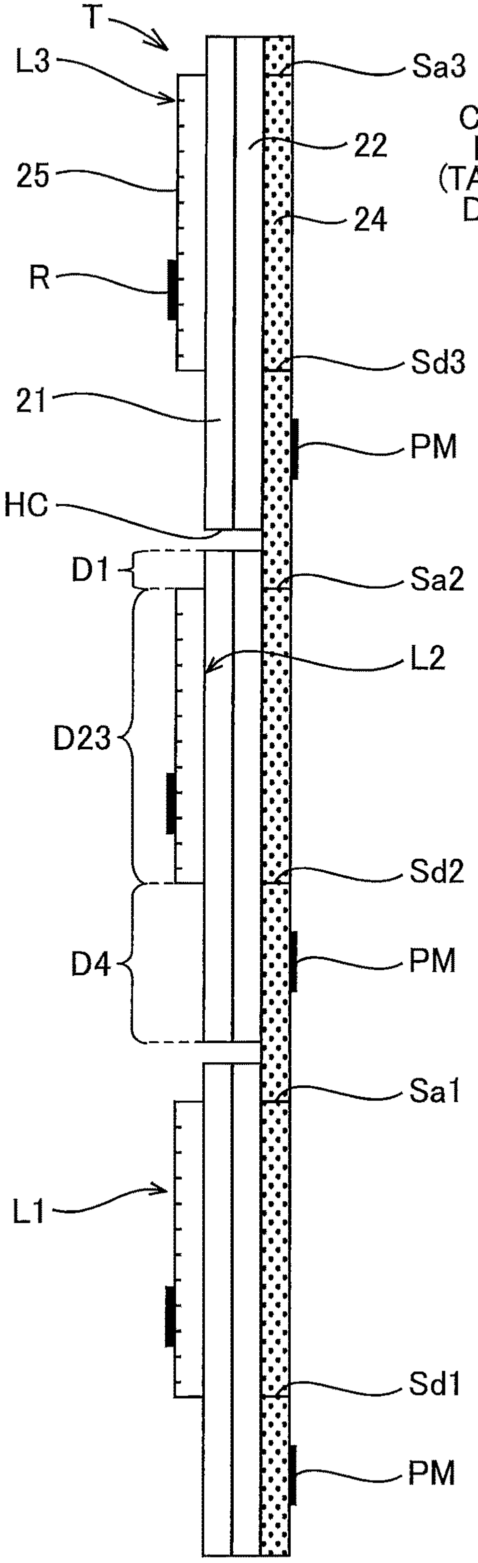
FIG. 14C is a side view of the structure shown in FIG. 14B.
Figure 14D:
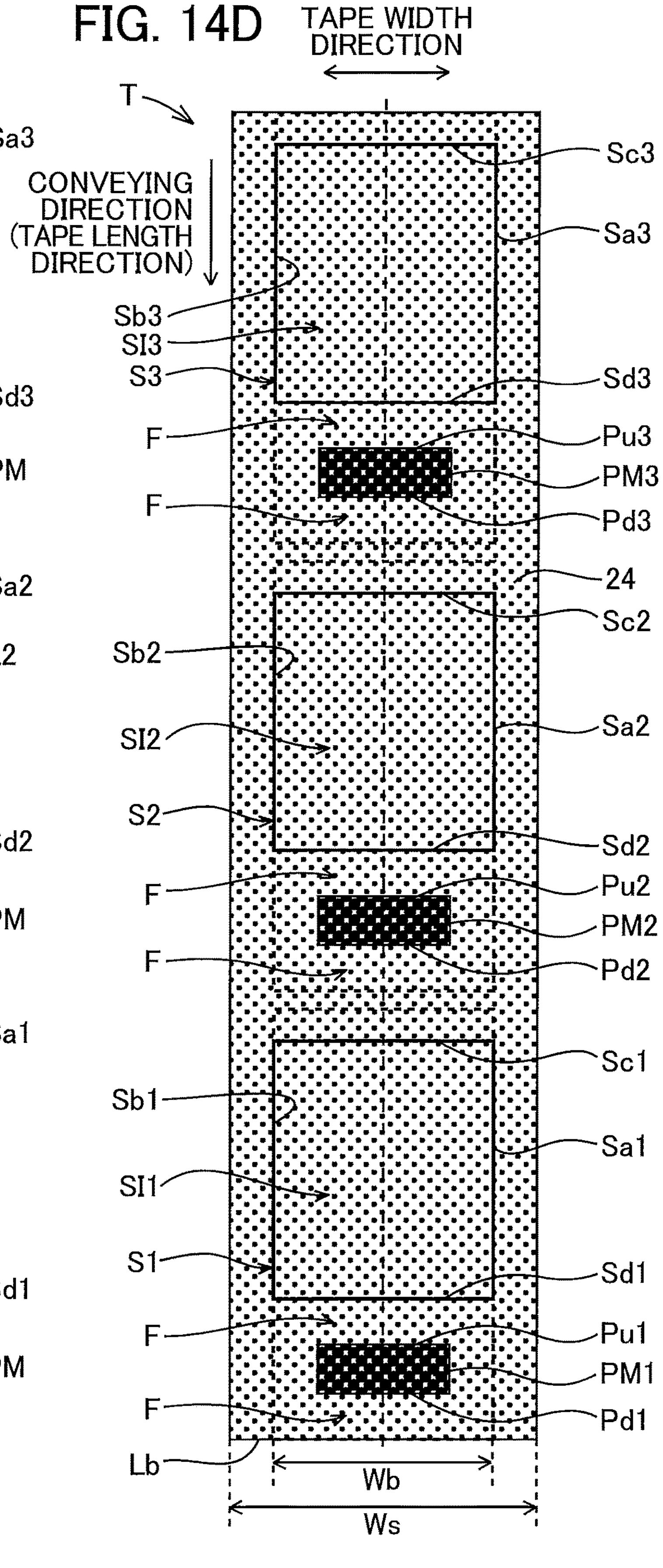
FIG. 14D is a rear view showing the printing tape.
Figure 14E:
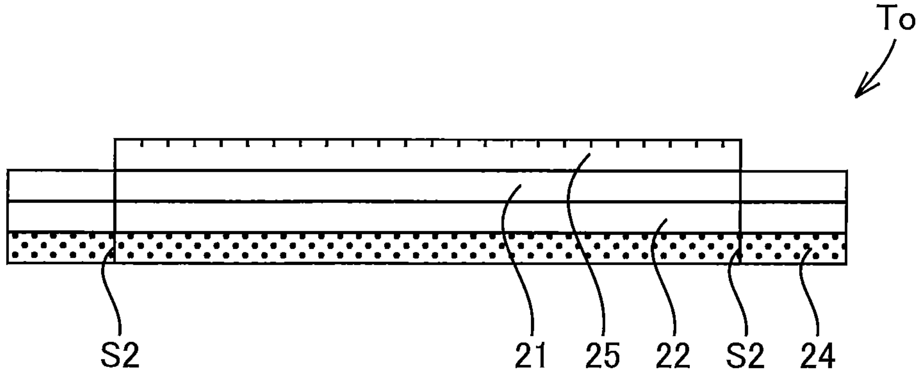
FIG. 14E is a cross-sectional view taken along a section XIVx-XIVx of the structure shown in FIG. 14A.
Figure 14F:
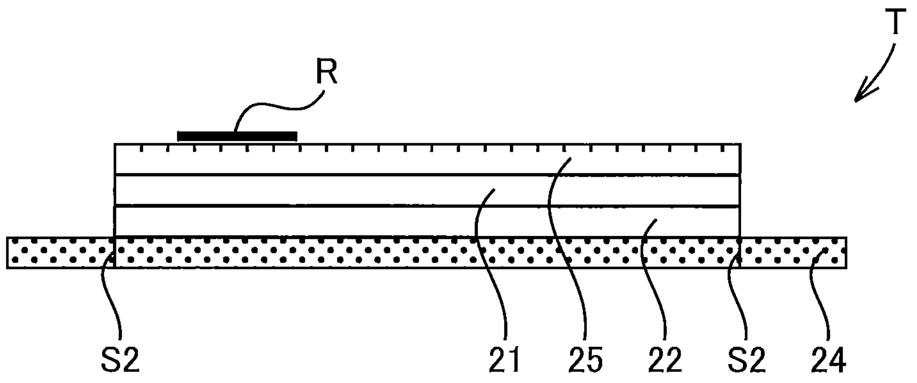
FIG. 14F is a cross-sectional view taken along a section XIVy-XIy of the structure shown in FIG. 14B.
Figure 15A:
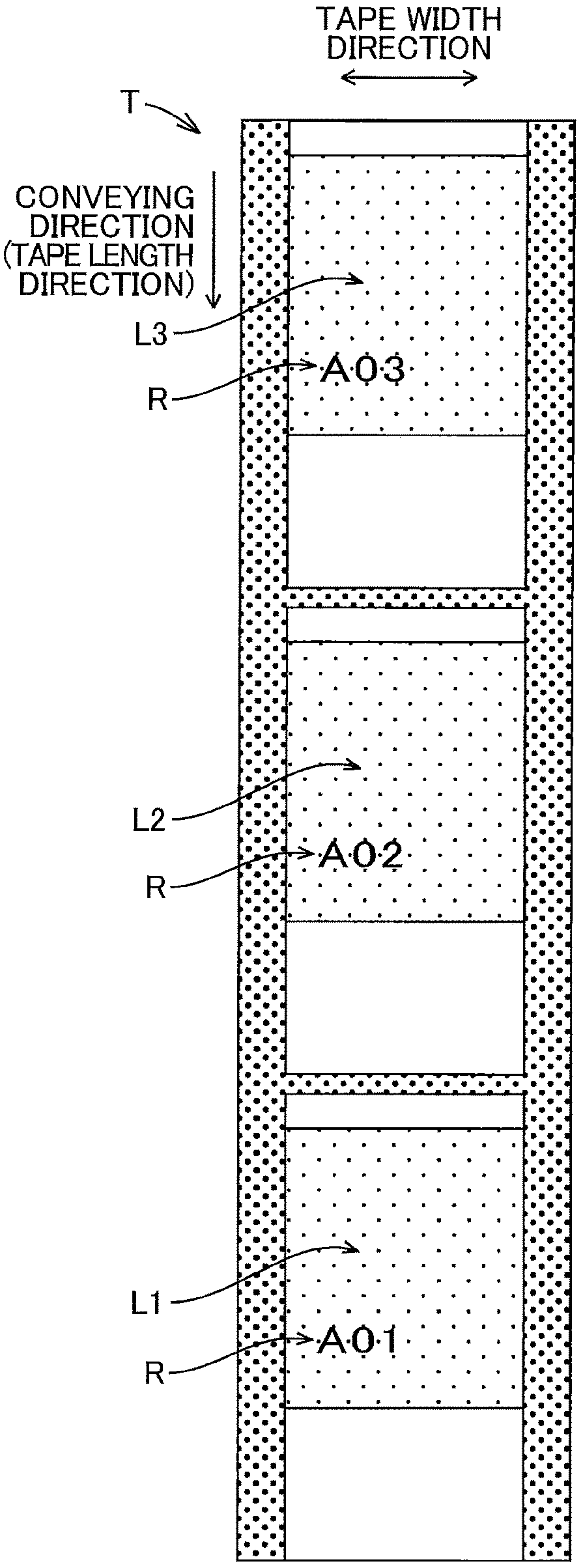
FIG. 15A is a plan view showing the printed printing tape after the excess label portion has been peeled off.
Figure 15B:
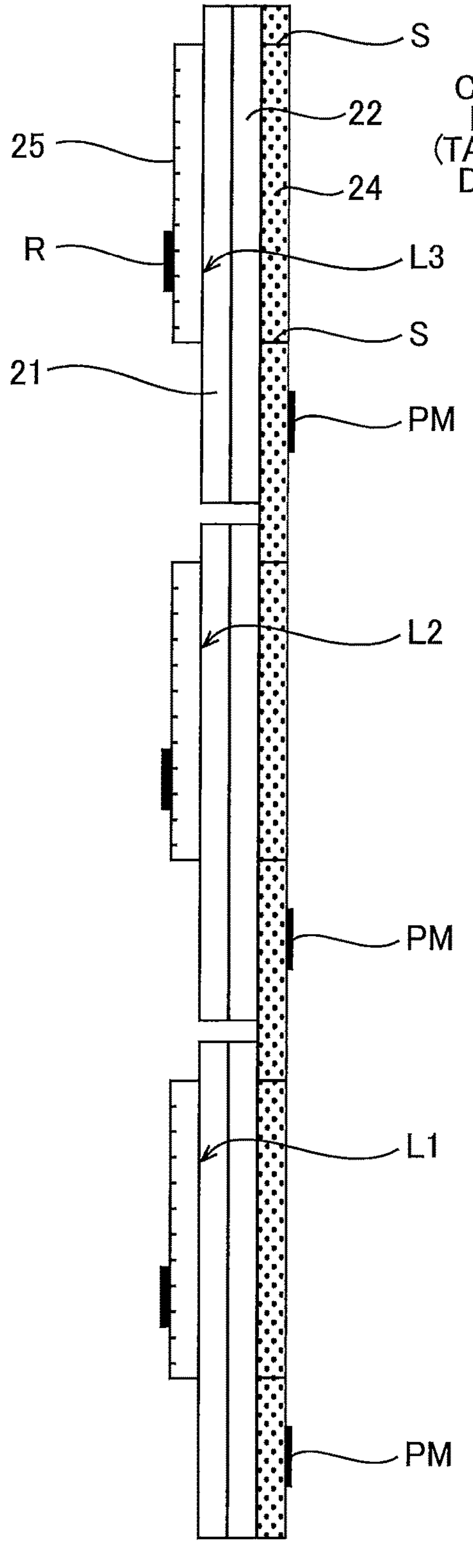
FIG. 15B is a side view of the structure shown in FIG. 15A.
Figure 15C:
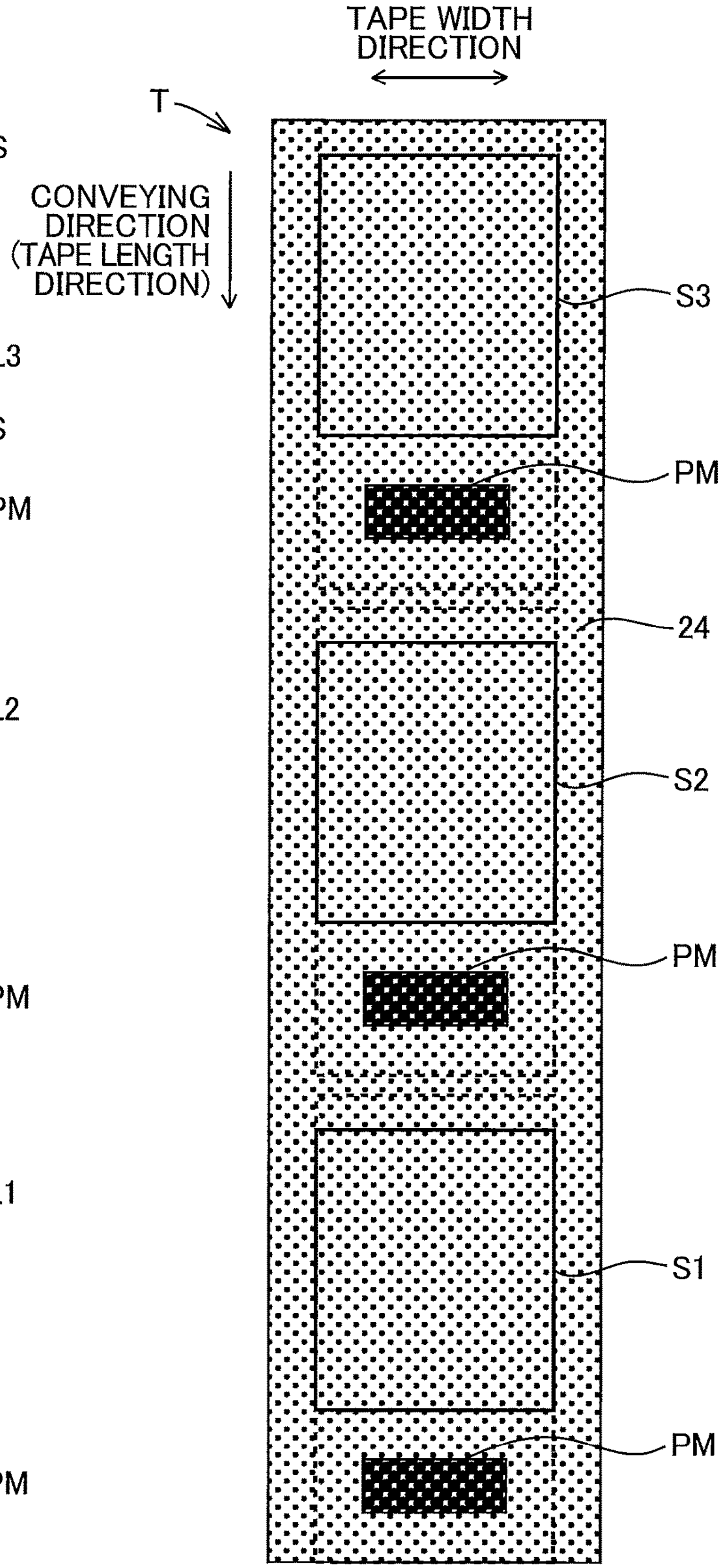
FIG. 15C is a rear view showing the printing tape.
Figure 15D:
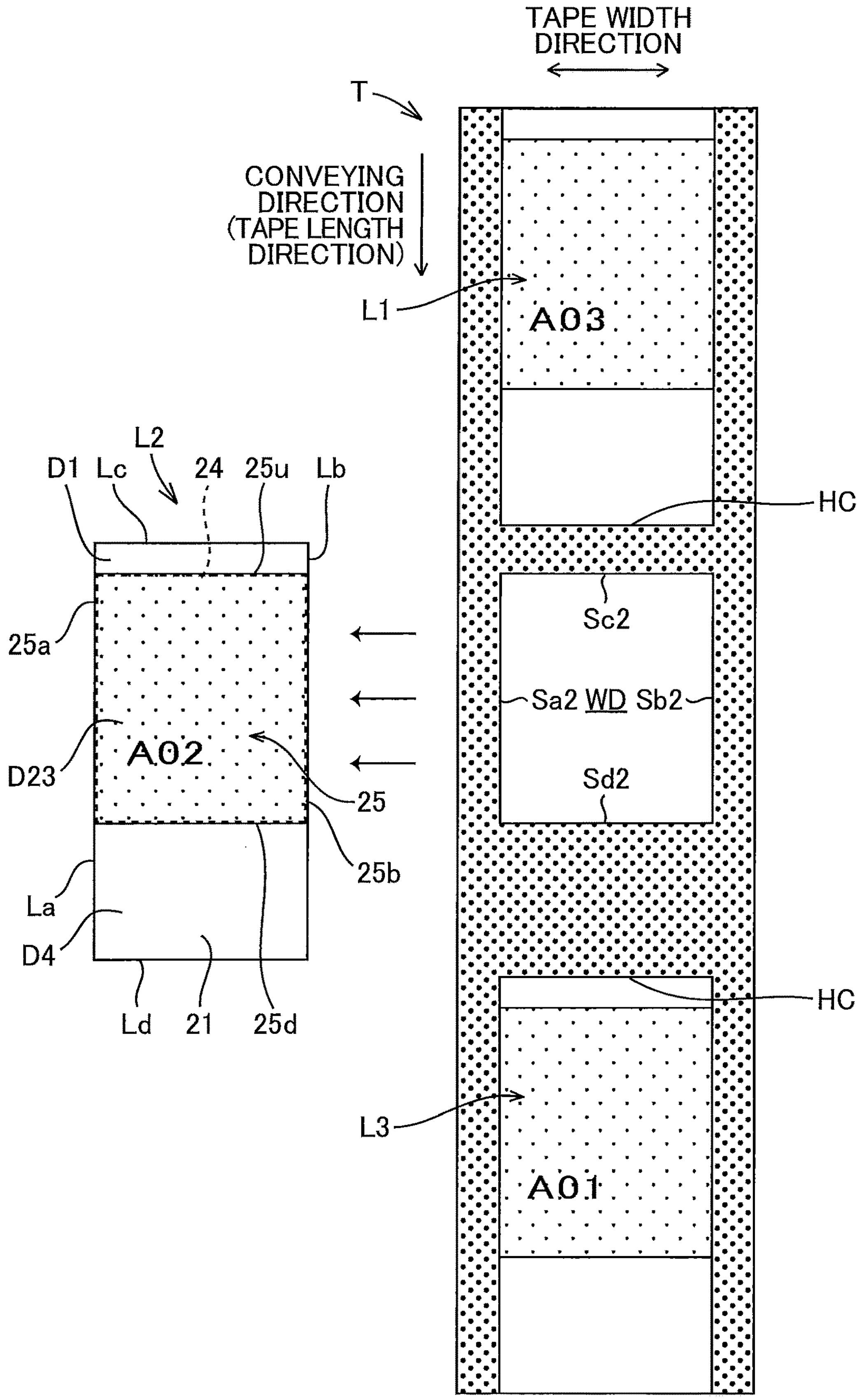
FIG. 15D is a plan view showing a state of the printed printing tape after single print label has been peeled off.

As shown in FIG. 14D, the slit S1 is configured of a square-shaped opening formed by a side Sa1 and a side Sb1 that are aligned in the tape length direction and juxtaposed in the tape width direction, and a side Sc1 and a side Sd1 that are aligned in the tape width direction and juxtaposed in the tape length direction. The print label L1 described above is fixed to the first side surface of the release material layer 24 relative to the thickness direction so as to span across both the side Sc1 and side Sd1. At this time, the print background layer 25 of the corresponding main label part Lo1 (print label L1) is configured of a square including four sides and having the same size and shape as the slit inner area SI1 enclosed by the slit S1. As a result of the release material layer 24 being arranged to overlap the print background layer 25 in a plan view as described above, the side Sc1 and side Sd1 of the slit S1 are respectively aligned with the upstream edge 25*u* and downstream edge 25*d* of the print background layer 25 in a plan view (see FIGS. 14B and 14D).

The slit S2 is provided on one side of the slit S1 (the upper side in FIGS. 14B and 14D) in the tape length direction. As with the slit S1, the slit S2 is configured of a square-shaped opening formed by a side Sa2 and a side Sb2 that are aligned in the tape length direction and juxtaposed in the tape width direction, and a side Sc2 and a side Sd2 that are aligned in the tape width direction and juxtaposed in the tape length direction. The print label L2 described above is fixed to the first side surface of the release material layer 24 relative to the thickness direction so as to span across both the side Sc2 and side Sd2. At this time, the print background layer 25 of the corresponding main label part Lot (print label L2) is configured of a square including four sides and having the same size and shape as the slit inner area SI2 enclosed by the slit S2. Similar to that described above, the side Sc2 and side Sd2 of the slit S2 are arranged to overlap the upstream edge 25*u* and downstream edge 25*d* of the print background layer 25 in a plan view (see FIGS. 14B and 14D).

The slit S3 is provided on one side of the slit S2 in the tape length direction (the upper side in FIGS. 14B and 14D). As with the slits S1 and S2, the slit S3 is configured of a square-shaped opening formed by a side Sa3 and a side Sb3 that are aligned in the tape length direction and juxtaposed in the tape width direction, and a side Sc3 and a side Sd3 that are aligned in the tape width direction and juxtaposed in the tape length direction. The print label L3 is fixed to the first side surface of the release material layer 24 relative to the thickness direction so as to span across both the side Sc3 and side Sd3. At this time, the print background layer 25 of the corresponding main label part Lo3 (print label L3) is configured of a square including four sides and having the same size and shape as the slit inner area SI3 enclosed by the slit S3. Similar to that described above, the side Sc3 and side Sd3 of the slit S3 are arranged so as to overlap the corresponding upstream edge 25*u* and downstream edge 25*d* of the print background layer 25 in a plan view (see FIGS. 14B and 14D).

On the first side surface of the release material layer 24 relative to the thickness direction, the mark PM1 is provided on the other side of the slit S1 in the tape length direction (the lower side in the drawing), the mark PM2 is provided between the slit S1 and slit S2, and the mark PM3 is provided between the slit S2 and slit S3, as shown in FIG. 14D.

The mark PM1 has an upstream edge Pu1 in the conveying direction (the tape length direction) positioned downstream from the side Sd1 of the slit S1, and a downstream edge Pd1 in the conveying direction positioned upstream from a downstream edge Ld1 of the print label L1 (see FIG. 14B) disposed at a position corresponding to the slit S1 (a position spanning across the side Sc1 and side Sd1). In other words, the mark PM1 is provided downstream from the slit inner area SI1 in the slit S1 and within the range of the print label L1.

The mark PM2 has an upstream edge Put in the conveying direction (the tape length direction) positioned downstream from the side Sd2 of the slit S2, and a downstream edge Pd2 in the conveying direction positioned upstream from a downstream edge Ld2 of the print label L2 (see FIG. 14B) disposed at a position corresponding to the slit S2 (a position spanning across the side Sc2 and side Sd2). In other words, the mark PM2 is provided downstream from the slit inner area SI2 in the slit S2 and within the range of the print label L2.

In relation to this mark PM2, the slit S1 corresponds to the first slit in the claims, and the sides Sa1, Sb1, Sc1, and Sd1 of the slit S1 correspond to the first side, second side, third side, and fourth side, respectively. Similarly, the slit S2 corresponds to the second slit in the claims, and the sides Sa2, Sb2, Sc2, and Sd2 of the slit S2 correspond to the fifth side, sixth side, seventh side, and eighth side, respectively. The print label L1 corresponds to the first print label, and the print label L2 corresponds to the second print label.

The mark PM3 has an upstream edge Pu3 in the conveying direction (the tape length direction) positioned downstream from the side Sd3 of the slit S3, and a downstream edge Pd3 in the conveying direction positioned upstream from a downstream edge Ld3 of the print label L3 (see FIG. 14B) disposed at a position corresponding to the slit S3 (a position spanning across the side Sc3 and side Sd3). In other words, the mark PM3 is provided downstream from the slit inner area SI3 in the slit S3 and within the range of the print label L3.

In relation to this mark PM3, the slit S2 corresponds to the first slit in the claims, and the sides Sa2, Sb2, Sc2, and Sd2 of the slit S2 correspond to the first side, second side, third side, and fourth side, respectively. Similarly, the slit S3 corresponds to the second slit in the claims, and the sides Sa3, Sb3, Sc3, and Sd3 of the slit S3 correspond to the fifth side, sixth side, seventh side, and eighth side, respectively. The print label L2 corresponds to the first print label, and the print label L3 corresponds to the second print label.

Figures 15E, 15F:
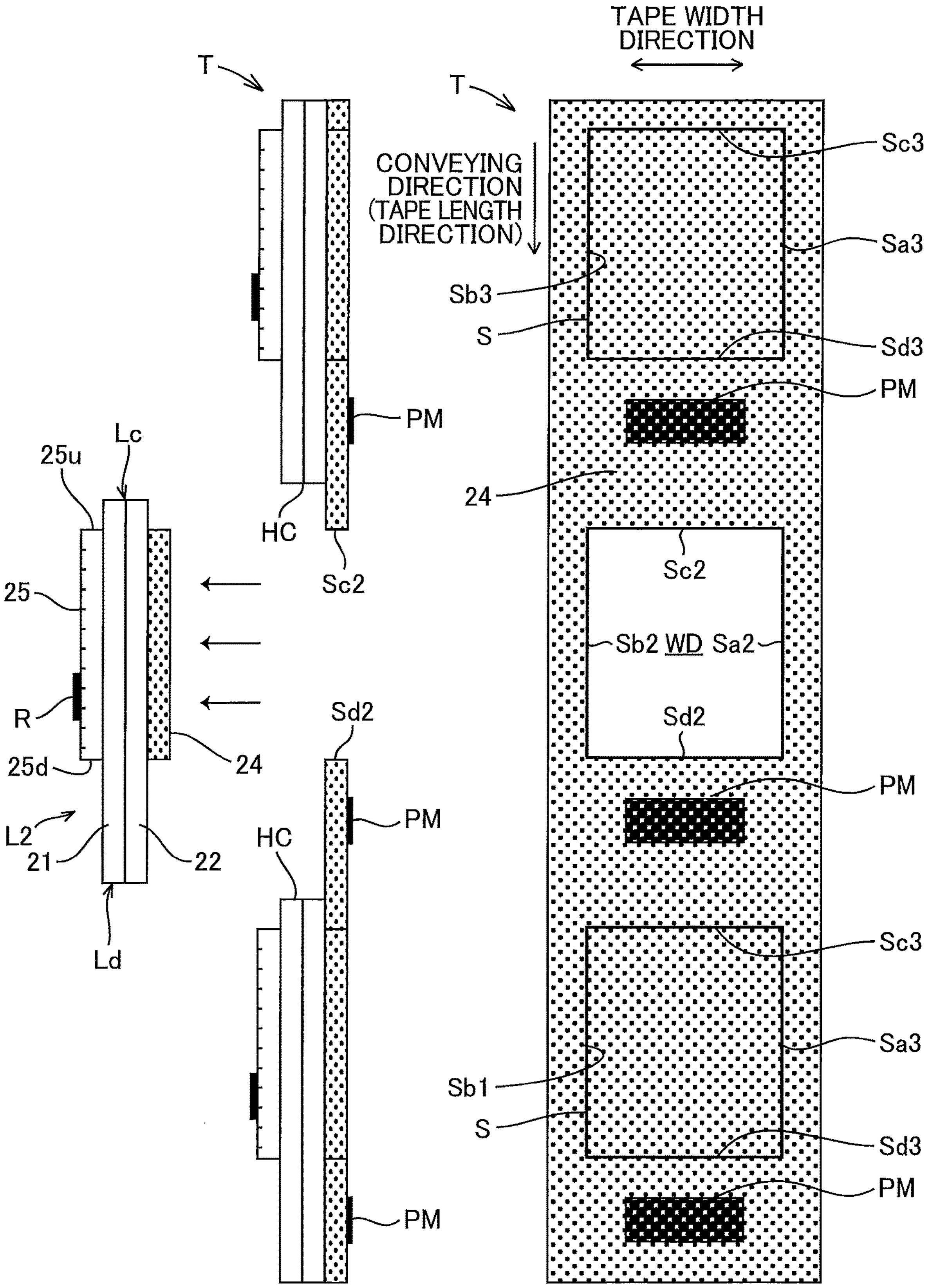
FIG. 15E is a side view of the structure shown in FIG. 15D.
FIG. 15F is a rear view of the structure shown in FIG. 15D.
Figure 16B:
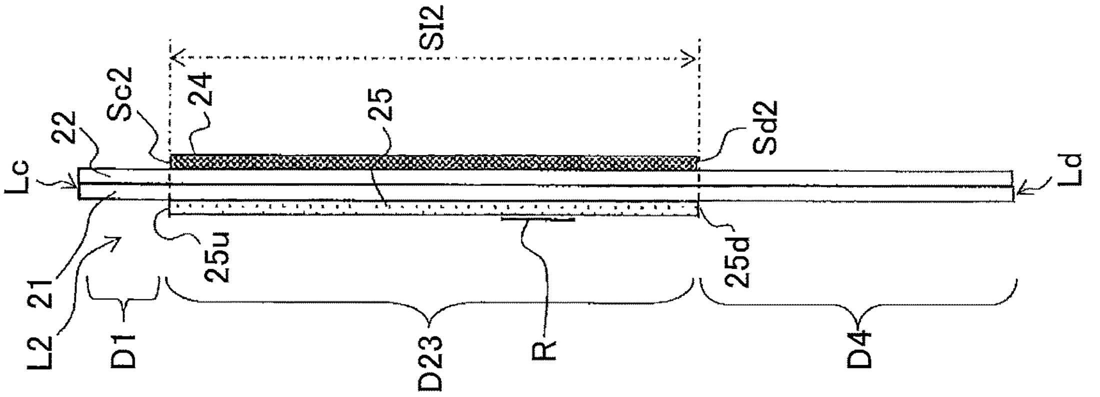
FIG. 16B is a cross-sectional view taken along a section XVIB-XVIB shown in FIG. 16A.
Figure 16A:
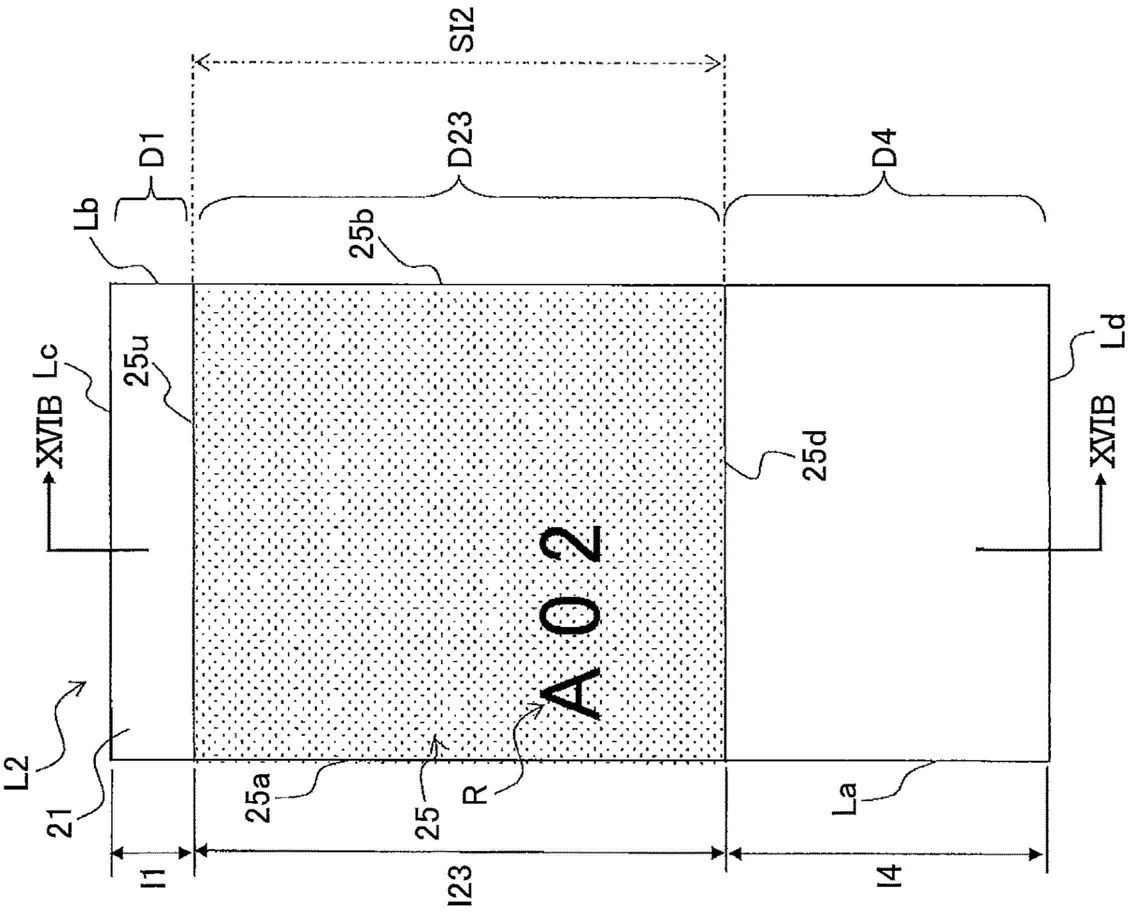
FIG. 16A is a plan view showing the print label.
Figure 17A:
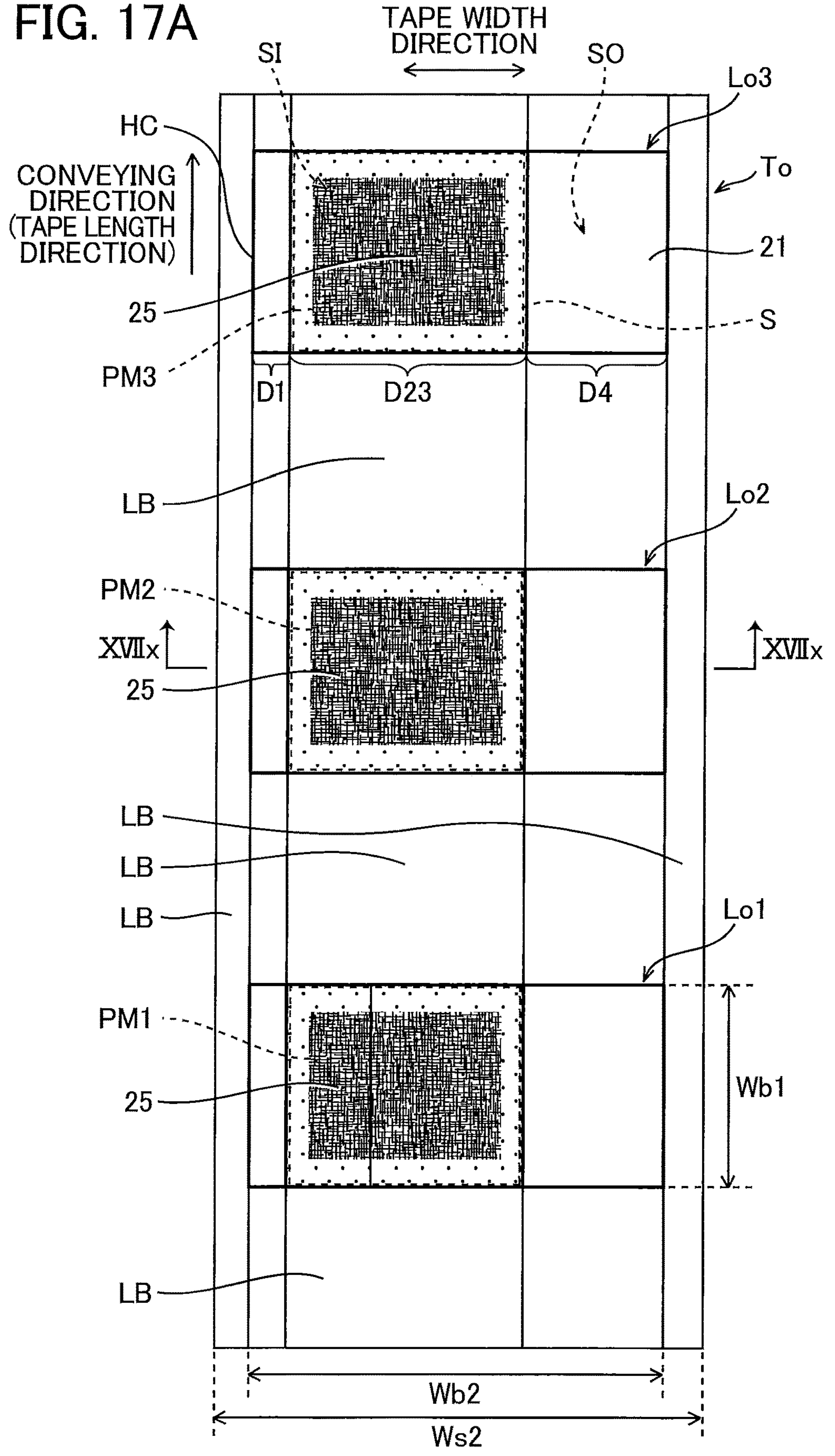
FIG. 17A is a plan view showing a printing tape in an unprinted state according to a second embodiment of the present disclosure.
Figure 17B:
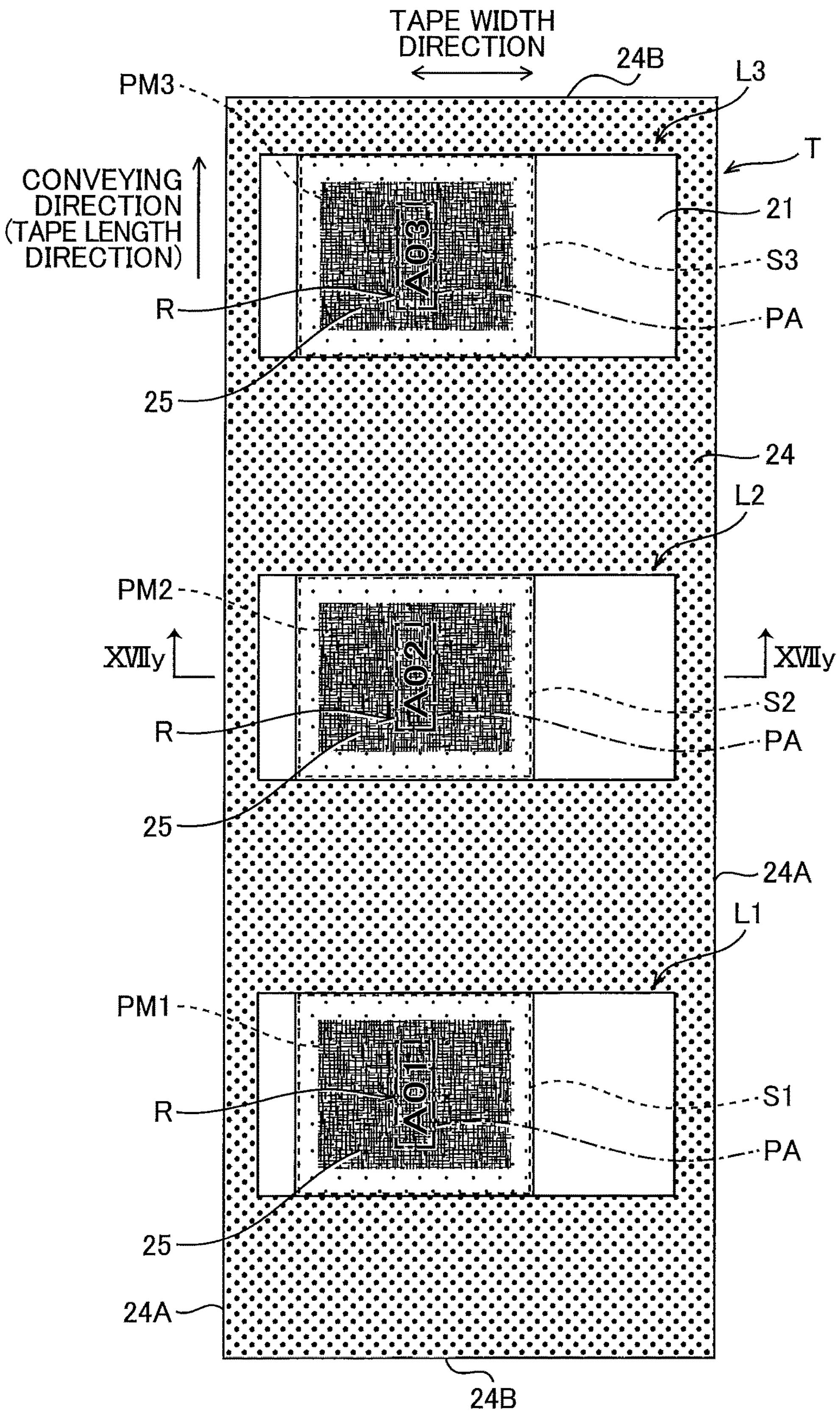
FIG. 17B is a plan view showing a printed printing tape after an excess label portion has been peeled off.
Figure 17C:
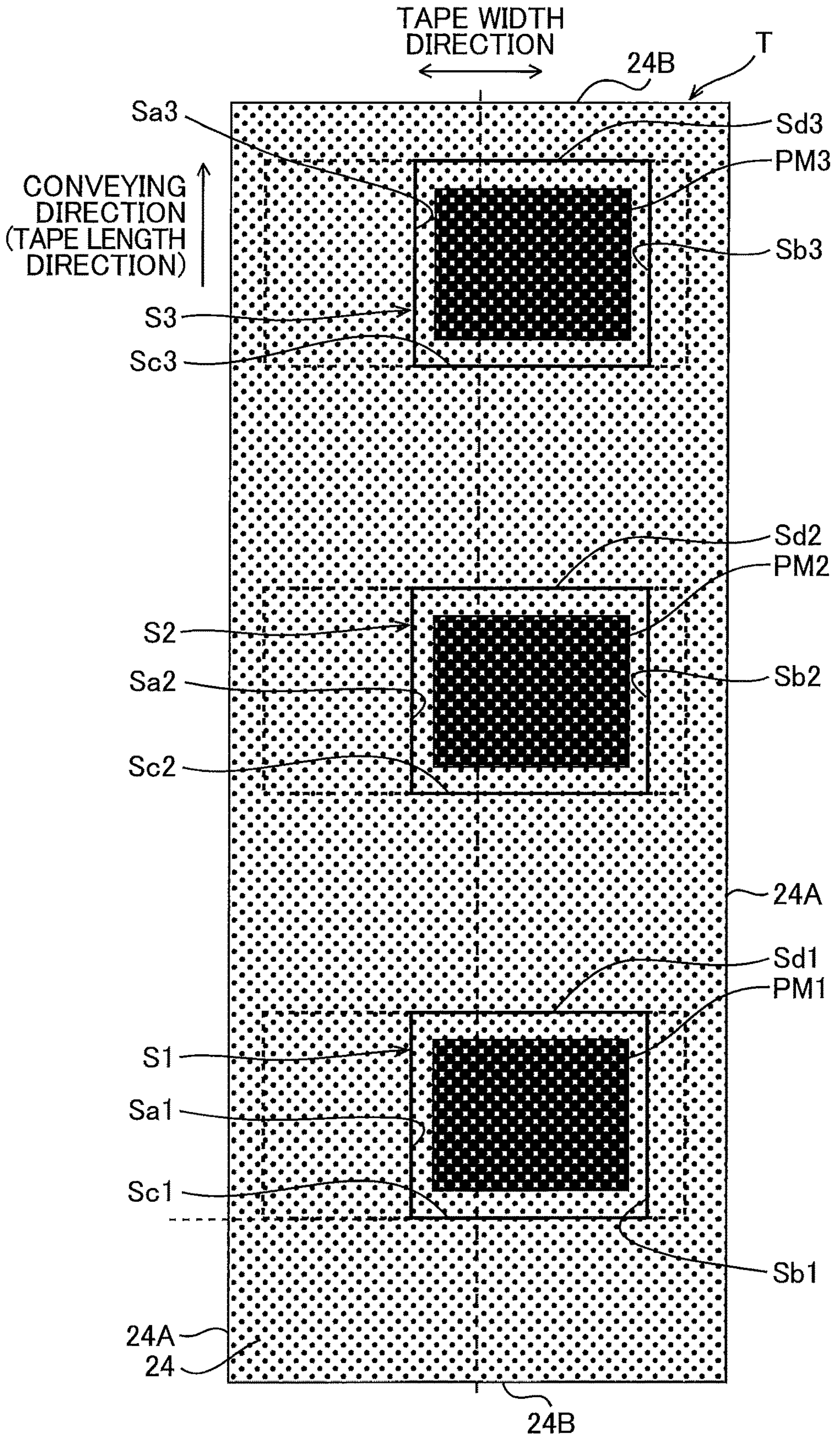
FIG. 17C is a rear view showing the printed printing tape.
Figure 17D:
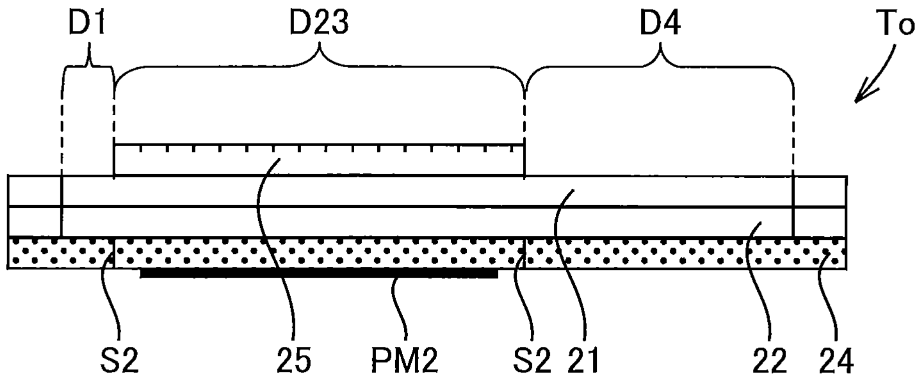
FIG. 17D is a cross-sectional view taken along a section XVIIx-XVIIx of the structure shown in FIG. 17A.
Figure 17E:
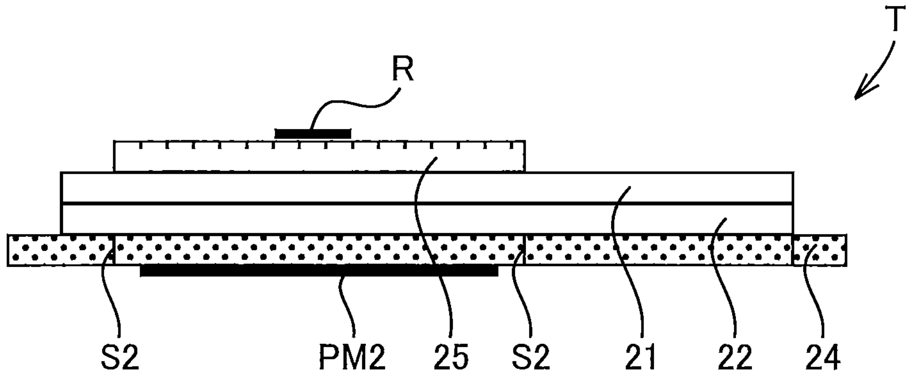
FIG. 17E is a cross-sectional view taken along a section XVIIy-XVIIy of the structure shown in FIG. 17B.
Figure 18A:
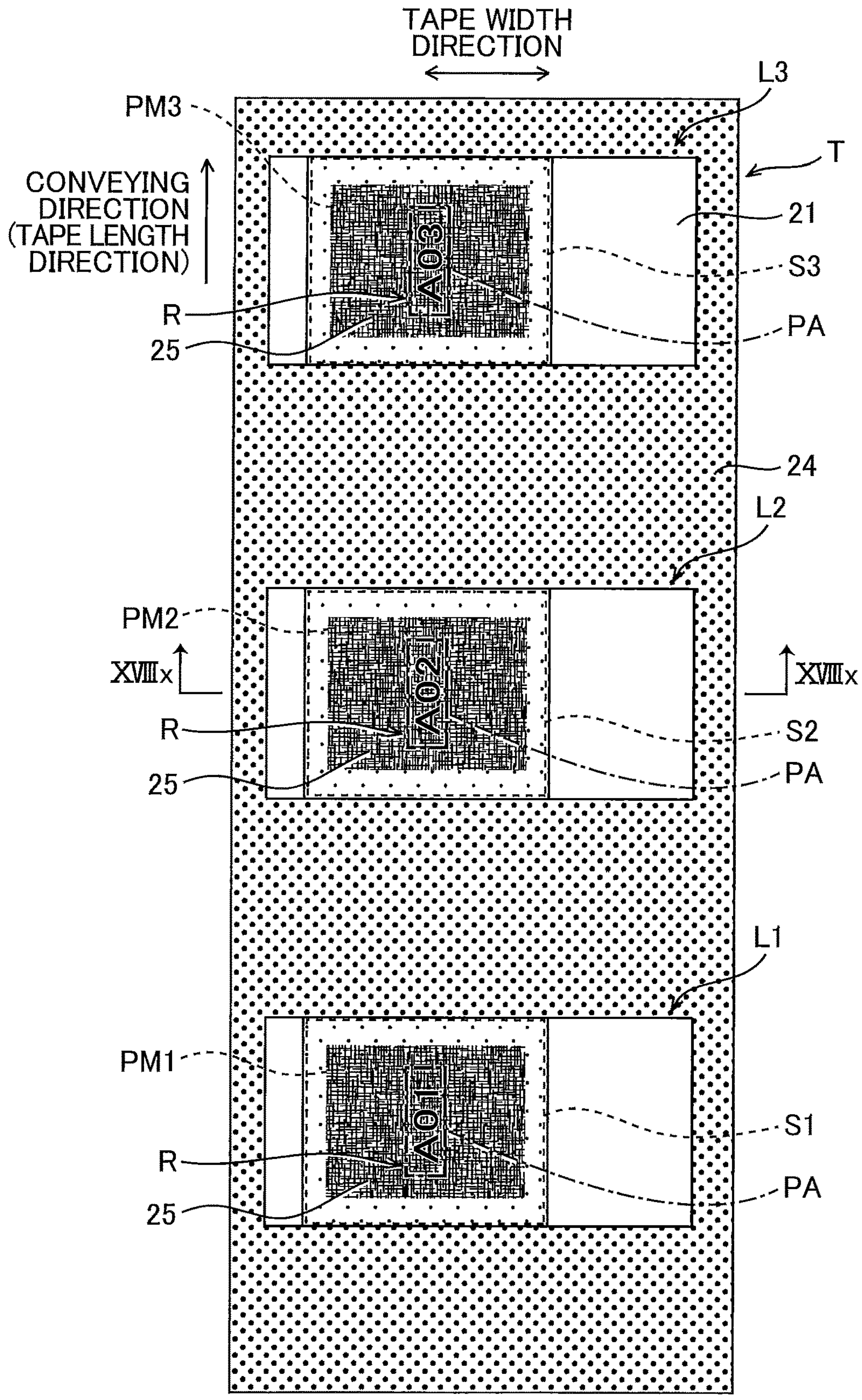
FIG. 18A is a plan view showing the printed printing tape.
Figure 18B:
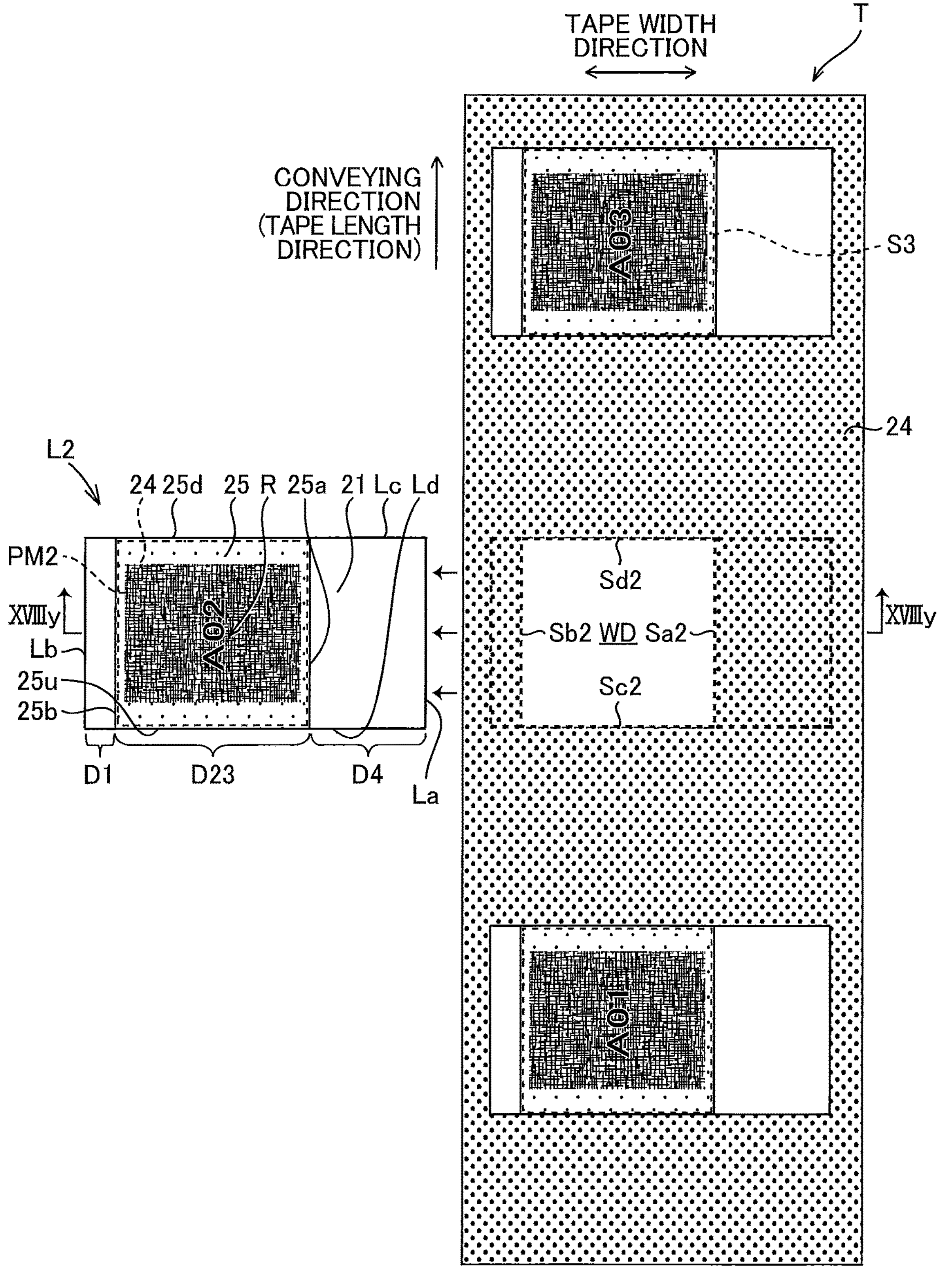
FIG. 18B is a plan view showing a state of the printed printing tape after single print label has been peeled off.
Figure 18C:
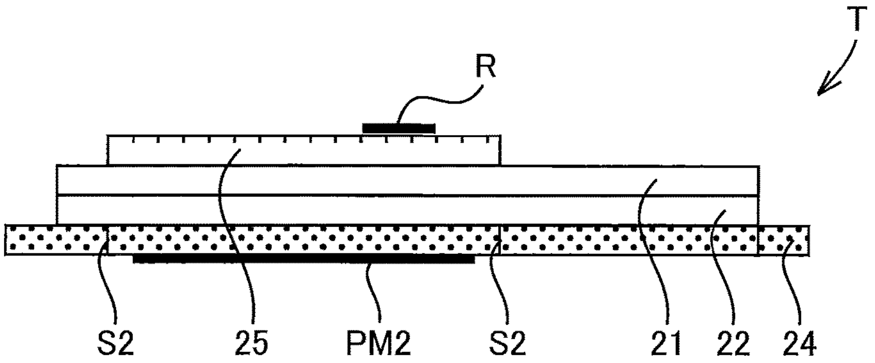
FIG. 18C is a cross-sectional view taken along a section XVIIIx-XVIIIx of the structure shown in FIG. 18A.
Figure 18D:
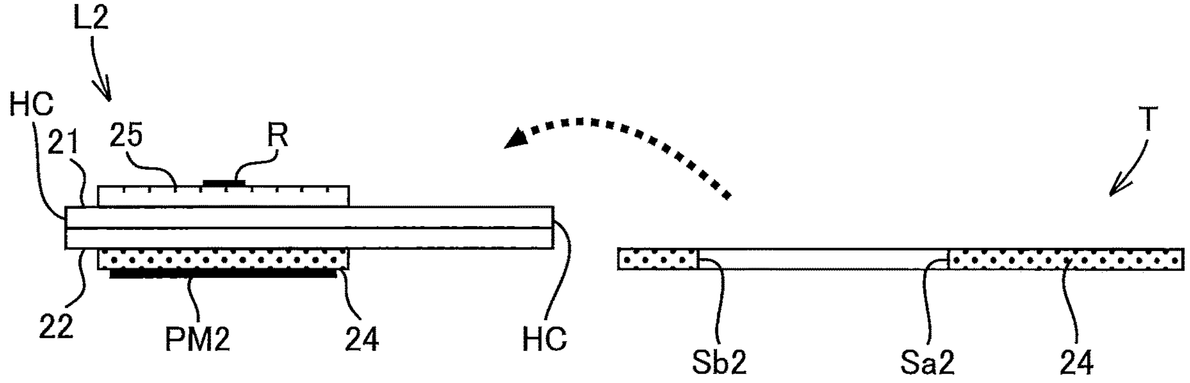
FIG. 18D is a crow-sectional view taken along a section XVIIIy-XVIIIy of the structure shown in FIG. 18B.
Figure 19A:
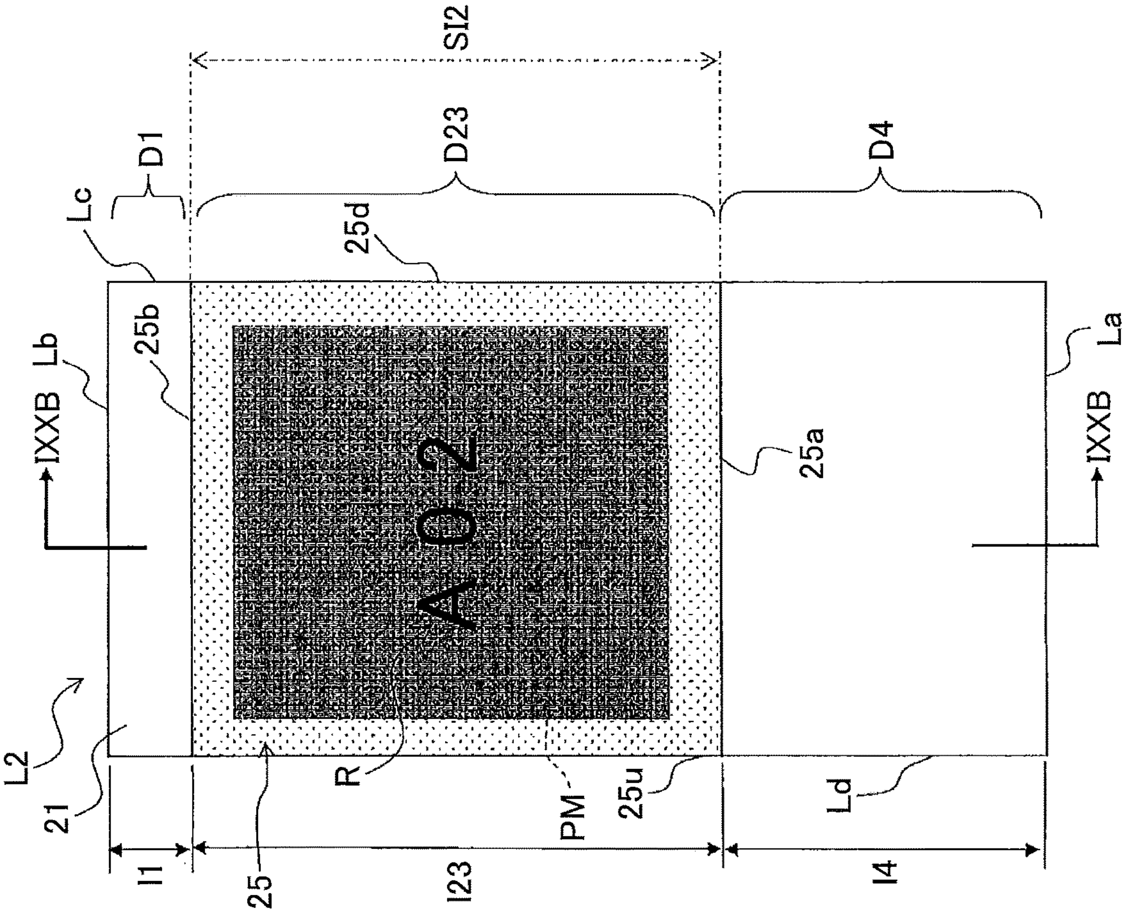
FIG. 19A is a plan view showing the print label.
Figure 19B:
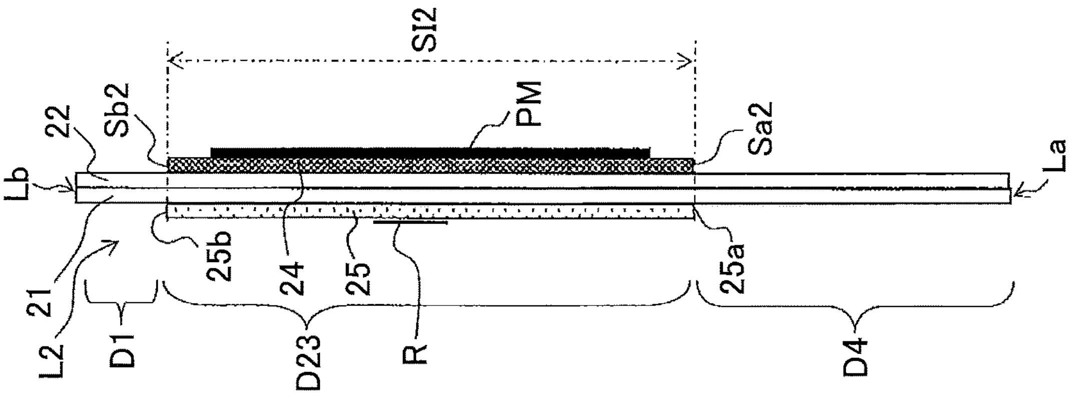
FIG. 19B is a cross-sectional view taken along a section IXXB-IXXB shown in FIG. 19A.

As in the present embodiment described above, with the printing tapes To and T of this variation, first the excess label portion LB is separated from the main label parts Lo and the release material layer 24 (see FIG. 14B and FIG. 15A) by peeling the excess label portion LB from the top surface of the release material layer 24, as shown in FIG. 14A. Note that a printing tape To may be provided with an initial configuration that omits the excess label portion LB from FIG. 14A (i.e., a configuration that omits the printed images R from FIG. 14B). Next, owing to the square-shaped slits S described above, each print label L having a printed image R formed on the print background layer 25 can be peeled off while the square-shaped portion of the release material layer 24 positioned inside the slit S remains covering the release material layer 24, as illustrated in FIG. 15D. After the print label L has been peeled off, a space (a window WD) will remain on the strip-like release material layer 24 inside the rectangular slit S, as illustrated in FIG. 15F.

In the variation described above, the upstream edge Pu2 of the mark PM2 is separated from the slit inner area SI2 in the slit S2, and the downstream edge Pd2 of the mark PM2 is also separated from the slit inner area SI1 in the slit S1 (because the downstream edge Pd2 is in the range of the print label L2). Similarly, the upstream edge Pu3 of the mark PM3 is separated from the slit inner area SI3 in the slit S3, and the downstream edge Pd3 of the mark PM3 is also separated from the slit inner area SI2 in the slit S2 (because the downstream edge Pd3 is in the range of the print label L3). With this configuration, even when the optical characteristics of the portion of the slit inner area SI1 in the slit S1 on the side of the mark PM2 (near the side Sc1) and the optical characteristics of the portion of the slit inner area SI2 in the slit S2 on the side of the mark PM2 (near the side Sd2) approach the optical characteristics of the mark PM2 as described above, the two non-mark parts F (see FIG. 14D) present between these portions and the mark PM2 can easily be discerned. Similarly, even when the optical characteristics of the portion of the slit inner area SI2 in the slit S2 on the side of the mark PM3 (near the side Sc2) and the optical characteristics of the portion of the slit inner area SI3 in the slit S3 on the side of the mark PM3 (near the side Sd3) approach the optical characteristics of the mark PM3 as described above, the two non-mark parts F (see FIG. 14D) present between these portions and the mark PM3 can easily be discerned. These results can suppress a decline in positioning precision caused by incorrect detections and the like, even when the printing tape To is conveyed in the curved state described above.

Next, a second embodiment of the present disclosure will be described with reference to FIGS. 17A through 17E, FIGS. 18A through 18D, and FIGS. 19A and 19B. In this embodiment, marks PM are provided so as to overlap the printing area PA in the print background layers 25 in a plan view. Parts similar to those in the first embodiment and the variations described above are designated with the same reference numerals, and duplicate descriptions are omitted or simplified as appropriate.

In this embodiment, the marks PM provided on the release material layer 24 fall within the corresponding slits S, as illustrated in FIGS. 17A through 17E, FIGS. 18A through 18D, and FIGS. 19A and 19B, which correspond to FIGS. 2A through 2E, FIGS. 3A through 3D, and FIGS. 4A and 4B.

As in a variation described above, the release material layer 24 has an opacity of no greater than 97%, where opacity is measured according to the technique described in JIS P 8149.

That is, the mark PM1 is provided in the corresponding slit S1 and is arranged to overlap the entire printing area PA on the corresponding print label L1 in a plan view.

With regard to this mark PM1, the slit S1 corresponds to the slit in the claims, and the sides Sa1, Sb1, Sc1, and Sd1 of the slit S1 correspond to the first side, second side, upstream side, and downstream side, respectively. Further, the print label L1 corresponds to the print label.

Similarly, the mark PM2 is provided in the corresponding slit S2 and is arranged to overlap the entire printing area PA on the corresponding print label L2 in a plan view.

With regard to this mark PM2, the slit S2 corresponds to the slit in the claims, and the sides Sat, Sb2, Sc2, and Sd2 of the slit S2 correspond to the first side, second side, upstream side, and downstream side, respectively. Further, the print label L2 corresponds to the print label.

Similarly, the mark PM3 is provided in the corresponding slit S3 and is arranged to overlap the entire printing area PA on the corresponding print label L3 in a plan view.

With regard to this mark PM3, the slit S3 corresponds to the slit in the claims, and the sides Sa3, Sb3, Sc3, and Sd3 of the slit S3 corresponds to the first side, second side, upstream side, and downstream side, respectively. Further, the print label L3 corresponds to the print label.

Note that the procedures for separating the print labels L by peeling off the same and the like in FIGS. 17A through 17E, FIGS. 18A through 18D, and FIGS. 19A and 19B are similar to those described in the first embodiment with reference to FIGS. 2A through 2E, FIGS. 3A through 3D, and FIG. 4. Therefore, a detailed description of these procedures has been omitted.

In the present embodiment described above, color can be utilized in the marks PM provided on the back surface of the release material layer 24 so that the background color of the printing area PA on the print label L appears uniform when viewed from the front side, even when the release material layer 24 is configured of a see-through material.

When dimensions and sizes are described as being "identical," "equivalent," "different," and the like in appearance in the above description, these terms are not intended to be taken in their strictest sense. In other words, the terms "identical," "equivalent," and "different" may signify "substantially identical," "substantially equivalent," and "substantially different" to allow for design and manufacturing tolerances and error.

The arrows shown in FIG. 1 indicate an example of the signal flow in the above description, but the directions of signal flow are not limited to this example.

In addition to what has already been described, the methods according to the above-described embodiments and the variations thereof may be used in suitable combinations.

In addition, although not illustrated individually, the present disclosure may be implemented with various modifications without departing from the spirit of the disclosure.

What is claimed is:

1. A medium to be mounted in a printer, to be conveyed in a first direction and to be printed with the printer, the medium comprising:

- a release material having a strip shape including a long side parallel to the first direction and a short side parallel to a second direction orthogonal to the first direction, the release material having a first surface and a second surface opposite the first surface;

a first slit provided in the release material and having a square shape including a first side, a second side, a third side, and a fourth side, the first side and the second side being parallel to the first direction and juxtaposed in the second direction, the third side and the fourth side being parallel to the second direction and juxtaposed in the first direction, the third side being positioned upstream from the fourth side in the first direction;

an adhesive layer provided on the first surface of the release material;

a first print label fixed to the first surface of the release material via the adhesive layer so as to span across both the first side and the second side;

a second slit provided in the release material and positioned downstream from the first slit in the first direction, the second slit having a square shape including a fifth side, a sixth side, a seventh side, and an eighth side, the fifth side and the sixth side being parallel to the first direction and juxtaposed in the second direction, the seventh side and the eighth side being parallel to the second direction and juxtaposed in the first direction, the seventh side being positioned upstream from the eighth side in the first direction;

a second print label fixed to the first surface of the release material via the adhesive layer so as to span across both the fifth side and the sixth side; and a mark provided on the second surface of the release material, the mark having an upstream edge in the first direction positioned downstream from the fourth side and a downstream edge in the first direction positioned upstream from the seventh side, wherein the release material has a first curved surface that extends away from the fourth side within the first slit and a second curved surface that extends away from the seventh side within the second slit, and the mark extends along a surface portion of the release material that is spaced away from the first curved surface and the second curved surface.

2. The medium according to claim 1, wherein a distance between the upstream edge of the mark in the first direction and the fourth side and a distance between the downstream edge of the mark in the first direction and the seventh side are both greater than half a distance between the upstream edge and the downstream edge of the mark in the first direction.

3. The medium according to claim 1, wherein the medium has a roll shape, and is accommodated in a cassette detachably mounted in the printer.

4. A medium to be mounted in a printer, to be conveyed in a first direction and to be printed with the printer, the medium comprising:

a release material having a strip shape including a long side parallel to the first direction and a short side parallel to a second direction orthogonal to the first direction, the release material having a first surface and a second surface opposite the first surface;

a first slit provided in the release material and having a square shape including a first side, a second side, a third side, and a fourth side, the first side and the second side being parallel to the first direction and juxtaposed in the second direction, the third side and the fourth side being parallel to the second direction and juxtaposed in the first direction, the third side being positioned upstream from the fourth side in the first direction;

an adhesive layer provided on the first surface of the release material;

a first print label fixed to the first surface of the release material via the adhesive layer so as to span across both the first side and the second side;

a second slit provided in the release material and positioned downstream from the first slit in the first direction, the second slit having a square shape including a fifth side, a sixth side, a seventh side, and an eighth side, the fifth side and the sixth side being parallel to the first direction and juxtaposed in the second direction, the seventh side and the eighth side being parallel to the second direction and juxtaposed in the first direction, the seventh side being positioned upstream from the eighth side in the first direction;

a second print label fixed to the first surface of the release material via the adhesive layer so as to span across both the fifth side and the sixth side; and a mark provided on the second surface of the release material, the mark having an upstream edge in the first direction positioned upstream from the fourth side and a downstream edge in the first direction positioned downstream from the seventh side, wherein the release material has a first curved surface that extends away from the fourth side within the first slit and a second curved surface that extends away from the seventh side within the second slit, and at least a portion of the mark extends along a surface portion of the release material that is spaced away from the first curved surface and the second curved surface.

5. The medium according to claim 4, wherein each of the first print label and the second print label has a printing area, wherein the release material has an opacity of no greater than 97%, and wherein the mark is arranged so as not to overlap the printing area in the first print label nor the printing area in the second print label in a plan view.

6. The medium according to claim 4, wherein the medium has a roll shape, and is accommodated in a cassette detachably mounted in the printer.

7. A medium to be mounted in a printer, to be conveyed in a first direction and to be printed with the printer, the medium comprising:

a release material having a strip shape including a long side parallel to the first direction and a short side parallel to a second direction orthogonal to the first direction, the release material having a first surface and a second surface opposite the first surface;

a first slit provided in the release material and having a square shape including a first side, a second side, a third side, and a fourth side, the first side and the second side being parallel to the first direction and juxtaposed in the second direction, the third side and the fourth side being parallel to the second direction and juxtaposed in the first direction, the third side being positioned upstream from the fourth side in the first direction;

an adhesive layer provided on the first surface of the release material;

a first print label fixed to the first surface of the release material via the adhesive layer so as to span across both the third side and the fourth side;

a second slit provided in the release material and positioned upstream from the first slit in the first direction, the second slit having a square shape including a fifth side, a sixth side, a seventh side, and an eighth side, the fifth side and the sixth side being parallel to the first direction and juxtaposed in the second direction, the seventh side and the eighth side being parallel to the second direction and juxtaposed in the first direction, the seventh side being positioned upstream from the eighth side in the first direction;

a second print label fixed to the first surface of the release material via the adhesive layer so as to span across both the seventh side and the eighth side; and a mark provided on the second surface of the release material, the mark having an upstream edge in the first direction positioned downstream from the eighth side and a downstream edge in the first direction positioned upstream from an upstream edge of the first print label in the first direction, wherein the release material has a first curved surface that extends away from the third side within the first slit and a second curved surface that extends away from the eighth side within the second slit, and the mark extends along a surface portion of the release material that is spaced away from the first curved surface and the second curved surface.

8. The medium according to claim 7, wherein the medium has a roll shape, and is accommodated in a cassette detachably mounted in the printer.

9. A medium to be mounted in a printer, to be conveyed in a first direction and to be printed with the printer, the medium comprising:

a release material having a strip shape including a long side parallel to the first direction and a short side parallel to a second direction orthogonal to the first direction, the release material having a first surface and a second surface opposite the first surface;

a slit provided in the release material and having a square shape including a first side, a second side, an upstream side, and a downstream side, the first side and the second side being parallel to the first direction and juxtaposed in the second direction, the upstream side and the downstream side being parallel to the second direction and juxtaposed in the first direction, the upstream side being positioned upstream from the downstream side in the first direction;

an adhesive layer provided on the first surface of the release material;

a print label fixed to the first surface of the release material via the adhesive layer so as to span across both the first side and the second side; and a mark provided on the second surface of the release material, the mark being in the slit, wherein the print label has a printing area, wherein the release material has an opacity of no greater than 97%, wherein the mark is arranged to overlap an entire area of the printing area in the print label in a plan view, wherein the release material has a first curved surface that extends away from the upstream side within the slit and a second curved surface that extends away from the downstream side within the slit, and wherein at least a portion of the mark extends along a surface portion of the release material that is spaced away from the first curved surface and the second curved surface.

10. The medium according to claim 9, wherein the medium has a roll shape, and is accommodated in a cassette detachably mounted in the printer.

* * * * *